(12) United States Patent
Ade et al.

(10) Patent No.: US 11,520,472 B2
(45) Date of Patent: Dec. 6, 2022

(54) INSPECTION PROGRAM EDITING ENVIRONMENT INCLUDING INTEGRATED ALIGNMENT PROGRAM PLANNING AND EDITING FEATURES

(71) Applicants: Mitutoyo Corporation, Kanagawa-ken (JP); Mitutoyo Europe GmbH, Neuss (DE)

(72) Inventors: Guenther Ade, Oberndorf (DE); Frank Uwe Madsen, Oberndorf (DE); Petra Brieger, Oberndorf (DE)

(73) Assignees: Mitutoyo Corporation, Kanagawa-ken (JP); Mitutoyo Europe GmbH, Neuss (DE)

( * ) Notice: Subject to any disclaimer, the term of this patent is extended or adjusted under 35 U.S.C. 154(b) by 655 days.

(21) Appl. No.: 15/273,424

(22) Filed: Sep. 22, 2016

(65) Prior Publication Data
US 2017/0090742 A1 Mar. 30, 2017

Related U.S. Application Data

(60) Provisional application No. 62/232,233, filed on Sep. 24, 2015.

(51) Int. Cl.
*G06F 3/04847* (2022.01)
*G01B 21/04* (2006.01)
(Continued)

(52) U.S. Cl.
CPC ......... *G06F 3/04847* (2013.01); *G01B 5/012* (2013.01); *G01B 21/047* (2013.01);
(Continued)

(58) Field of Classification Search
CPC ............ G06F 3/04847; G06F 3/04815; G06F 3/0482; G06F 3/04845; G01B 5/008; G01B 5/012; G06T 7/0006; G06T 2207/30164
(Continued)

(56) References Cited

U.S. PATENT DOCUMENTS 4,901,253 A 2/1990 Iwano et al.
4,908,951 A 3/1990 Gumy
(Continued)

FOREIGN PATENT DOCUMENTS

| DE | 198 21 371 | 11/1999 |
|----|-----------|---------|
| DE | 101 08 688 | 9/2002 |
| EP | 1330686 B1 | 12/2006 |

OTHER PUBLICATIONS

Extended European Search Report; dated Apr. 4, 2019; for Application No. EP 16849715.4; 5 pages.

*Primary Examiner* — Saif A Alhija
(74) *Attorney, Agent, or Firm* — Seed IP Law Group LLP

(57) ABSTRACT

A system is provided for programming workpiece feature inspection operations for a coordinate measuring machine (CMM), including a user interface that comprises a workpiece inspection program simulation portion configurable to display a 3-D view of a workpiece; an editing user interface portion comprising an editable plan representation of a current workpiece feature inspection plan for the workpiece; and an editable alignment program plan representation for the workpiece. The system is configured with the editable alignment program plan representation being automatically responsive to editing operations, regardless of whether the editing operations are performed in the 3-D view or the editable plan representation. The editing operations include
(Continued)

deleting or adding at least one workpiece feature to or from the editable alignment program plan representation.

20 Claims, 38 Drawing Sheets

(51) Int. Cl.
    *G05B 19/401*     (2006.01)
    *G01B 5/012*     (2006.01)
    *G06F 3/04815*     (2022.01)
    *G06F 3/0482*     (2013.01)
    *G06F 3/04845*     (2022.01)
    *G06T 7/00*     (2017.01)

(52) U.S. Cl.
    CPC ......... *G05B 19/401* (2013.01); *G06F 3/0482* (2013.01); *G06F 3/04815* (2013.01); *G06F 3/04845* (2013.01); *G06T 7/0006* (2013.01); *G05B 2219/35318* (2013.01); *G05B 2219/37442* (2013.01); *G05B 2219/37443* (2013.01); *G06T 2207/30164* (2013.01)

(58) Field of Classification Search
    USPC .............................................. 703/1
    See application file for complete search history.

(56) References Cited

U.S. PATENT DOCUMENTS

| | | |
|---|---|---|
| 5,465,221 A | 11/1995 | Merat et al. |
| 5,471,406 A | 11/1995 | Breyer et al. |
| 7,058,472 B2 | 6/2006 | Mathews et al. |
| 7,146,291 B2 | 12/2006 | Hough |
| 7,590,497 B2 | 9/2009 | Tomquist et al. |
| 7,652,275 B2 | 1/2010 | Gladnick |
| 7,783,445 B2 | 8/2010 | McLean et al. |
| 8,028,085 B2 | 9/2011 | Elien et al. |
| 8,302,031 B1 | 10/2012 | Sang |
| 8,438,746 B2 | 5/2013 | Usui |
| 2004/0075809 A1* | 4/2004 | Wildsmith ......... G05B 19/4097 351/159.74 |
| 2006/0079989 A1 | 4/2006 | Ishii et al. |
| 2008/0027968 A1* | 1/2008 | Kfouri ................ G06F 17/5018 |
| 2009/0112357 A1* | 4/2009 | Hammond .............. B23P 6/002 700/194 |
| 2010/0268355 A1 | 10/2010 | Chang et al. |
| 2014/0337780 A1 | 11/2014 | Northrup et al. |
| 2016/0298958 A1 | 10/2016 | Yu et al. |
| 2016/0299493 A1 | 10/2016 | Yu et al. |
| 2016/0300396 A1 | 10/2016 | Yu et al. |

* cited by examiner

| No. | Function | | Parameters | |
|---|---|---|---|---|
| 15 | | Plane | 708 (1) Mean | |
| 16 | | Measure point manually | Number of points = 4 | 366F51M |
| 17 | | Finish element | | |
| 18 | | Clear picture | 367B | |
| 19 | | Show picture | @PartPath@PartSubDirectory\micat-a_axisalignment.jpg | |
| 20 | | Change probe tree | No. of probe tree = 1 | |
| 21 | | Change probe | 5 | |
| 22 | | Plane | 817 (2) Mean | 366F62 |
| 23 | | Measure point manually | Number of points = 4 | 366F62M |
| 24 | | Finish element | | |
| 25 | | Clear picture | 367C | |
| 26 | | Show picture | @PartPath@PartSubDirectory\micat-a_originalalignment.jpg | |
| 27 | | Change probe tree | No. of probe tree = 1 | |
| 28 | | Change probe | 3 | |
| 29 | | Plane | 718 (3) Mean | 366F63 |
| 30 | | Measure point manually | Number of points = 4 | 366F63M |
| 31 | | Finish element | 366F63F | |
| 32 | | Clear picture | | |
| 33 | | Align base plane | 708 (1) XY plane, Origin in element | |
| 34 | | Intersection element Line | Line (4) Plane (1); Plane (2) | |

FIG. 34

*360* — Part program list

| No. | | Function | Parameters |
|---|---|---|---|
| 31 / 31 | | Finish element | |
| 32 / 32 | | Clear picture | |
| 33 / 33 | | Align base plane | 708 (1)<br>XY plane, Origin in element |
| 34 / 34 | | Intersection element<br>Line | Line (4)<br>Plane (1); Plane (2) |
| 35 / 35 | | Align axis parallel to axis | Line (4)<br>Y axis, Origin on axis |
| 36 / 36 | | Intersection element<br>Point | Point (5)<br>X min. ; Plane (3); Line (4) |
| 37 / 37 | | Create origin | Point (5)<br>Y |
| 38 / 38 | | Move and rotate co-ord. system | X axis<br>X = -50.000  Y = -37.500  Z = 0.000, Angle = 0.000 |
| 39 / 39 | | Store co-ord. system | 1  —  *366F70* |
| 40 / 40 | | Theo. element<br>Point | Origin (6)<br>X = 0.000  Y = 0.000  Z = 0.000 |
| 41 / 41 | | Theo. element<br>Line | X (7)<br>Length= 10.000; X= 0.000  Y= 0.000  Z = 0.000; Angle X |
| 42 / 42 | | Theo. element<br>Line | Y (8)<br>Length= 10.000; X= 0.000  Y= 0.000  Z = 0.000; Angle X |
| 43 / 43 | | Machine co-ordinates | |
| 44 / 44 | | Memory recall<br>Point | Origin (9)<br>Point (6); Projection from selected element |
| 45 / 45 | | Memory recall<br>Line | X (10)<br>Point (7); Projection from selected element |
| 46 / 46 | | Memory recall<br>Line | Y (11)<br>Point (8); Projection from selected element |
| 47 / 48 | +0.1 100.0 -0.1 | Tolerance - Point<br>Point (9) | |
| 48 / 55 | +0.1 100.0 -0.1 | Tolerance - Line<br>Line | |
| 49 / 60 | +0.1 100.0 -0.1 | Tolerance - Line<br>Line | |

*368* spans rows 33–37; *369* points to row 38; *371* points to row 39; *366F63F* points to the highlighted row 31; *364* indicates the cursor.

FIG. 35

INSPECTION PROGRAM EDITING ENVIRONMENT INCLUDING INTEGRATED ALIGNMENT PROGRAM PLANNING AND EDITING FEATURES

CROSS-REFERENCE TO RELATED APPLICATION(S)

This application claims priority to U.S. Provisional Application No. 62/232,233, filed Sep. 24, 2015, the entire disclosure of which is incorporated herein by reference.

BACKGROUND

Technical Field

This disclosure relates to precision metrology, and more particularly to editing inspection programs and alignment programs for coordinate measuring machines.

Description of the Related Art

Certain metrology systems, including coordinate measurement machines (CMMs), can be utilized to obtain measurements of inspected workpieces and may be controlled at least in part by workpiece feature inspection operations that have been programmed on a computer. One exemplary prior art CMM is described in U.S. Pat. No. 8,438,746 (the '746 patent), which is hereby incorporated by reference in its entirety. As described in the '746 patent, the CMM includes a probe for measuring a workpiece, a movement mechanism for moving the probe, and a controller for controlling the movement mechanism.

A CMM that includes a surface scanning probe is described in U.S. Pat. No. 7,652,275, which is hereby incorporated herein by reference in its entirety. After a scan, a three-dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is hereby incorporated herein by reference in its entirety.

In all of the above described CMMs, operations may be programmed for inspecting workpiece features. Such programmed operations may generally be reviewed to see which workpiece features are being inspected and in what order, and may also be edited by adding, removing or otherwise altering particular program elements or operations that are associated with particular workpiece features. However, in existing CMM programming systems, such reviewing and editing operations are not always easy for a user to perform or to understand. For example, it may be difficult for a user to track where and how such programmed operations fit within an overall inspection plan, and it may be difficult to understand the various effects that certain types of edits may produce relative to altering the efficiency or effectiveness for the inspection of a particular workpiece feature or for the overall inspection plan. A need exists for a system and/or user interface features which allow such understanding in an immediate and intuitive manner during inspection program creation, review, and/or editing for a CMM. A need exists for a system and/or user interface features which simplify the program creation and editing processes, and which apply to the creation and editing of integrated or separate workpiece alignment programs as well, and which allow for the understanding of the effects of various types of edits in an immediate and intuitive manner during inspection program and/or alignment program creation, review and/or editing for a CMM.

BRIEF SUMMARY

Alignment programs that establish the location of a workpiece on a CMM, particularly when they are required to guide the manual operations of relatively unskilled users, have not been sufficiently intuitive or easy to create or use. In addition, visualization of the effect of editing changes to the workpiece features used for alignment and the associated plans and/or programs has not been immediately or continuously available in the user interface (e.g., through a displayed "3-D" simulation or moving animation). Furthermore, it has been typical to require the user/programmer to intentionally create separate inspection programs and alignment programs, if they are intended to be separately performed. Alternatively, inspection operations and alignment operations have been merged in a single program, such that the operations cannot be conveniently performed independently of one another (e.g. by separate routines or programs).

In contrast, in some embodiments of the systems and methods disclosed herein, alignment program plan creation an inspection program plan creation may be conveniently performed using similar methods in the same "integrated" programming and editing environment. Despite this integrated environment, separate alignment programs and inspection programs may be automatically created for convenient execution independently of one another, if desired. This is a significant enhancement of ease-of-use for the programmer, in comparison to the prior art.

According to one aspect of the disclosure, a system is provided for programming workpiece feature inspection operations for a coordinate measuring machine (CMM) and for programming workpiece alignment operations. Some workpiece features of a workpiece are associated with an alignment program, which may be used to align an ideal coordinate system with an actual coordinate system and may be additionally used to guide a user through manual alignment operations. In various embodiments, the alignment program may be used to measure where certain features of an actual workpiece are located on an actual CMM, in the so-called machine coordinate system (MCS). The location of those features may then be analyzed to establish a part coordinate system (PCS), which identifies where the part (the workpiece) is located in the MCS. The coordinates of those workpiece features of an ideal workpiece as defined in a CAD file are in the CAD coordinate system (CCS). An inspection program for the workpiece may thus be defined "offline" (i.e., not in the context of an actual CMM) using the CCS coordinates. In the alignment program that may be generated according to the present disclosure, a transformation may be determined that converts the CCS coordinates in the offline-created inspection program to the PCS coordinates, which may be referenced to the MCS coordinates, so that the inspection program created using offline programming based on the CAD file creates the appropriate motions for the actual workpiece feature at its actual location on the actual CMM.

The coordinate measuring machine (CMM) may include at least one sensor used for determining workpiece feature measurement data, a stage for holding a workpiece wherein at least one of the sensor or the stage are movable relative to one another, and a CMM control portion. The system includes a computer-aided design (CAD) file processing portion and a user interface. The computer-aided design (CAD) file processing portion inputs a workpiece CAD file corresponding to a workpiece and analyzes the file to automatically determine inspectable workpiece features on the workpiece corresponding to a plurality of geometric feature types.

In various implementations, the user interface may include a workpiece inspection program simulation portion configurable to display a 3-D view including at least one of workpiece features on the workpiece and inspection operation representations corresponding to inspection operations to be performed on workpiece features according to a current workpiece feature inspection plan; and an editing user interface portion comprising an editable plan representation of the current workpiece feature inspection plan for the workpiece corresponding to the CAD file. The editable plan representation comprises at least one of workpiece features or inspection operation representations. At least some of these workpiece features or inspection operation representations may be used in relation to an editable alignment program plan representation. The editable alignment program plan representation may, in one embodiment, be displayed as part of the editable plan representation. However, in other embodiments it may be displayed elsewhere in the user interface.

In various embodiments, the system may be configured with both of the 3-D view and the editable plan representation being automatically responsive to editing operations included in a first set of editing operations, regardless of whether the editing operations are performed in the 3-D view or the editable plan representation of the user interface. The system is further configured with the editable alignment program plan representation being automatically responsive to the editing operations included in the first set of editing operations, regardless of whether the editing operations are performed in the 3-D view or the editable plan representation of the user interface. The first set of editing operations comprises deleting (or adding) at least one workpiece feature from (or to) the editable alignment program plan representation, wherein the editing operations are performed in the 3-D view or the editable plan representation of the user interface. The editable alignment program plan representation is automatically responsive to the editing operations to delete (or add) the at least one workpiece feature from (or to) the editable alignment program plan representation, regardless of whether the editing operations are performed in the 3-D view or in the editable plan representation, by automatically deleting (or adding) the at least one workpiece feature and associated inspection operations in the editable alignment program plan representation.

The system may include an inspection path/sequence manager and an alignment program generator/manager portion. The inspection path/sequence manager and the alignment program generator/manager portion may also be responsive to editing operations included in the first set of editing operations, regardless of whether the editing operations included in the first set of editing operations are performed in the 3-D view or the editable plan representation of the user interface.

The system user interface may also include a program view portion. The program view portion may also be automatically responsive to editing operations included in the first set of editing operations, regardless of whether the editing operations included in the first set of editing operations are performed in the 3-D view, or the editable plan representation, or the program view portion itself. In some embodiments, the program view may be regarded as a "secondary" editable plan representation. In some embodiments, alignment program operations need not be reflected in the program view portion. In some embodiments, alignment program operations are automatically generated, recorded and stored in a separate program that is associated with the workpiece feature inspection plan (e.g. included in a project file that may include all the files relevant to inspecting a particular type of workpiece).

BRIEF DESCRIPTION OF THE DRAWINGS

FIG. 34 is a diagram of a part program list window of a user interface, in which the alignment program requires the user's further manual operations to locate (measure) the second and fourth workpiece features of the alignment program plan on the actual workpiece placed on the particular type of CMM;

FIG. 35 is a diagram of a part program list window of a user interface in which the alignment program automatically obtains a transformation that converts the CCS coordinates, previously obtained in a CAD-based simulation, to the machine coordinate system (MCS) coordinates of the measured workpiece features on the particular type of CMM and/or the part coordinate system (PCS) coordinates of the actual workpiece in the MCS;

DETAILED DESCRIPTION

Figure 1:
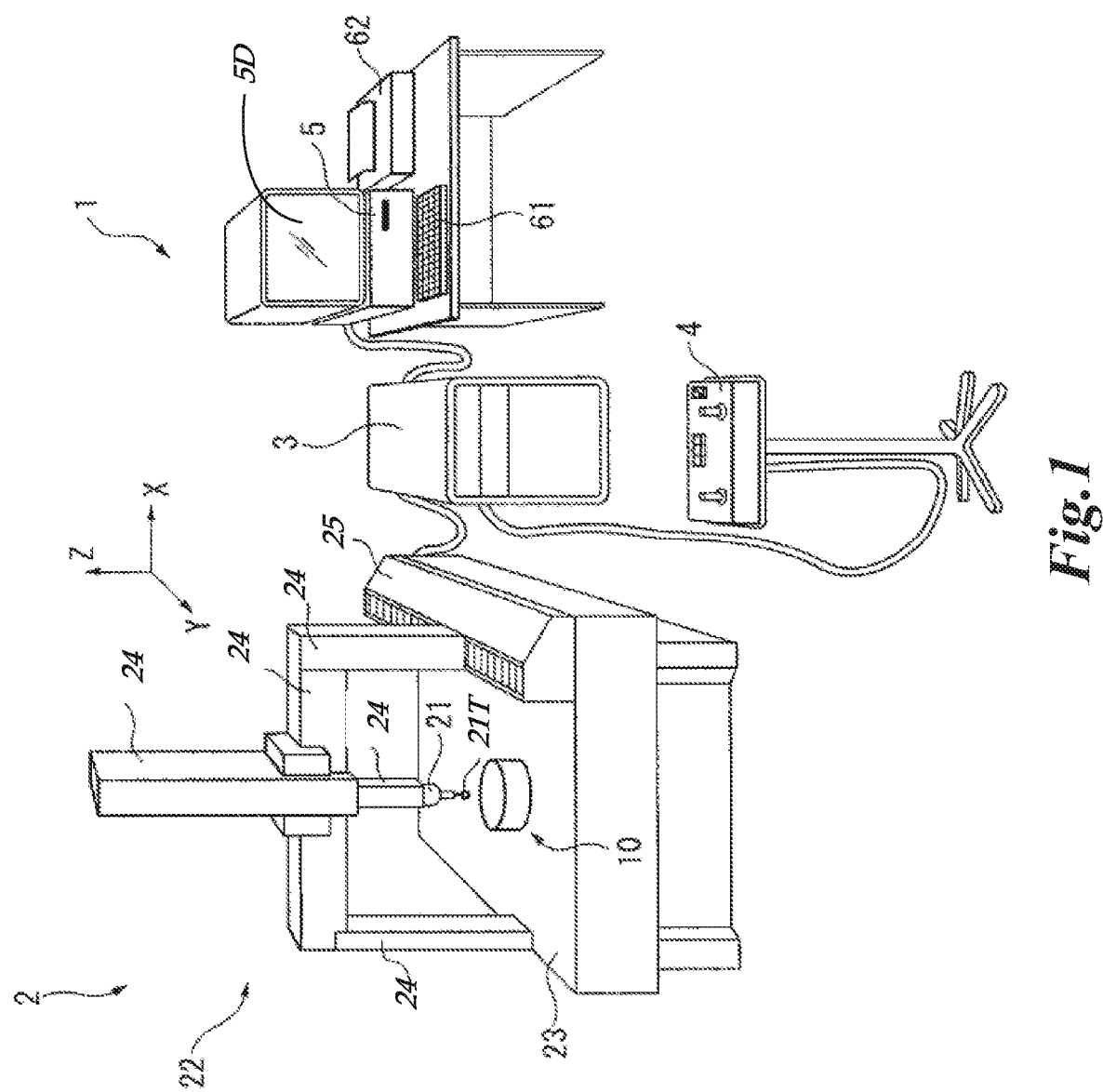
FIG. 1 is a diagram showing various typical components of a metrology system comprising a CMM.

FIG. 1 is a diagram showing various typical components of a metrology system 1 including a generic CMM, which provides one context for application of the principles disclosed herein. Certain aspects of the metrology system 1 are further described in the '746 patent. The metrology system 1 may include: a CMM body 2; a motion controller 3 that controls a drive of the coordinate measuring machine body 2; an operating unit 4 for manually operating the coordinate measuring machine body 2; a host computer 5 that issues commands to the motion controller 3 and executes processing such as for the inspection of features on a workpiece 10 (an object to be measured) disposed on the CMM body 2. A representative input unit 61 and output unit 62 are connected to the host computer 5, as well as a display unit 5D. The display unit 5D may display a user interface, for example as described further below with respect to FIGS. 3-36.

The CMM body 2 may include: a probe 21 having a stylus 21T which may contact a surface of the workpiece 10; a movement mechanism 22 that includes a three-axis slide mechanism 24 that holds the base end of the probe 21; and a measurement stage 23 that holds the workpiece 10 and on which a drive mechanism 25 moves the slide mechanism 24. In various implementations, the drive mechanism 25 may be controlled by a CMM control portion (e.g., including the motion controller 3). As will be described in more detail below, in various implementations one or more sensors of the CMM (e.g., including the probe 21 and/or stylus 21T) may be moved relative to the measurement stage 23 (e.g., as controlled by the motion controller 3) and utilized for determining workpiece feature measurement data (e.g., with regard to physical dimensions of features of the workpiece 10).

Figure 2A:
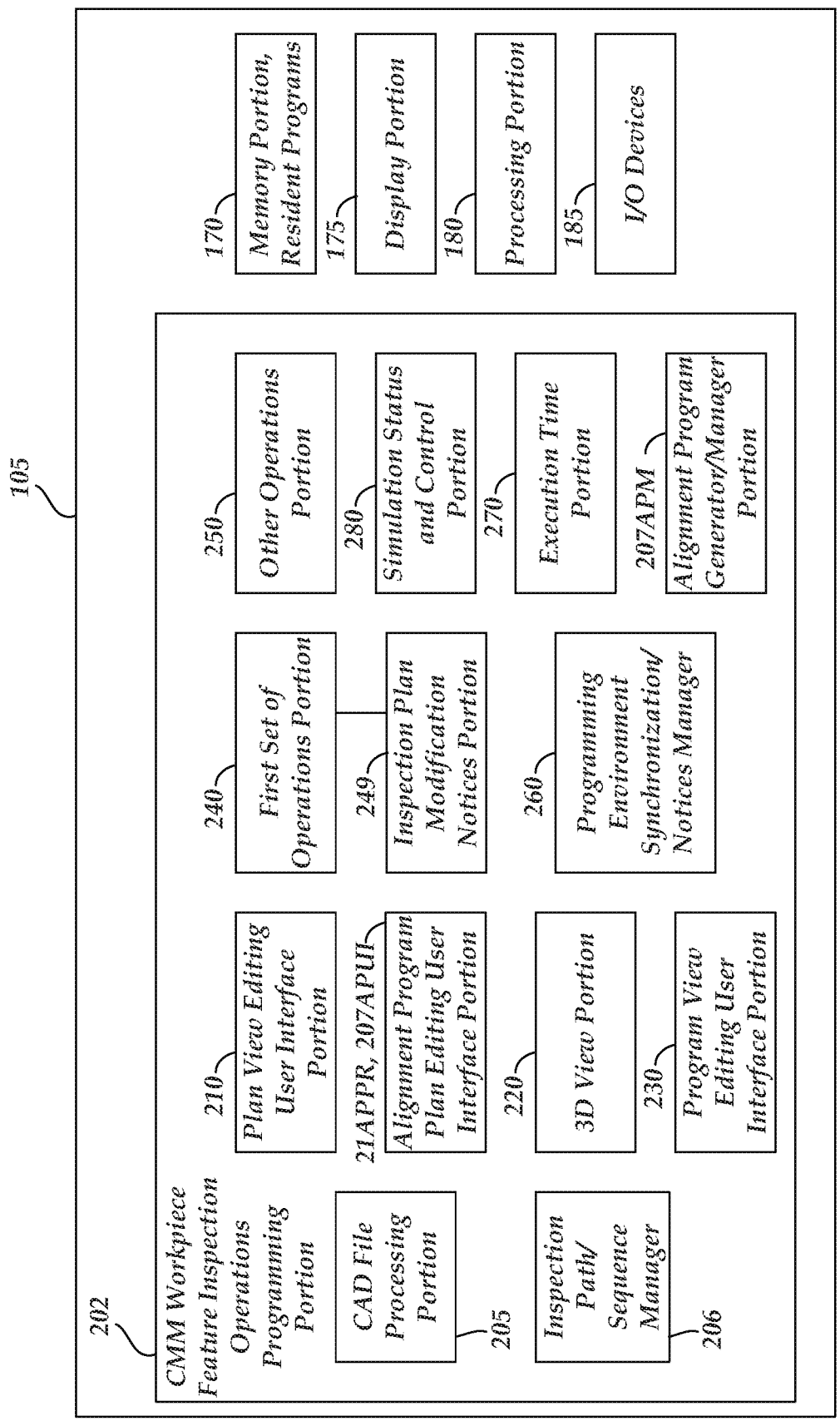
FIGS. 2A and 2B are diagrams showing various elements of one embodiment of a computing system on which workpiece feature inspection operations may be programmed for the CMM of FIG. 1.
Figure 2B:
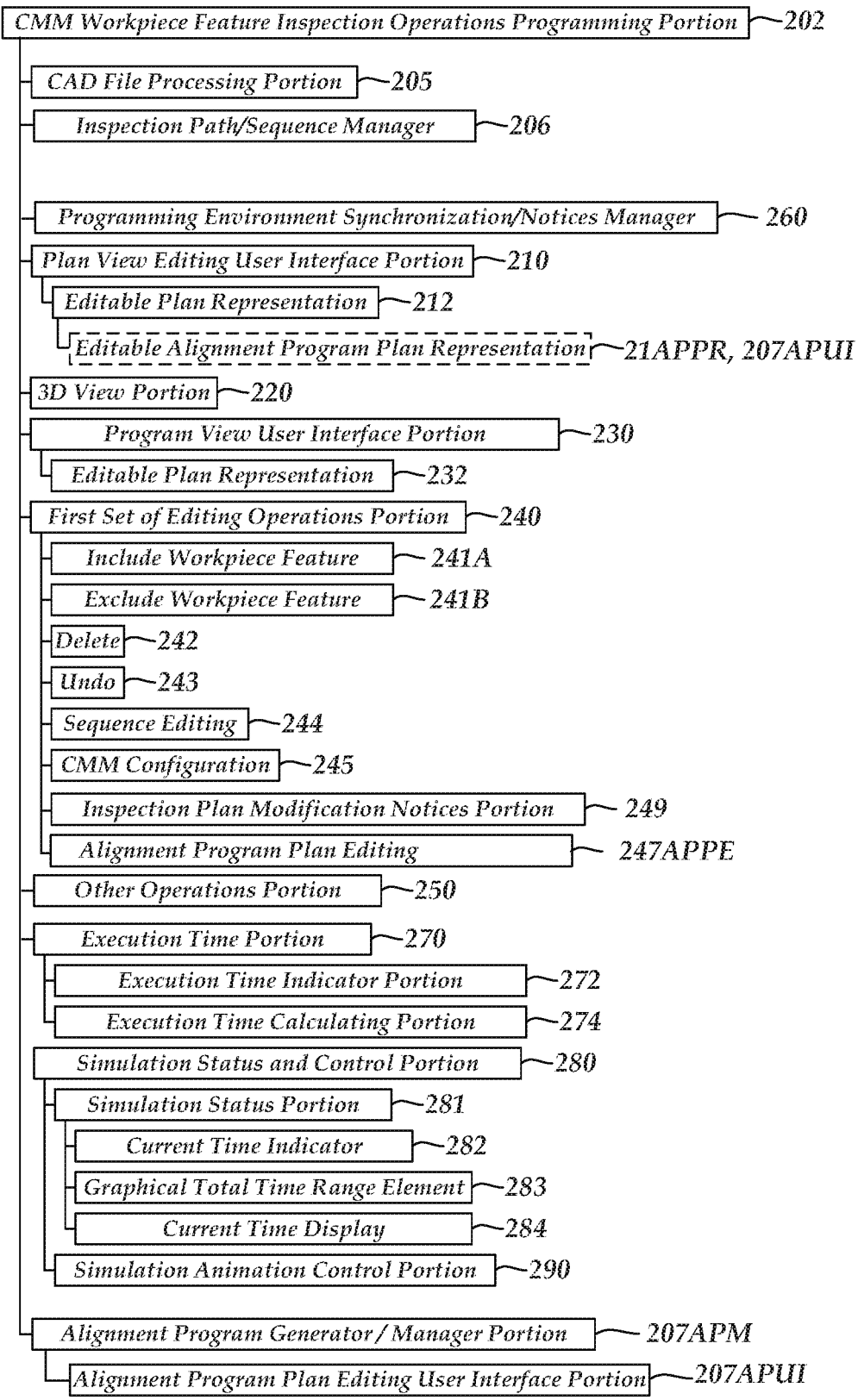

FIGS. 2A and 2B are diagrams of a computing system 105 including one embodiment of a programming portion 202 on which workpiece feature inspection operations may be programmed for a CMM (e.g., the CMM body 2 of FIG. 1). As shown in FIG. 2A, in various implementations the computing system 105 (e.g., the computer 5 of FIG. 1 or a separate computer) may include a memory portion 170, a display portion 175, a processing portion 180, an input-output devices portion 185, and the programming portion 202. The memory portion 170 includes resident programs and other data utilized by the computing system 105. The display portion 175 provides the display for the computing system 105 (e.g., similar to the display unit 5D of FIG. 1), including the features provided by the programming portion 202. The processing portion 180 provides for the signal processing and control of the computing system 105, while the input-output devices portion 185 receives and provides control signals and outputs to and from various devices (e.g., the CMM controller 3 of FIG. 1).

As shown in FIGS. 2A and 2B, in one embodiment, the programming portion 202 includes a CAD file processing portion 205, an inspection path and/or sequence manager 206, alignment program generator/manager portion 207APM, a plan view editing user interface portion 210, an alignment program plan editing user interface 207APUI, a 3-D view portion 220, a program view editing user interface portion 230, a first set of operations portion 240, which may include an inspection plan modification notices portion 249, an "other" operations portion 250, a programming environment synchronization and/or notices manager 260, an execution time portion 270, and a simulation status and control portion 280. In various implementations, the computer-aided design (CAD) file processing portion 205 inputs a workpiece CAD file corresponding to a workpiece (e.g., the workpiece 10 of FIG. 1) and analyzes the file to automatically determine inspectable workpiece features on the workpiece corresponding to a plurality of geometric feature types (e.g., cylinder, plane, sphere, cone, etc.) and the inspection path/sequence manager 206 may automatically determine a motion control path that allows the CMM to obtain measurements that characterize the workpiece features. Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein in their entirety, disclose various methods which may be used to analyze CAD data and determine geometric features of a workpiece and then automatically generate a motion control path for placing a probe or sensor at inspection points that measure or characterize the geometric features. European Patent Number EP1330686 also provides relevant teachings. In some embodiments, determining the geometric features may simply comprise extracting or recognizing the categorized geometric features inherently defined in some modern CAD systems. In some embodiments, product and manufacturing information (PMI, for short) is present in the CAD data, and may be used in the aforementioned processes. PMI conveys non-geometric attributes in CAD data, and may include geometric dimensions and tolerances, surface finish, and the like. In some embodiments, in the absence of PMI, default tolerances and other default inspection rules may be used in automatic operations of the CAD file processing portion 205 and the inspection path/sequence manager 206.

The motion control path may generally define a feature inspection sequence as well as individual inspection points (e.g., touch probe measurement points, or non-contact measurement points, or point cloud determination regions, etc.), as well as the motion path between such points. The sequence and motion path planning may follow simple rules that avoid collisions in some embodiments, or more complicated rules or processes that both avoid collisions and optimize motion path length or inspection time in other embodiments. In some embodiments, the CAD file processing portion 205 may include the inspection path/sequence manager 206, and/or a portion or all of the alignment manager 207APM, or they may be merged and/or indistinguishable. Applicable automatic path planning methods may be found in commercial products and/or the previously cited references, as well as in numerous technical and/or academic articles. In one embodiment, one or all of the aforementioned automatic processes may be automatically triggered when a target CAD file is identified in the programming portion 202. In other embodiments, one or all of the aforementioned automatic processes may be triggered in relation to a target CAD file based on operator input that initiates the processes. In other less desirable embodiments, similar processes may be semi-automatic and require user input in the programming portion 202 for certain operations or decisions.

In any case, in various embodiments the aforementioned processes may, in effect, be used to provide a comprehensive inspection plan and/or inspection program for a workpiece. In various embodiments the aforementioned processes may, in effect, also be used to provide a comprehensive alignment plan and/or alignment program for a workpiece. In some contexts, the connotations of the term "inspection plan" may encompass primarily what features are to be inspected and what measurements are to be made on each, and in what sequence, and the connotations of the term "inspection program" may primarily encompass how the inspection plan is to be accomplished on a particular CMM configuration (e.g., following the "instructions" inherent in the inspection plan, but also including the motion speeds and path, the probe or sensor to be used, and so on for a defined CMM configuration.) In some contexts, the connotations of the term "alignment program plan" may encompass primarily what features are to be measured and used for alignment, and in what sequence, and the connotations of the term "alignment program" may primarily encompass how the alignment program plan is to be accomplished on a particular CMM configuration (e.g., following the "instructions" inherent in the alignment program plan, but also including the motion speeds and path, the probe or sensor to be used, and so on for a defined CMM configuration.) Other portions of the programming portion 202 may use the results of the CAD file processing portion 205 and the inspection path/sequence manager 206 and/or the alignment program generator/manager portion 207APM to perform their operations and populate and/or control their associated user interface portions, and the like.

As shown in FIG. 2B, the plan view editing user interface portion 210 includes an editable plan representation 212 of a workpiece feature inspection plan for the workpiece corresponding to the CAD file. In one embodiment, the plan view editing user interface portion 210 may also include the editable alignment program plan representation 21APPR (which may be part of the alignment program plan editing user interface 207APUI) of a workpiece alignment program plan for the workpiece corresponding to the CAD file. In various embodiments, the editable alignment program plan representation may be included in the plan view editing user interface portion 210 by default. In various embodiments the editable alignment program plan representation 21APPR may be provided in the user interface by default, upon startup of inspection operations programming portion. In various embodiments it may be displayed in the plan view editing user interface portion 210, or within the editable plan representation 212, or elsewhere in the user interface. In various implementations, the program view editing user interface portion 230 may also (or instead) include an editable plan representation 232, as will be described in more detail below with respect to FIGS. 3-36. Alignment program operations need not be reflected in the program view portion, in some embodiments. In some embodiments, alignment program operations are automatically generated, recorded and stored in a separate program that is associated with the workpiece feature inspection plan or program (e.g. in a project file that may include all the files relevant to inspecting a particular type of workpiece workpiece.)

The alignment program generator/manager portion 207APM shown in FIGS. 2A and 2B, which generally includes alignment program plan editing user interface 207APUI as shown in FIG. 2B, may be operated by a user of the programming portion 202 to create or define an alignment program plan (which may be used to generate an alignment program) as shown and/or described in greater detail with reference to the attached FIGS. 8-36. It should be appreciated that known "alignment program creation" systems and methods typically require the user to intentionally create separate inspection programs and alignment programs, if they are intended to be separately performed. In such cases their creation operations are not conveniently mingled; for example, the same workpiece features in the same editing environment window cannot be conveniently used to work on either the inspection program plan or the alignment program plan, interchangeably at any moment in the editing environment. Alternatively, in the prior art, if a programmer is able work on either the inspection program plan or the alignment program plan, interchangeably at any moment in the editing environment, then the inspection operations and alignment operations have been merged in a single program, such that the operations cannot be conveniently performed independently of one another (e.g. by separate routines or programs) at a later time. In contrast, in some embodiments of the systems and methods disclosed herein, alignment program plan creation and inspection program plan creation may be conveniently performed using similar methods in the same "integrated" programming and editing environment, and the programmer can conveniently work on either the inspection program plan or the alignment program plan, interchangeably at any moment in the editing environment. Despite this feature of the integrated creation and editing environment, separate alignment programs and inspection programs may be automatically created for convenient execution independent of one another, if desired. This is a significant enhancement of ease-of-use for the programmer, in comparison to the prior art.

In various implementations, the programming portion 202 may save the configuration of the inspection program creation and the configuration of the alignment program creation or editing session according to known methods (e.g. in a project file), for example by saving links to, or copies of, the relevant workpiece CAD file and CMM configuration file, as well as saving data that characterizes the state of the programming and/or editing operations corresponding to the inspection plan and/or inspection program and/or alignment program plan and/or alignment program at the time the project file is saved (e.g. in the memory portion 170). In various implementations, for the CMM configuration file, the CAD file processing portion 205 may input a CMM CAD file corresponding to the CMM and may analyze the CMM CAD file to automatically determine a displayable representation of the CMM. In some embodiments, the creation or definition of alignment program plan and/or alignment program may be saved and recalled in the data that characterizes the state of the programming and/or editing operations corresponding to the alignment program plan and/or alignment program at the time the project file is saved. In other embodiments, the creation or definition of the alignment program plan and/or alignment program may be saved in a special purpose file that is later recalled and processed similar to the CMM configuration file, or the like, when reopening a project file. All of the foregoing methods have the advantage of not necessarily altering the methods used by particular CMM manufacturer for managing the related "project" programs and machine specific alignment and inspection program files. However, the foregoing methods are intended to be exemplary only, and not limiting. Other implementations may be used, if desired.

Although it has been known to attempt to automatically generate an inspection plan and/or inspection program, and to automatically generate an alignment program plan and/or alignment program, subsequent editing and visualization of such plans and/or program have not been sufficiently intuitive or easy to use—particularly for relatively unskilled users. In particular, the resulting alignment programs, particularly when they are required to guide the manual operations of relatively unskilled users, have not been sufficiently intuitive or easy to use. In addition, visualization of the effect of editing changes to the workpiece features used for alignment and the associated plans and/or programs has not been immediately or continuously available in the user interface (e.g., through a displayed "3-D" simulation or moving animation). Furthermore, it has been typical to require the user to intentionally create separate inspection programs and alignment programs, if they are intended to be separately performed. Alternatively, inspection operations and alignment operations have been merged in a single program, such that the operations cannot be conveniently performed independently of one another (e.g. by separate routines or programs). In contrast, in some embodiments of the systems and methods disclosed herein, alignment program plan creation an inspection program plan creation may be conveniently performed using similar methods in the same "integrated" programming and editing environment. Despite this integrated environment, separate alignment programs and inspection programs may be automatically created for convenient execution independently of one another, if desired. This is a significant enhancement of ease-of-use for the programmer, in comparison to the prior art. In such an integrated programming and editing environment, "results" feedback—"immediate" visual confirmation of the editing results in a 3-D simulation or animation view—may be critical to the acceptance of an editing operation.

Due to the value of such immediate feedback, particularly for relatively unskilled users or program editors, in some embodiments it is desirable for editing operations to be immediately incorporated (e.g., automatically or with very minimal effort by the user) into the current version of the inspection plan and/or alignment program plan and/or inspection program, which is then reflected in the various portions of the programming portion 202 and its user interface(s). In the illustrated embodiment, this may be accomplished through the operations of the programming environment synchronization/notices manager 260, which in one embodiment may be implemented using known "publisher-subscriber" methods, which are sometimes implemented using XML-like languages (e.g., as used for notifications between web pages). In various embodiments, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g., as may be recorded or implemented using the programming environment synchronization/notices manager 260, for example.) Applicable to such cases, U.S. Pat. No. 8,028,085, which is hereby incorporated herein by reference in its entirety, describes low latency methods which may be adapted to support the features disclosed herein.

In one embodiment, determining and/or generating various workpiece features and measurement operations in the CAD file processing portion 205 and the inspection path/sequence manager 206 may include generating and/or sharing a unique identifier for each workpiece feature and measurement operation. When the results from those portions are used in other portions of the programming portion 202 (e.g., as outlined above), the various identifiers may also be used or cross-referenced in the other portions to establish relevant associations between corresponding workpiece features and/or inspection operations across the various processing and/or user interface portions.

The user interface of the programming portion 202 includes a first set of operations (which also includes the underlying programming instructions and/or routines) usable to edit the workpiece feature inspection plan and/or the alignment program plan and/or inspection program. For example, the user interface operations may include selections of text or graphical elements that represent workpiece features or inspection operations, followed by activation of relevant commands or other user interface operations that affect the selected elements. In one embodiment, the first set of operations portion 240 may provide or identify such operations. In one embodiment, the inspection plan modification notices portion 249 may be responsive to operations included in the first set of operations portion 240 to provide a notice to the programming environment synchronization/notices manager 260 that an inspection plan modification and/or alignment program plan modification is taking place.

In response, the programming environment synchronization/notices manager 260 may then (e.g., automatically) manage the exchange of various event or programming operation notifications and related unique identifiers, such that the CAD file processing portion 205 and/or the inspection path/sequence manager 206 and/or the alignment program generator/manager portion 207APM appropriately edit or modify the current inspection plan and inspection program or current alignment program plan and alignment program in a synchronized manner when one of the first set of operations is performed. Such plan and program modifications may be performed very quickly in various embodiments, because the unique identifiers described above may be used to efficiently focus the modifications on only those features and/or measurement operations affected by the currently active one of the first set of operations. After that, the programming environment synchronization/notices manager 260 may notify other portions of the programming portion 202 (e.g., as outlined above), so that they are immediately updated using information from the edited plan and/or program. The unique identifier(s) of the most recently edited elements may again be used to speed up such operations, in that the updating need only focus on those elements associated with the identifiers.

It should be appreciated that the programming environment synchronization/notices manager 260 may also manage inter-portion communications and exchanges besides those associated with the first set of operations (e.g., using various techniques and identifiers similar to those outlined above.) In various embodiments, it may facilitate the synchronization between the various user interface windows or portions of the programming portion 202. For example, selection of a particular feature or instruction in one window may automatically trigger a notification or instruction to other windows to display a corresponding feature or instruction in that other window, or depict a program operating state associated with the selected feature or instruction, or the like.

It will be appreciated that the embodiment(s) outlined above for achieving real-time editing operation synchronization between various portions of the programming portion 202 is exemplary only, and not limiting. For example, the function of the identifiers outlined above may be provided by suitable database or lookup table associations or the like, without the presence of an explicit "identifier". These and other alternatives will be apparent to one of ordinary skill in the art based on the teachings disclosed herein.

The execution time portion 270 may include an execution time indicator portion 272 and an execution time calculating portion 274. In order to provide valuable feedback to a user performing editing operations, the execution time indicator portion 272 may provide a "real-time" indication of an estimated inspection program execution time for operating the CMM to execute a workpiece inspection program corresponding to the current workpiece feature inspection plan as executed by a current CMM configuration. Using the techniques outlined above, the programming portion 202 may be configured such that the execution time indicator portion 272 is automatically updated in response to a utilization of one of the operations included in the first set of operations portion 240 to modify the current workpiece feature inspection plan and/or the alignment program plan and/or the inspection program, so as to automatically indicate the estimated effect of the modification on the inspection program execution time. In various implementations, the first set of editing operations portion 240 may include or identify operations corresponding to inclusion of a workpiece feature 241A, exclusion of a workpiece feature 241 B, a delete command 242, an undo command 243, sequence editing 244, and altering a CMM configuration 245, each of which will be described in more detail below with respect to FIGS. 3-36. The first set of editing operations portion 240 may further include or identify operations corresponding to adding or deleting individual measurement points (e.g., touch points for a stylus) on a feature, or changing the motion plan for traversing between individual measurement points, or the like. Another operations portion 250 may include other operations relevant to the use and functioning of the programming portion 202 and/or general computing system 105. The 3-D view portion 220 may display a 3-D view including workpiece features on the workpiece and an indication of inspection operations to be performed on the workpiece features according to the current workpiece feature inspection plan. The simulation status and control portion 280 may include a simulation status portion 281 that is configured to characterize a state of progress through the current workpiece feature inspection plan corresponding to a currently displayed 3-D view, and the execution time indicator portion 272 may be displayed in conjunction with the simulation status portion 281.

In various implementations, as will be illustrated and described in more detail below with respect to FIGS. 3-7, the simulation status portion 281 may include a current time indicator 282 that moves along a graphical total time range element 283 to characterize a state of progress through the current workpiece feature inspection plan corresponding to the currently displayed 3-D view, and the execution time indicator 272 may be displayed in association with the graphical total time range element 283. In one implementation, the simulation status portion 281 further includes a current time display 284 which includes a numerical time representation that is automatically updated corresponding to the current time indicator 282 or the currently displayed 3-D view, and that further characterizes the state of progress through the current workpiece feature inspection plan corresponding to the currently displayed 3-D view. In one implementation, the simulation status and control portion 280 further includes a simulation animation control portion 290 which includes elements that are usable to control at least one of a start 291, pause 292, stop 293, reset 294, reverse 295, loop 296, increase in speed 297 or decrease in speed 298 of an animated display of simulated progress through the current workpiece feature inspection plan as displayed in the 3-D view.

In various implementations, the computing system 105 and/or other associated computer system(s) may include suitable unitary or distributed computing systems or devices, which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data (e.g., the memory portion 170). Software may include one or more program modules which include routines, programs, objects, components, data structures, and so on that perform particular tasks or implement particular abstract data types. In distributed computing environments, the functionality of the program modules may be combined or distributed across multiple computing systems or devices and in various implementations may be accessed via service calls.

Figure 3:
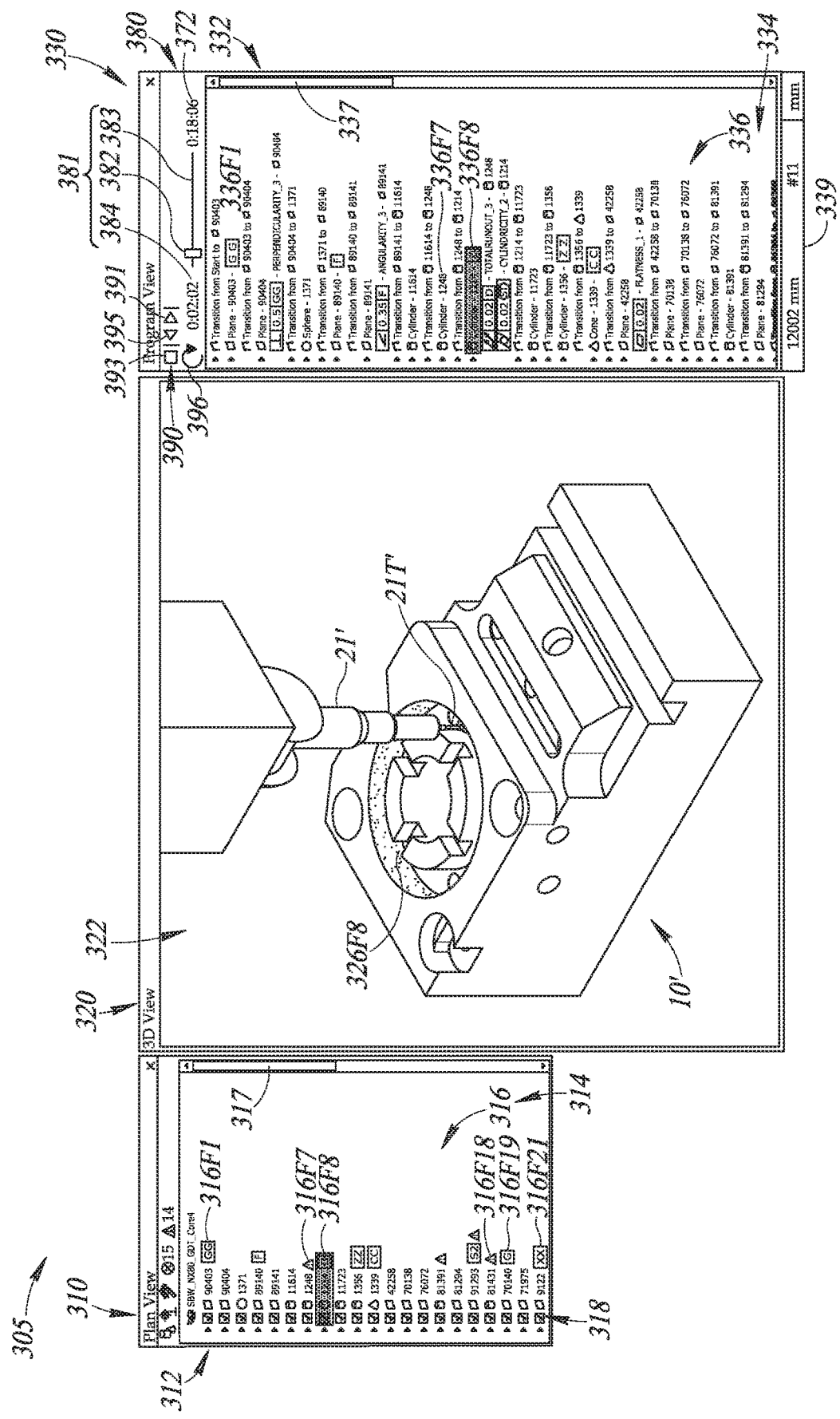
FIG. 3 is a diagram of a user interface in which all of the workpiece features of an editable plan representation are included in a set of workpiece features to be inspected according to the plan.

FIG. 3 is a diagram of a user interface 305 (e.g., as may be shown on the display unit 5D of FIG. 1, the display portion 175 of FIG. 2A, etc.). It will be appreciated that certain numbered elements 3XX of the user interface 305 may correspond to and/or be provided by similarly numbered elements 2XX of FIGS. 2A and 2B, except as otherwise described below. In the implementation shown in FIG. 3, the user interface 305 includes a plan view window 310, a 3-D view window 320 and a program view window 330. The plan view window 310 includes an editing user interface portion 312, the 3-D view window 320 includes a workpiece inspection program simulation portion 322, and the program view window 330 includes an editing user interface portion 332 and a simulation status and control portion 380. The editing user interface portions 312 and 332 each include plan representations 314 and 334, respectively, of a workpiece feature inspection plan for a workpiece 10 corresponding to a CAD file. The plan representation 314 is organized in terms of geometric features to be inspected on the workpiece. The plan representation 334 is organized as inspection program pseudo-code or actual code or graphical program operation representations or the like, in various embodiments. In the illustrated embodiment, each or both of the plan representations 314 and 334 are editable (that is, they are editable plan representations.) When editing operations are performed for one of the editable plan representations 314 and 334, the other plan representation may be automatically updated in a manner consistent with those editing operations by operation of the various system elements illustrated and described with respect to FIGS. 2A and 2B. However, in some embodiments, only one of the plan representations 314 and 334 need be editable. In such a case, the other plan representation may be absent, or hidden, or may be displayed and automatically updated in a manner similar to that outlined above.

As described above with respect to FIGS. 2A and 2B, in various implementations, a computer-aided design (CAD) file processing portion may input a workpiece CAD file corresponding to a workpiece 10 and may analyze the file to automatically determine inspectable workpiece features on the workpiece 10 corresponding to a plurality of geometric feature types (e.g., cylinder, plane, sphere, cone, etc.). In FIG. 3 the editing user interface portions 312 and 332 include editable plan representations 314 and 334 of the workpiece feature inspection plan for the workpiece 10 corresponding to the CAD file, wherein the editable plan representations 314 and 334 include the editable set of workpiece features 316 and 336 to be inspected. As will be described in more detail below, an execution time indicator 372 is provided that is indicative of an estimated inspection program execution time for operating the CMM to execute a workpiece inspection program corresponding to the current workpiece feature inspection plan as executed by a current CMM configuration. A first set of operations is usable to edit the workpiece feature inspection plan and/or the alignment program plan and/or the inspection program, and the system is configured such that the execution time indicator 372 is automatically updated in response to a utilization of one of the first set of operations to modify the current workpiece feature inspection plan and/or the alignment program plan and/or the inspection program, so as to automatically indicate the estimated effect of the modification on the inspection program execution time.

The 3-D view portion 320 displays a 3-D view of the workpiece inspection program simulation portion 322 including workpiece features 326 on the workpiece 10' and an indication of inspection operations to be performed on the workpiece features 326 according to the current workpiece feature inspection plan. In the example of FIG. 3, the 3-D view shows a touch probe 21' having a stylus 21T', which is positioned relative to a workpiece 10'. In the state illustrated, the touch probe stylus 21T' is contacting a cylinder workpiece feature 326F8, which corresponds to the workpiece features 316F8 and 336F8 which are highlighted in the editable plan representations 314 and 334, respectively. In the editable plan representation 334 the workpiece feature 336F8 includes a description of "cylinder—1214" along with a displayed cylinder icon, and in the editable plan representation 314 the workpiece feature 316F8 includes a description of "1214" along with a displayed cylinder icon. Such descriptions and icons may be automatically generated and displayed as corresponding to a numbered designation and geometric type (e.g., cylinder, plane, sphere, cone, etc.) for each of the workpiece features.

The simulation status and control portion 380 may include a simulation status portion 381 and a simulation animation control portion 390. Using synchronization techniques outlined above, for example, the simulation status portion 381 may be configured to characterize a state of progress through the current workpiece feature inspection plan corresponding to a currently displayed 3-D view of the workpiece inspection program simulation portion 322. In various implementations, the simulation status portion 381 may include a current time indicator 382 that moves along a graphical total time range element 383 to characterize a state of progress through the current workpiece feature inspection plan corresponding to the currently displayed 3-D view, and the execution time indicator 372 may be displayed in association with the graphical total time range element 383. In one implementation, as illustrated in the example of FIG. 3, the execution time indicator 372 may be displayed in the vicinity of the right-hand end of the graphical total time range element 383.

This position of the current time indicator 382 and the time of the current time display 384 correspond to the current state of progress through the current workpiece feature inspection plan, which, relative to the editable plan representation 314, indicates that the workpiece feature 316F8 is being inspected after having completed the corresponding inspections of workpiece features 316F1-316F7. Correspondingly, relative to the editable plan representation 334 this indicates that the workpiece feature 336F8 is being inspected after having completed the corresponding inspections of workpiece features 336F1-336F7. As will be described in more detail below, the editable plan representation 314 that is illustrated in FIGS. 3-7 includes forty-six workpiece features 316F1-316F46 on the workpiece 10' that may be inspected. The workpiece features 316F1-316F46 correspond to workpiece features 326F1-326F46 on the workpiece 10' in the workpiece inspection program simulation portion 322, and to workpiece features 336F1-336F46 in the editable plan representation 334. In order to simplify the figures, only some of the workpiece features are labeled. In the example of FIG. 3, the workpiece features 316F1-316F21 are currently visible in the plan view window 310, wherein a user may utilize controls to increment or scroll down (e.g., utilizing a vertical scroll bar 317, etc.) to view additional workpiece features (e.g., as will be illustrated and described in more detail below with respect to FIG. 6). Similarly, a vertical scroll bar 337 may be used to scroll up and down the program view window 330.

With respect to the first set of operations that is usable to edit the workpiece feature inspection plan and/or the alignment program plan and/or the inspection program, in one implementation the editing user interface portion 312 may include workpiece feature exclusion/inclusion elements 318 (e.g., checkboxes next to each of the workpiece features 316) that operate to toggle between an exclusion state (e.g., with the associated box unchecked) and an inclusion state (e.g., with the associated box checked) for each associated workpiece feature 316. An exclusion state may correspond to an exclusion of the associated workpiece feature 316 from the set of workpiece features to be inspected, and an inclusion state may correspond to an inclusion of the associated workpiece feature 316 in the set of workpiece features to be inspected. In the example of FIG. 3, all of the workpiece features 316 have been selected for inclusion. In various implementations, the first set of operations may include a utilization of the workpiece feature exclusion/inclusion elements 318 to either exclude or include workpiece features 316 with respect to the set of workpiece features to be inspected in the workpiece feature inspection plan and/or the alignment program plan and/or the inspection program, and the execution time indicator 372 may automatically be updated in response to a utilization of a workpiece feature exclusion/inclusion element 318, as will be described in more detail below with respect to FIGS. 4 and 5.

Figure 4:
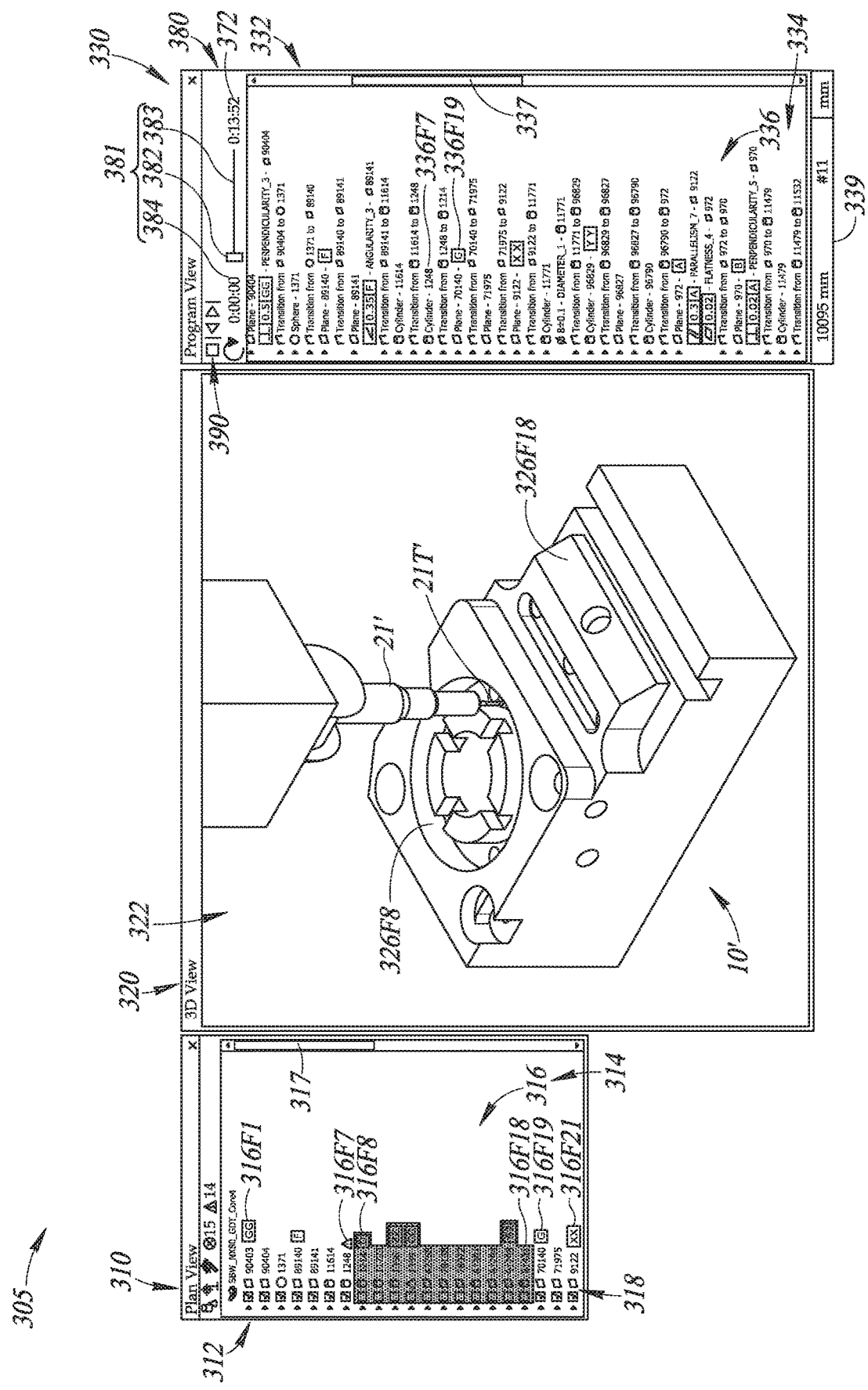
FIG. 4 is a diagram of a user interface in which some of the workpiece features of FIG. 3 have been unselected so as to be excluded from the set of workpiece features to be inspected according to the plan.

FIG. 4 is a diagram of the user interface 305 of FIG. 3 in which some of the workpiece features 316 have been unselected so as to be excluded from the set of workpiece features to be inspected. More specifically, as illustrated in FIG. 4, for the workpiece features 316F8-316F18, the corresponding workpiece feature exclusion/inclusion elements 318 have all been unchecked. As a result, the workpiece features 316F8-316F18 are no longer included in the set of workpiece features to be inspected. This is illustrated in the editable plan representation 334, in which the workpiece feature 336F7 is shown to be followed by the workpiece feature 336F19, with the workpiece features 336F8-336F18 no longer being included. This may be contrasted with the state of the editable plan representation 334 illustrated in FIG. 3, in which the workpiece feature 336F7 is shown to be followed by the workpiece feature 336F8, etc.

As a result of the unselecting of the workpiece features 316F8-316F18, in real time the exclusion time indicator 372 indicates a reduced time of "0:13:52", as compared to the previously indicated time of "0:18:06" of FIG. 3. This reduction in the displayed execution time indicates the estimated effect of the editing modification on the inspection program execution time.

With respect to the 3-D view window 320, in various implementations, the highlighting of the workpiece features 316F8-316F18 in the editable plan representation 314 may correspondingly result in the workpiece features 326F8-326F18 in the workpiece inspection program simulation portion 322 also being highlighted or otherwise marked. In order to simplify the illustrations in FIG. 3, only the workpiece features 326F8 and 326F18 are labeled in the 3-D view window 320.

Figure 5:
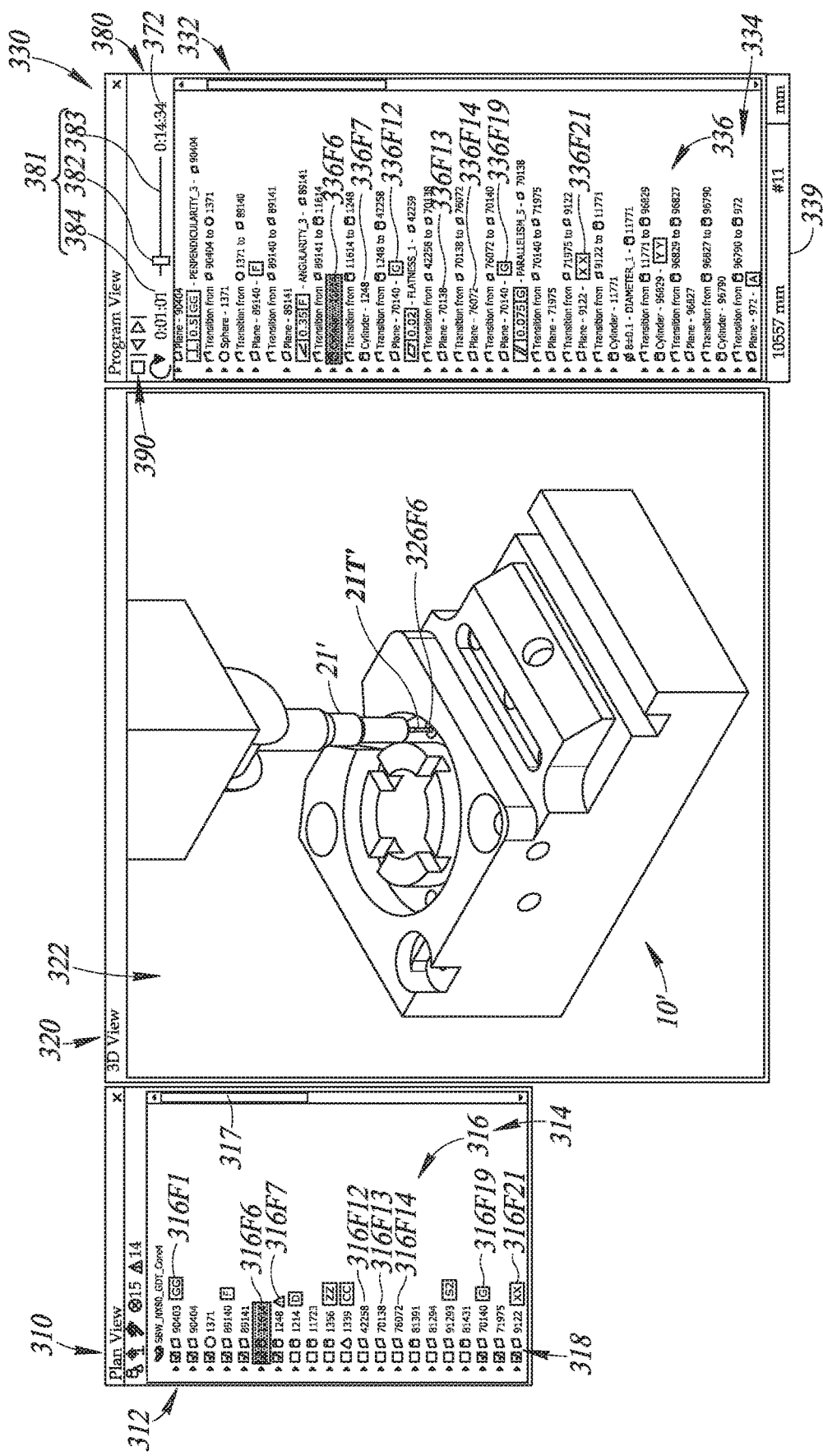
FIG. 5 is a diagram of a user interface in which some of the excluded workpiece features of FIG. 4 have been reselected so as to be reincluded in the set of workpiece features to be inspected according to the plan.

FIG. 5 is a diagram of the user interface 305 in which some of the excluded workpiece features 316 of FIG. 4 have been reselected so as to be reincluded in the set of workpiece features to be inspected. More specifically, as shown in FIG. 5, the workpiece features 316F12-316F14 are shown as having their corresponding workpiece feature exclusion/inclusion elements 318 rechecked so as to be reselected for inclusion in the set of workpiece features to be inspected. As a result, as illustrated in the editable plan representation 334, the workpiece feature 336F7 is now followed by the workpiece features 336F12-336F14, which are subsequently followed by the workpiece feature 336F19, etc. As a result of this modification, the execution time indicator 372 is shown to indicate a time of "0:14:34", which is an increase from the indicated time of "0:13:52" of FIG. 4, as corresponding to the additional time required for inspecting the workpiece features 336F12-336F14 as reincluded in the set of workpiece features to be inspected.

In various implementations, as an alternative or in addition to the workpiece feature exclusion/inclusion elements 318 described above with respect to FIGS. 3-5, additional elements and/or commands may be provided. For example, the editing user interface portion 312 or 332 may include a delete command usable to delete a currently selected workpiece feature 316 or 336 from the set of workpiece features to be inspected. In such an implementation, the first set of operations may include a utilization of the delete command. As another example, the editing user interface portion 312 or 332 may include an undo command usable to undo a previously executed operation. In such an implementation, the first set of operations may include a utilization of the undo command to undo a previously executed operation included in the first set of operations.

Figure 6:
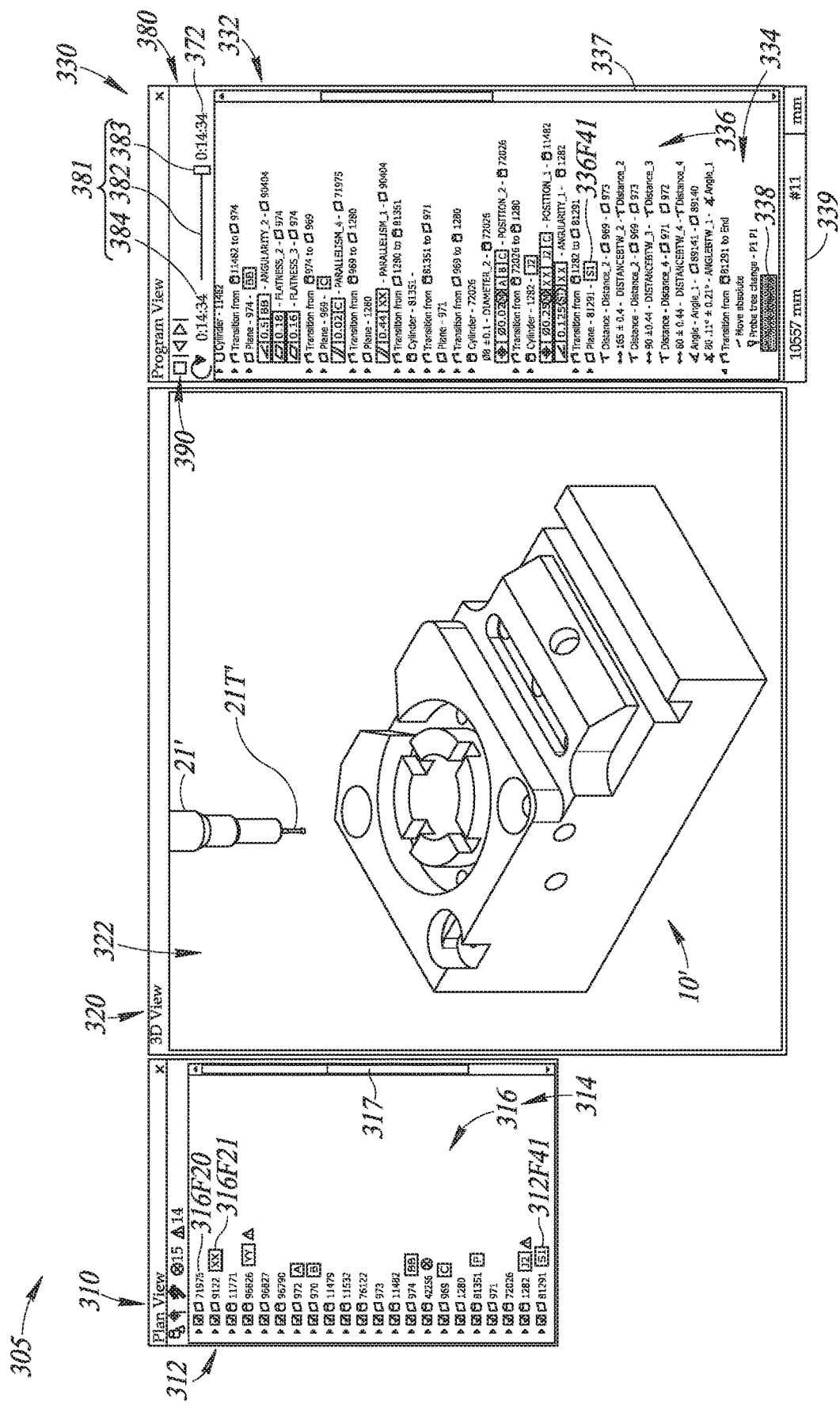
FIG. 6 is a diagram of a user interface displaying the end of a workpiece feature inspection plan.

FIG. 6 is a diagram of the user interface 305 displaying the end of the workpiece feature inspection plan. As shown in FIG. 6, the editable plan representation 334 shows a program element 338 (i.e., with a description of "move absolute") as being highlighted, which corresponds to the end of the workpiece feature inspection plan. The current time display 384 correspondingly indicates a time of "0:14:34" out of a total time indicated by the execution time indicator 372 of "0:14:34". The current time indicator 382 is correspondingly shown to be at the end of the graphical total time range element 383. In the 3-D view window 320, the probe 21 is shown as backed away from the workpiece 10', as may occur at the end of the workpiece feature inspection plan.

Figure 7:
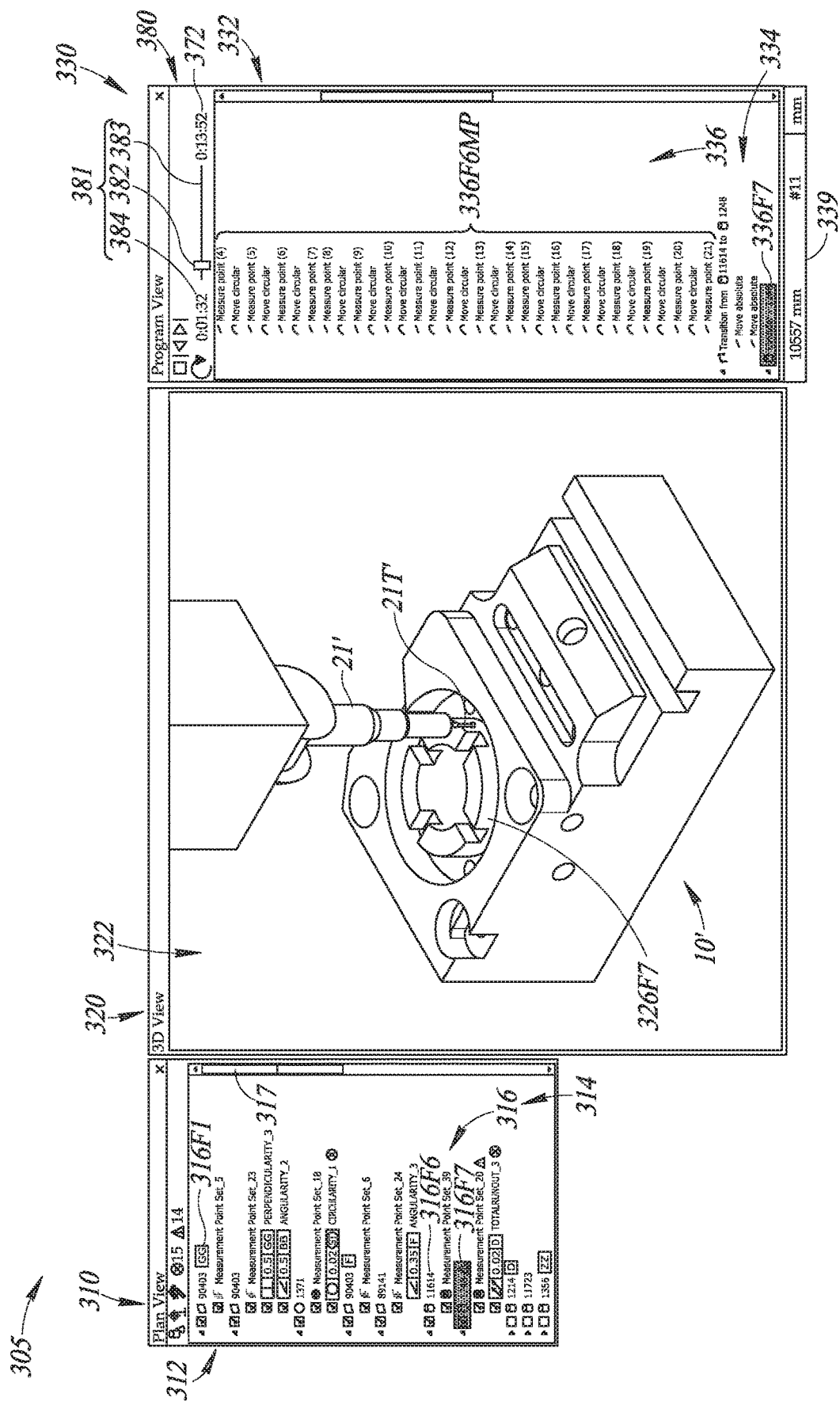
FIG. 7 is a diagram of a user interface in which, in addition to the workpiece features, inspection operation representations corresponding to inspection operations to be performed on workpiece features, are displayed regarding the editable plan representation.

FIG. 7 is a diagram of the user interface 305 in which additional detail is displayed regarding the editable plan representations 314 and 334 and an example cylindrical workpiece feature is highlighted. As shown in FIG. 7, the additional detail for the editable plan representations 314 and 334 includes information about specific measurement points, movements, angles, etc., for the performance of the inspections of the designated workpiece features. For example, in the editable plan representation 334, a set of twenty-one measurement points 336F6MP is illustrated with respect to the inspection of the workpiece feature 336F6.Next in reference to FIGS. 8-36 below, systems and method are described for programming workpiece feature inspection operations for a CMM, in which a user interface comprises a workpiece inspection program simulation portion configurable to display a 3-D view of a workpiece, an editing user interface portion including an editable plan representation of a current workpiece feature inspection plan for the workpiece, and an editable alignment program plan representation of a current workpiece alignment program plan for the workpiece. The system is configured with both of the 3-D view and the editable plan representation being automatically responsive to editing operations such as deleting or adding a workpiece feature from or to the editable alignment program plan representation, regardless of whether the editing operations are performed in the 3-D view or the editable plan representation.

Figure 8:
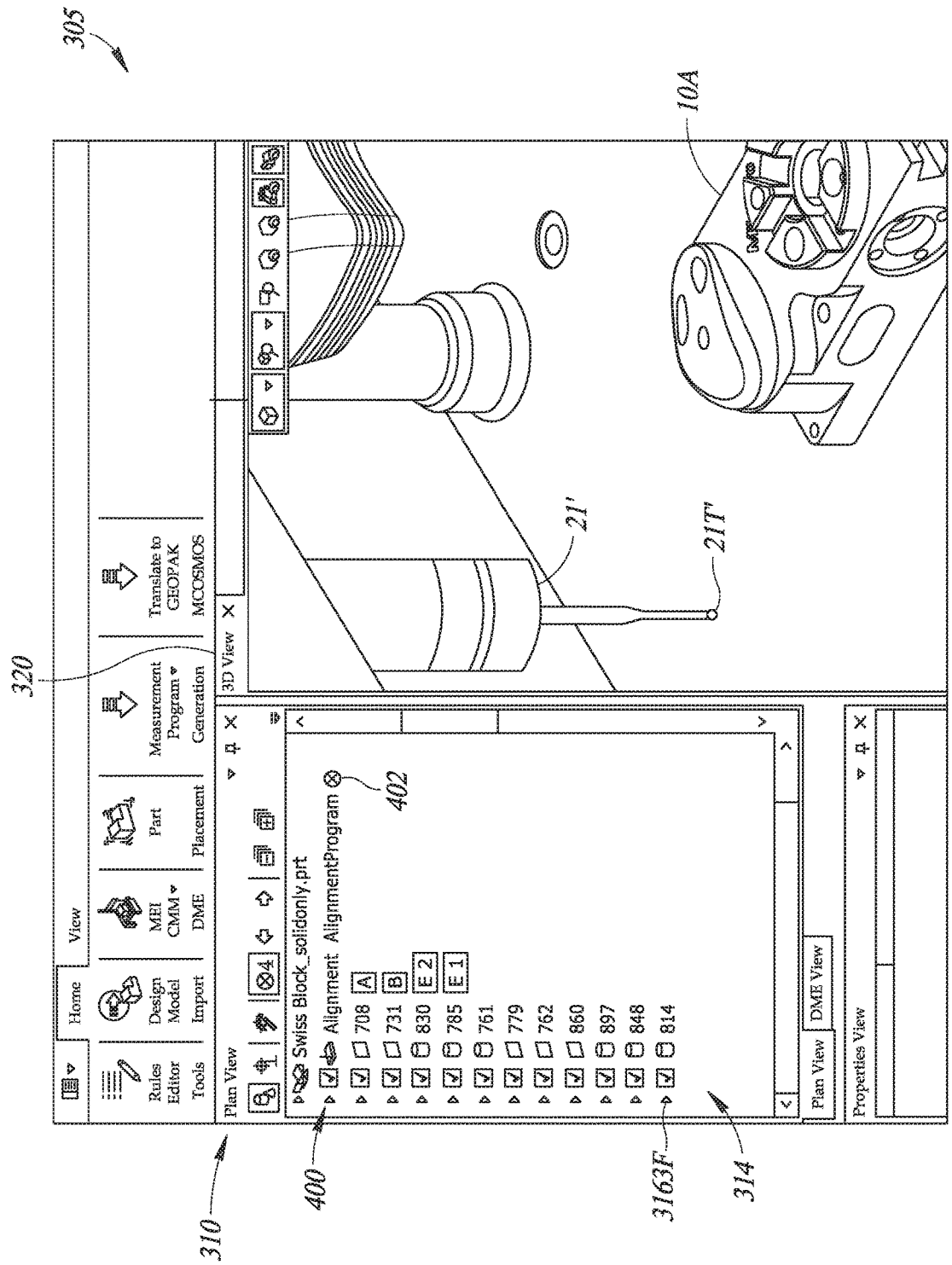
FIG. 8 is a diagram of a user interface in which an editable alignment program plan representation is included (added) in an editable plan representation.

FIG. 8 is a diagram of the user interface 305 in which an editable plan representation 314 of a current workpiece feature inspection plan for a workpiece 10A is displayed in the plan view window 310. A 3-D view of the workpiece 10A is displayed in the 3-D view window 320. In the 3-D view window 320, a 3-D image of the touch probe 21' having the stylus 21T' is displayed adjacent to the workpiece 10A. In various embodiments, by default, the editable plan representation 314, when first displayed in the plan view window 310, includes an editable alignment program plan representation 400 (including any underlying programming instructions and/or routines) as a line item. The editable alignment program plan representation 400 in the illustrated example includes an error icon 402 (e.g., "X" button), which indicates that the editable alignment program plan representation 400 is presently incomplete or invalid, and cannot be used to create a valid alignment program operable to constrain the workpiece location in three dimensions. The error icon 402 may thus in effect prompt a user to complete or validate the editable alignment program plan representation 400 in order to create a valid alignment program. In some embodiments, the editable alignment program plan representation 400 may include automatically determined workpiece features that are to be used in the alignment program plan, in which case no error icon 402 may be displayed. Note that the editable plan representation 314 in FIG. 8 is in a "collapsed" form, with each workpiece feature 316F of the workpiece 10A presented as a single line item. Each workpiece feature 316F, when un-collapsed, may include associated items such as inspection operation representations corresponding to inspection operations to be performed on that workpiece feature according to the current workpiece feature inspection plan.

Figure 9:
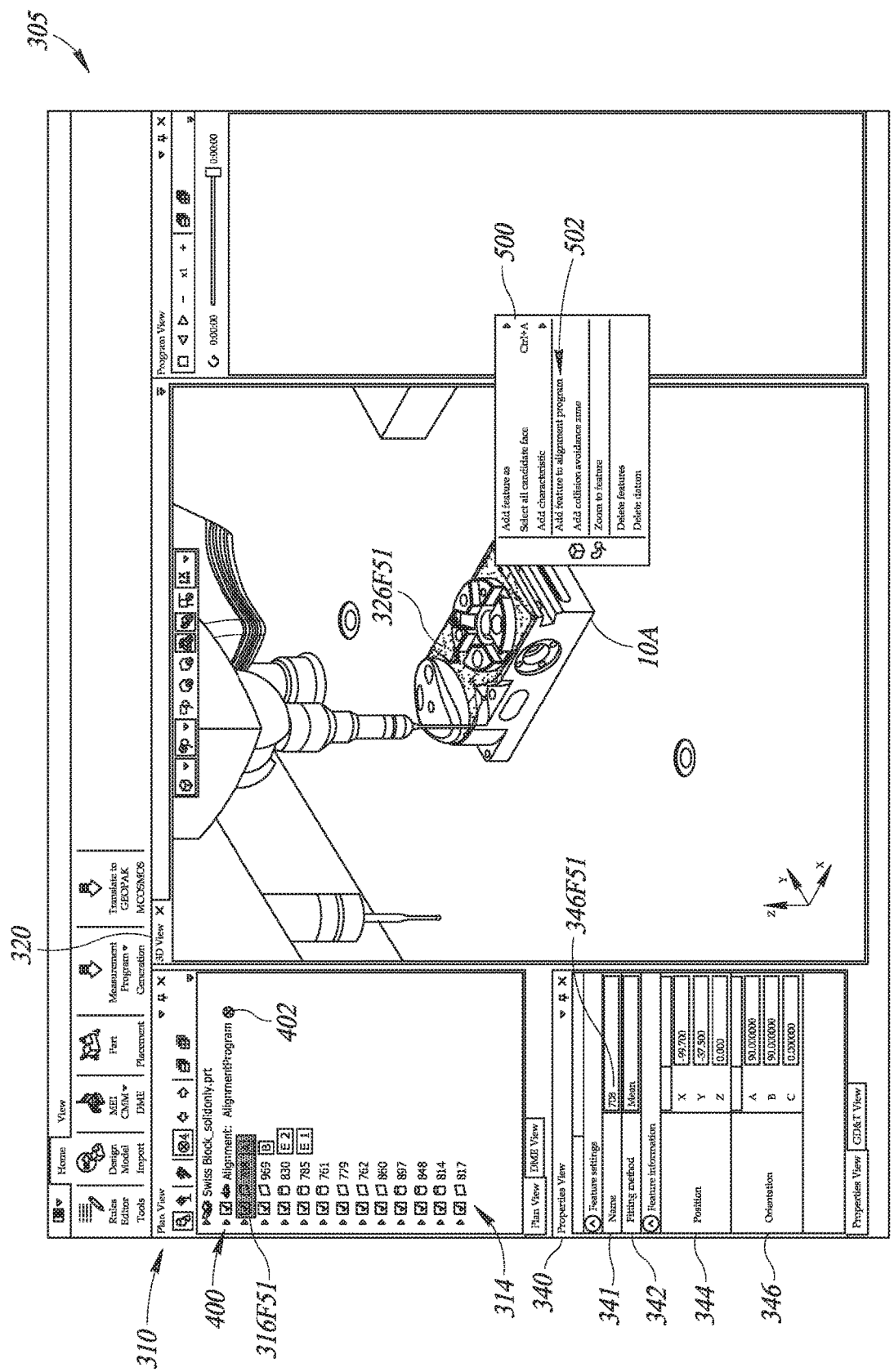
FIGS. 9 and 10 are each a diagram of a user interface in which a first workpiece feature is selected to be added to the editable alignment program plan representation.
Figure 10:
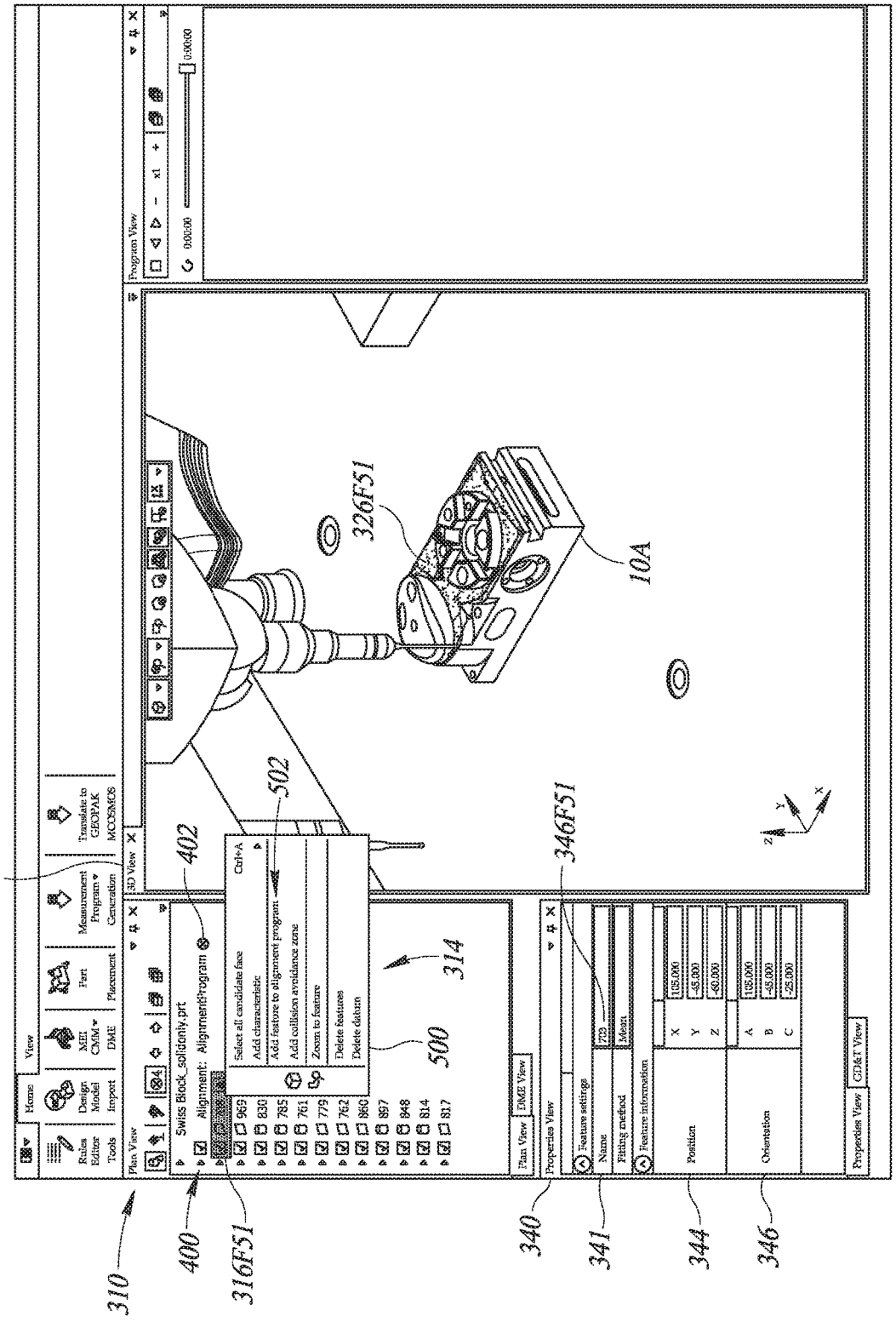

FIGS. 9 and 10 are each a diagram of the user interface 305 in which a first workpiece feature 326F51 (in the 3-D view window 320) is selected to be added to the editable alignment program plan representation 400. In FIG. 9, a user may position a cursor on a surface of the first workpiece feature 326F51 in the 3-D view window 320. The user selects the first workpiece feature 326F51 by, for example, right clicking a mouse button with the cursor placed on the first workpiece feature 326F51, which displays a related context-sensitive menu 500 adjacent to the selected first workpiece feature 326F51. The selected first workpiece feature 326F51 is displayed in a manner distinguishable from the rest of the workpiece 10A, such as in highlight or in different color. From the menu 500, the user may select an "Add feature to alignment program" option 502 to add the selected first workpiece feature 326F51 to the editable alignment program plan representation 400. In FIG. 10, a user may position a cursor on a line item of the first workpiece feature 316F51 displayed as part of the editable plan representation 314 in the plan view window 310. The user selects the first workpiece feature 316F51 by, for example, right clicking a mouse button with the cursor placed on the first workpiece feature 316F51, which displays a related context-sensitive menu 500 adjacent to the selected first workpiece feature 316F51. The selected first workpiece feature 316F51 is displayed in a manner distinguishable from the rest of the editable plan representation 314, such as in highlight or in different color. From the menu 500, the user may selects an "Add feature to alignment program" option 502 to add the selected first workpiece feature 316F51 to the editable alignment program plan representation 400.

Note in FIG. 9 that user selection of the first workpiece feature 326F51 in the 3-D view window 320 results in the corresponding first workpiece feature 316F51 in the plan view window 310 being "selected," as shown in highlight for example. Similarly, in FIG. 10, user selection of the first workpiece feature 316F51 in the plan view window 310 results in the corresponding first workpiece feature 326F51 in the 3-D view window 320 being "selected," as shown in highlight for example. In exemplary embodiments, the editable plan representation 314 displayed in the plan view window 310 and the 3-D view displayed in the 3-D view window 320 are automatically responsive to editing operations, in real-time synchronization, regardless of whether the editing operations are performed in the plan view window 310 or in the 3-D view window 320.

In FIGS. 9 and 10, selection of the first workpiece feature 326F51/316F51 displays a "Properties View" window 340 in the user interface 305, which lists information about the selected first workpiece feature 326F51/316F51. In the illustrated example, the properties view window 340 includes a name field 341 listing the first workpiece feature 346F51 by its ID number "708," a fitting method field 342 indicating that a "mean" fitting method (which in this case is a short name indicating a fitting method commonly referred to as a least squares fitting method) will be used with the associated measured point set, in order to characterized the first workpiece feature. The "Properties View" window 340 may also include a position field 344 indicating the XYZ coordinates of the feature (if applicable), and an orientation field 346 indicating the ABC angular orientation (if applicable), of the feature. To the extent that the properties view window 340 lists information about the first workpiece feature added to the editable alignment program plan representation 400, the properties view window 340 may be considered as forming part of the editable alignment program plan representation 400. Also, though the editable alignment program plan representation 400 is displayed in the editable plan representation 314 in the illustrated embodiment, such is not limiting and the editable alignment program plan representation 400 may be displayed independently of the editable plan representation 314, or may be displayed distributedly and displayed only partially in the editable plan representation 314 and partially in any area of the user interface 305 other than the editable plan representation 314.

Figure 11:
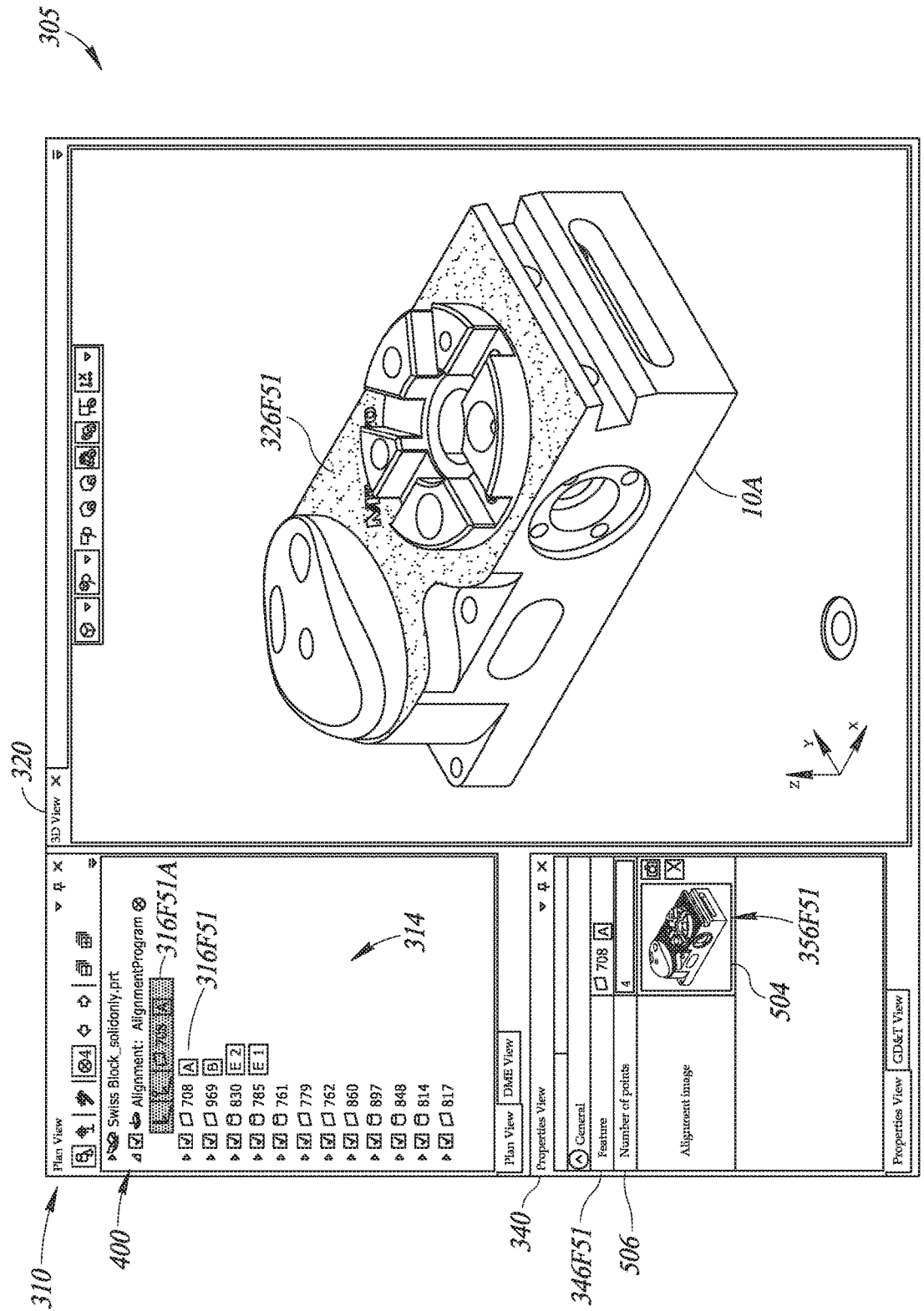
FIG. 11 is a diagram of a user interface in which the editable alignment program plan representation is updated to now include the first workpiece feature, and a screenshot of the first workpiece feature is taken as displayable in a 3-D view (for later use in an alignment program generated based on the alignment program plan representation)

FIG. 11 is a diagram of the user interface 305 in which the editable alignment program plan representation 400 is updated to now include the first workpiece feature 316F51A, shown in highlight for example to indicate its addition to the editable alignment program plan representation 400. In the illustrated embodiment, the first workpiece feature 316F51A added to the editable alignment program plan representation 400 is shown separately from the first workpiece feature 316F51 included in the editable plan representation 314. The properties view window 340 is also updated to show, in a "Number of points" field 506, that the first workpiece feature 346F51 added to the editable alignment program plan representation 400 is to be defined by four ("4") measurement points on the first workpiece feature, which is a plane in the illustrated example.

In various embodiments, addition of the first workpiece feature 316F51A to the editable alignment program plan representation 400 automatically captures and saves a screenshot 356F51 of the first workpiece feature 326F51 as displayable in a 3-D view. Alternatively, the screenshot 356F51 may be taken manually upon a specific user command. Known CAD view zooming techniques may be used to zoom in the 3-D view window 320 to capture an enlarged image of the added first workpiece feature 356F51. In the illustrated embodiment the screenshot 356F51 is displayed in an alignment image sub-window 504 in the properties view window 340. As will be more fully described below, the screenshot 356F51 of the first workpiece feature added in the editable alignment program plan representation 400 may be later recalled to guide a user to define the first workpiece feature on an actual workpiece placed on an actual CMM in an alignment program which is generated based on the alignment program plan representation 400.

Figure 12:
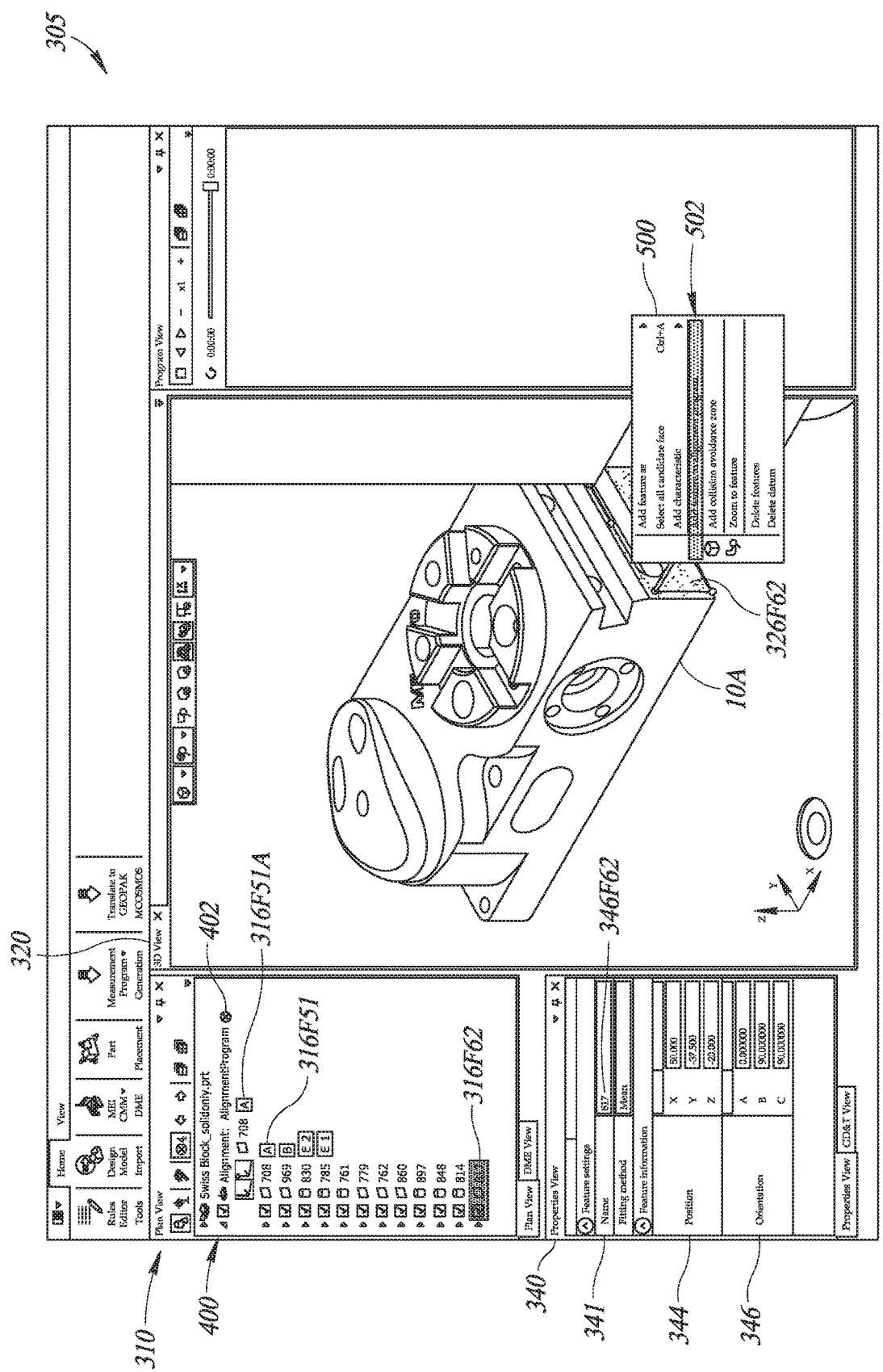
FIG. 12 is a diagram of a user interface in which a second workpiece feature is selected to be added to the editable alignment program plan representation.

FIG. 12 is a diagram of the user interface 305 in which a second workpiece feature 326F62 is selected to be added to the editable alignment program plan representation 400. As before, selection may be made either in the plan view window 310 or in the 3-D view window 320, resulting in the selection being indicated both in the plan view window 310 where the second workpiece feature 316F62 is highlighted and in the 3-D view window 320 where the second workpiece feature 326F62 is highlighted. The program view window 340 may be updated to show the selected second workpiece feature 346F62, denoted by its ID number "817," in the name field 340, and to show the position and orientation information of the second workpiece feature in the position and orientation fields 344, 346. From the context-sensitive menu 500 displayed according to user operation described above, the user selects the "Add feature to alignment program" 502 option to add the second workpiece feature 316F62/326F62 to the editable alignment program plan representation 400.

Figure 13:
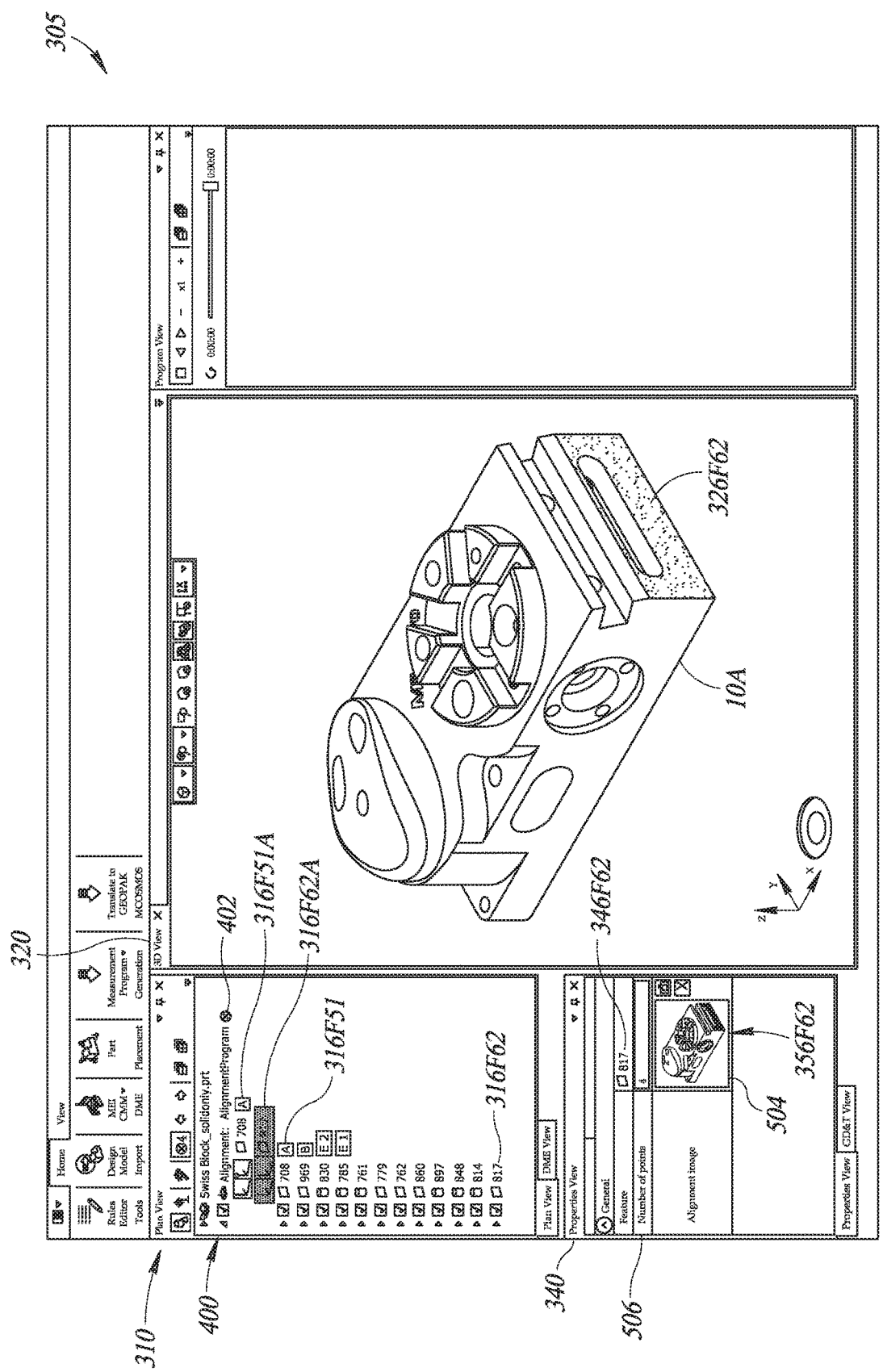
FIG. 13 is a diagram of a user interface in which the editable alignment program plan representation is updated to now include the first and second workpiece features.

FIG. 13 is a diagram of the user interface 305 in which the editable alignment program plan representation 400 is updated to now include the second workpiece feature 316F62A in addition to the first workpiece feature 316F51A previously added to the editable alignment program plan representation 400. As before, the first and second workpiece features 316F51A and 316F62A added to the editable alignment program plan representation 400 are shown separately from the first and second workpiece features 316F51 and 316F62 included in the editable plan representation 314. At this time, also as before, a screenshot 356F62 of the added second workpiece feature 326F62 is captured, saved and displayed in the alignment image sub-window 504 in the properties view window 340. The number-of-points field 506 of the properties view window 340 indicates that the second workpiece feature 346F62 is defined by four measurement points on the second workpiece feature. The screenshot 356F62 will be later recalled to guide a user in defining the second workpiece feature (based on 4 measurement points) on an actual workpiece on an actual CMM. Note that the editable alignment program plan representation 400 is still not complete, as indicated by the error icon 402 displayed adjacent thereto. This is because the selected first and second workpiece features are not yet enough to establish alignment by constraining a workpiece location in three dimensions.

Figure 14:
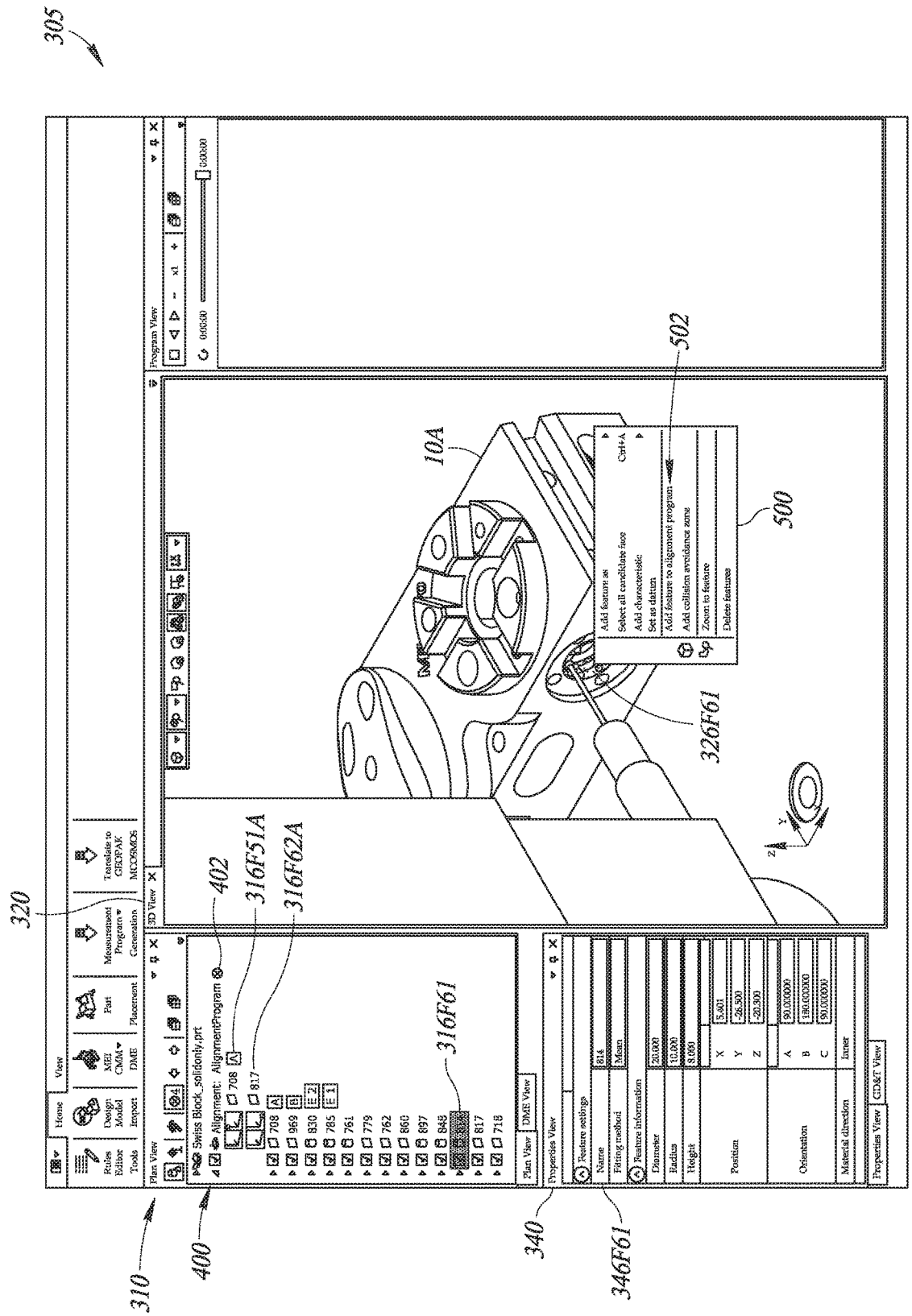
FIG. 14 is a diagram of a user interface in which a third (invalid) workpiece feature is selected to be added to the editable alignment program plan representation.

FIG. 14 is a diagram of the user interface 305 in which a third (invalid) workpiece feature 326F61 is selected to be added to the editable alignment program plan representation 400. In the illustrated embodiment, the third workpiece feature 326F61 is a cylinder that does not intersect with either the first or second workpiece feature and is invalid for creating an alignment program that unambiguously locates the workpiece 10A on an actual CMM. The user, being unaware of the invalid nature of the third workpiece feature 326F61 for the purpose of creating an alignment program, selects the third workpiece feature 326F61 (e.g., by right clicking a mouse button with the cursor placed on the third workpiece feature 326F61). The selection causes highlighting both the third workpiece feature 326F61 in the 3-D view window 320 and the corresponding third workpiece feature 316F61 in the plan view window 310. Further, the properties view window 340 is updated to display information about the selected third workpiece feature 346F1 denoted by its ID number "814." From the related context-sensitive menu 500 displayed according to user operation as described above, the user selects the "Add feature to alignment program" option 502.

Figure 15:
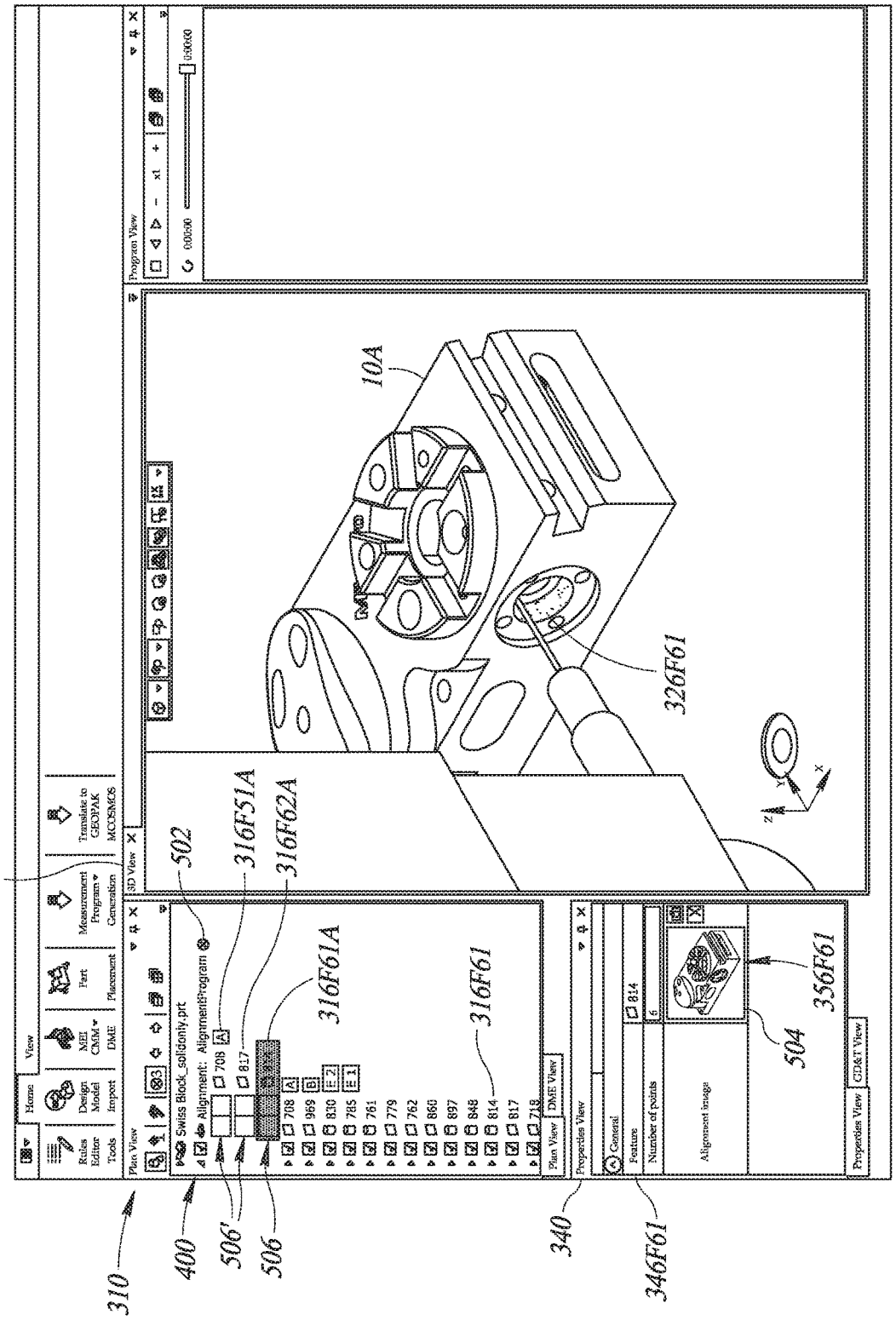
FIG. 15 is a diagram of a user interface in which the third (invalid) workpiece feature is indicated as invalid in the editable alignment program plan representation.

FIG. 15 is a diagram of the user interface 305 in which the third (invalid) workpiece feature 316F61A is added but is indicated as invalid in the editable alignment program plan representation 400. Specifically, though the editable alignment program plan representation 400 is updated to now include the third workpiece feature 316F61A, an error indication 506 is included to signify that the third workpiece feature 316F61A is invalid for the purpose of forming a valid alignment program. In the illustrated embodiment, the error indication 506 consists of a blank box, whereas the box should otherwise include a relevant measurement icon if the third workpiece feature 316F61A is valid. In the illustrated embodiment, boxes 506' adjacent to the first and second workpiece features 316F51A and 316F62A are also updated to be blank boxes to indicate that the addition of the third workpiece feature 316F61A rendered the first and second workpiece features 316F51A and 316F62A also invalid for the purpose of generating a valid alignment program with the third workpiece feature 316F61A. As shown in FIG. 14, the boxes next to the first and second workpiece features 316F51A and 316F62A respectively included relevant measurement icons to indicate that they were valid before the third (invalid) workpiece feature 316F61A was added. Referring back to FIG. 15, note also that the error icon 502 remains displayed next to the editable alignment program plan representation 400, indicating that the editable alignment program plan representation 400 is still incomplete/invalid. In the illustrated embodiment, the properties view window 340 includes information about the (invalid) third workpiece feature 346F61, such as its feature name denoted by its ID number "814" and a screenshot 356F61 of the third workpiece feature 346F61 in the alignment image sub-window 504. In other embodiments, the properties view window 340 need not be updated to display information about an added workpiece feature if the added workpiece feature is invalid for the purpose of generating a valid alignment program. In various embodiments, the computing system 105 (see FIG. 2A) automatically performs geometric analysis of the added workpiece feature relative to previously added/included workpiece feature(s), if any, to determine whether the added workpiece feature is a valid or invalid workpiece feature that provides required information for creating an alignment program.

Figure 16:
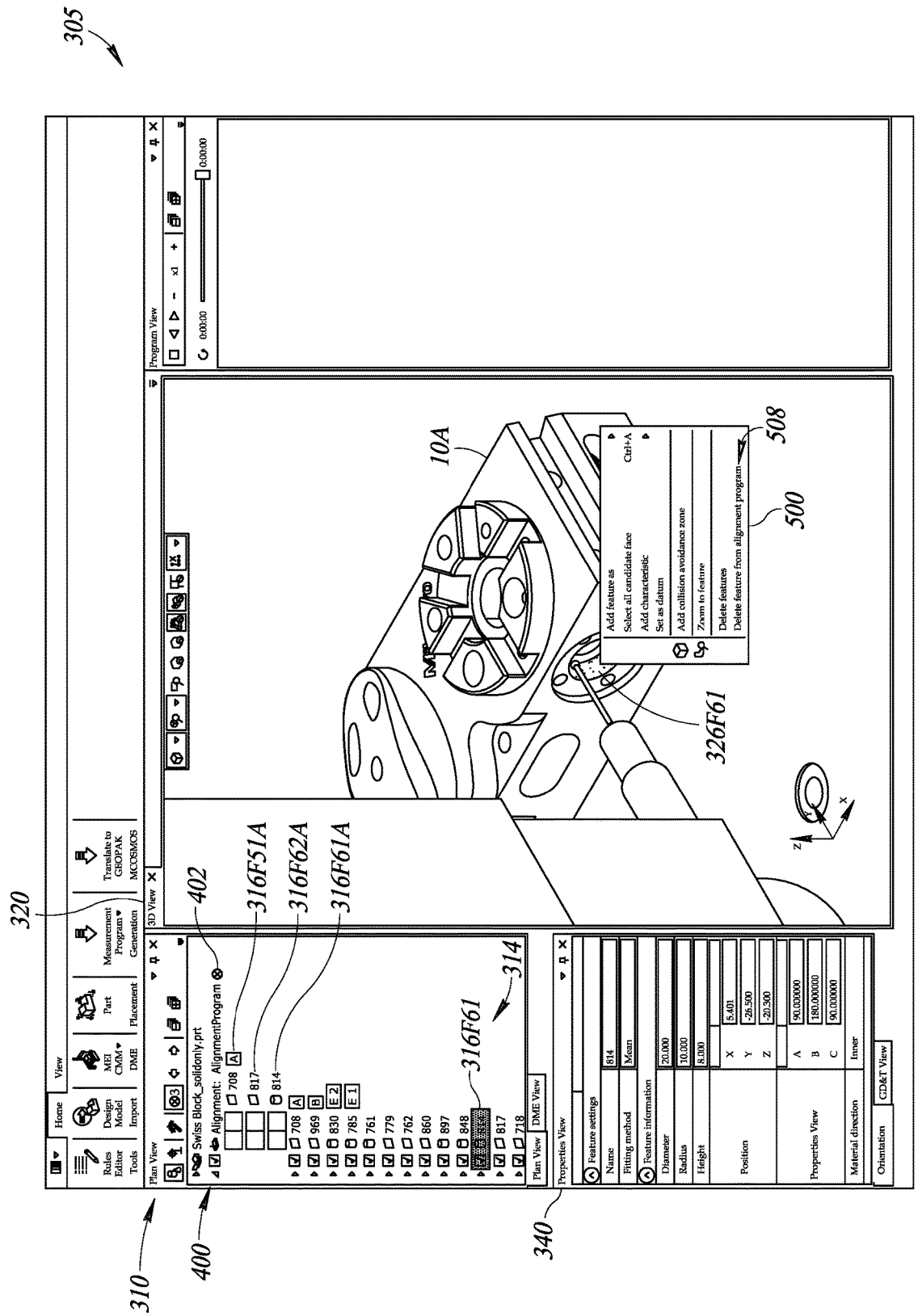
FIGS. 16 and 17 are each a diagram of a user interface in which the third (invalid) workpiece feature is selected to be deleted from the editable alignment program plan representation.
Figure 17:
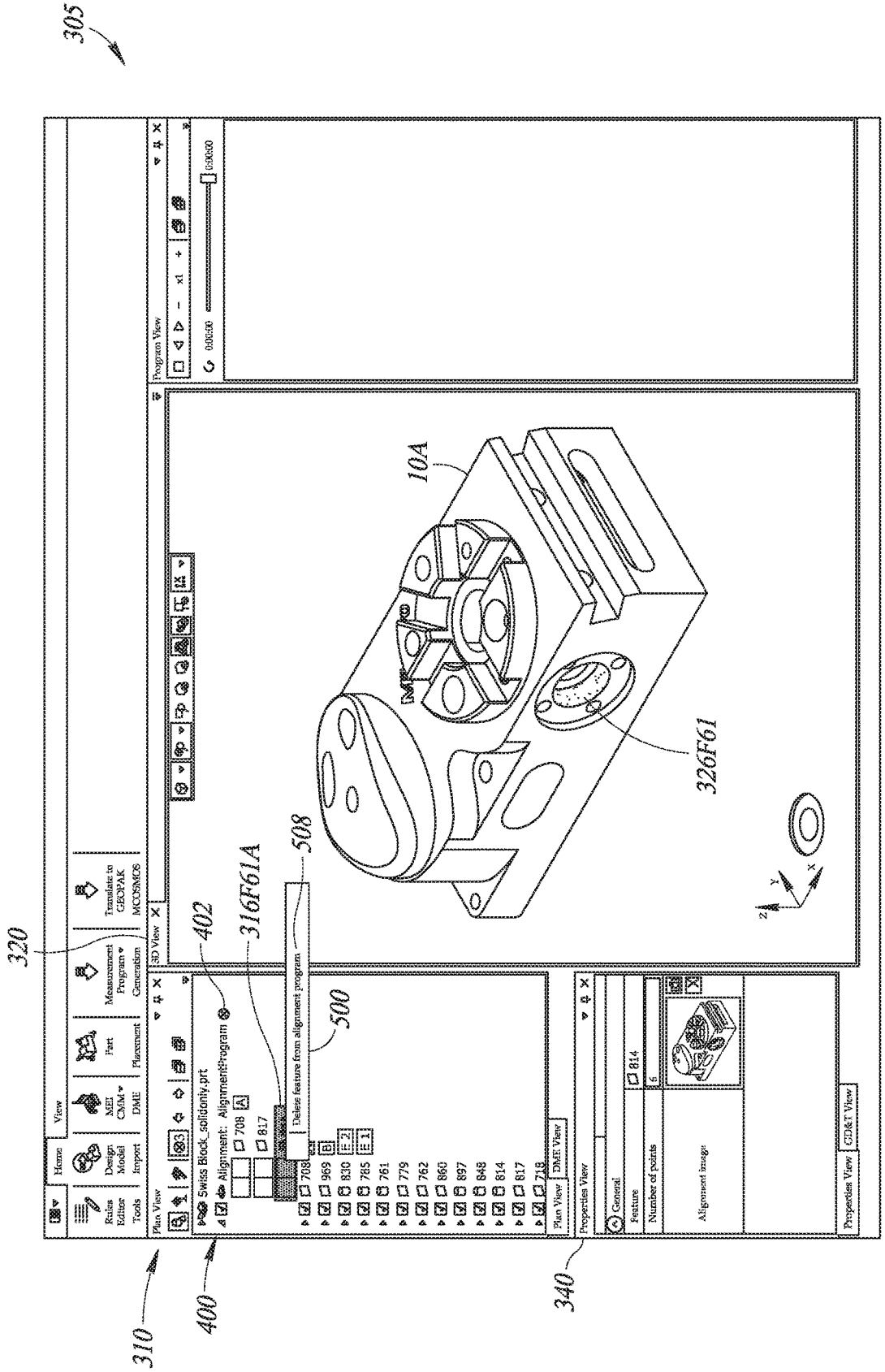

FIGS. 16 and 17 are each a diagram of the user interface 305 in which the third (invalid) workpiece feature 326F61/316F61A is selected to be deleted from the editable alignment program plan representation 400. Specifically, upon realizing that the third workpiece feature is invalid, in FIG. 16, the user selects the third workpiece feature 326F61 in the 3-D view window 320 and selects a "Delete feature from alignment program" option 508 from the displayed context-sensitive menu 500. Alternatively, as shown in FIG. 17, the user selects the third workpiece feature 316F61A in the plan view window 310 and selects the "Delete feature from alignment program" option 508 from the displayed context sensitive menu 500.

Figure 18:
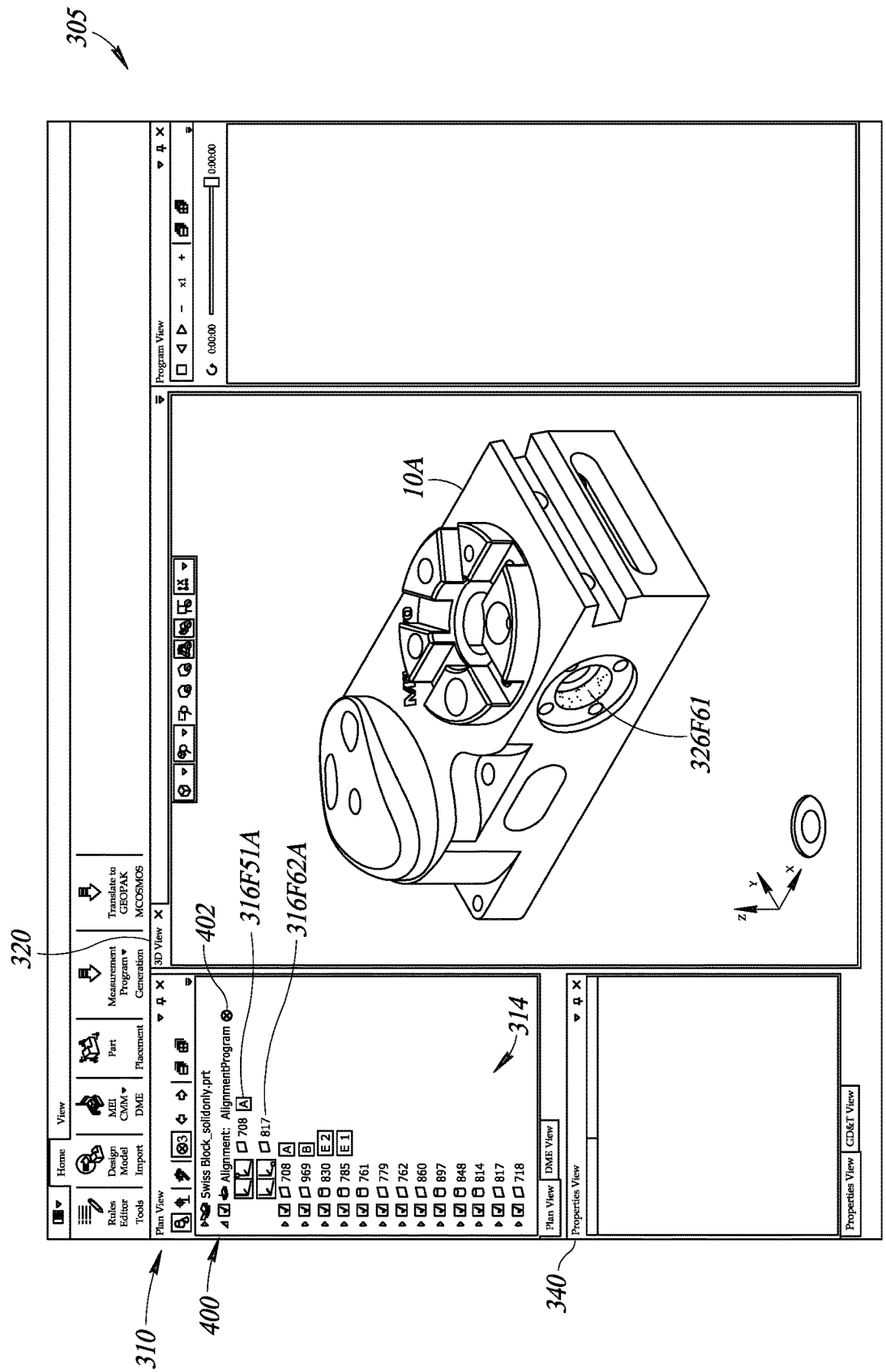
FIG. 18 is a diagram of a user interface in which the editable alignment program plan representation is updated to not include the third (invalid) workpiece feature.

FIG. 18 is a diagram of the user interface 305 in which the editable alignment program plan representation 400 is updated to not include the third (invalid) workpiece feature. The third workpiece feature 316F61A previously included in the editable alignment program plan representation 400 (see FIG. 17) is now deleted from the editable alignment program plan representation 400. The error icon 402 is still displayed next to the editable alignment program plan representation 400, prompting the user to select another workpiece feature in order to create an alignment program.

Figure 19:
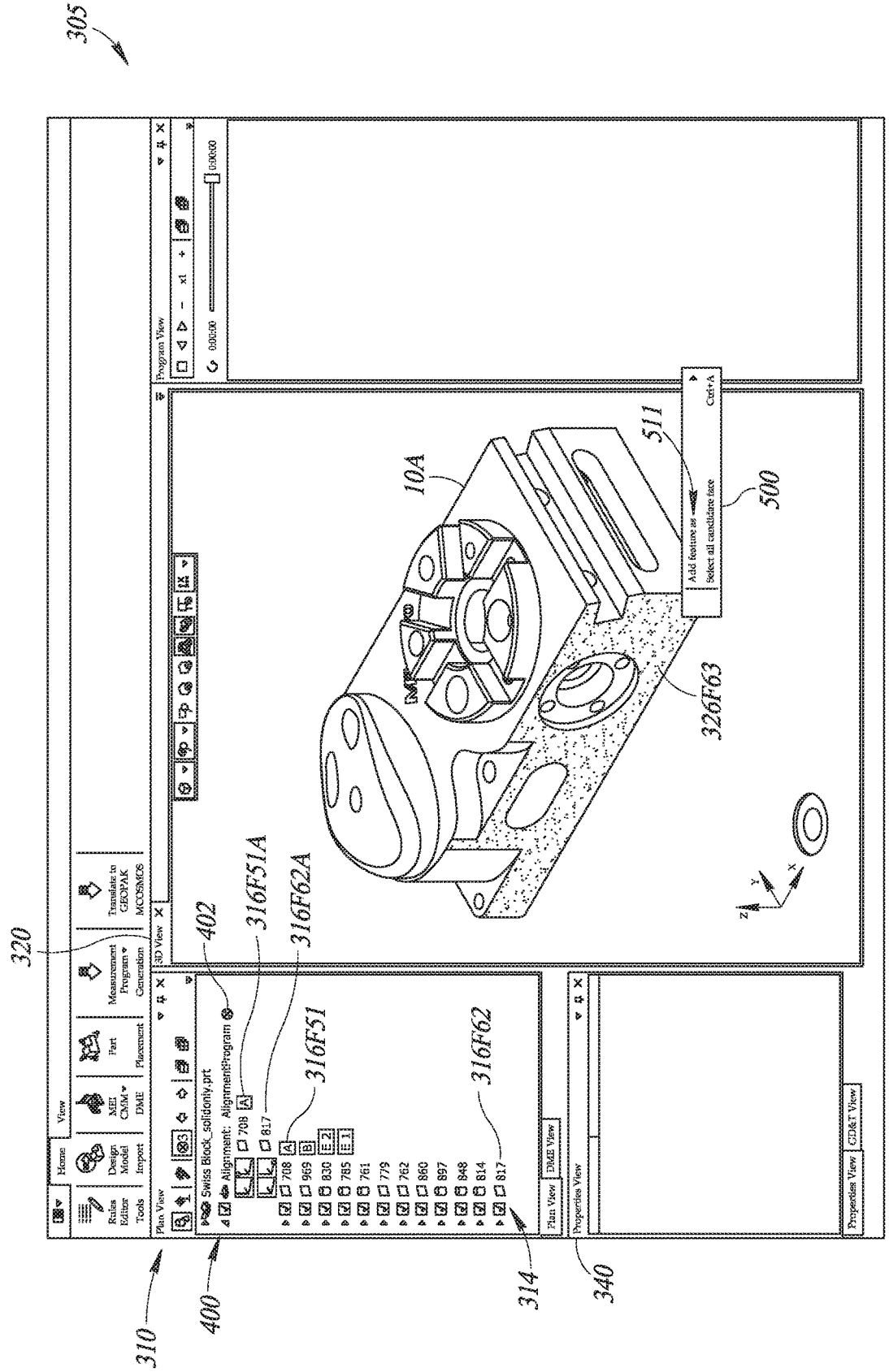
FIG. 19 is a diagram of a user interface in which a fourth workpiece feature is selected (to be added to the editable alignment program plan representation)

FIG. 19 is a diagram of the user interface 305 in which a fourth workpiece feature 326F63 is selected in the 3-D view window 320, to be added to the editable alignment program plan representation 400. The user places a cursor on the fourth workpiece feature 326F63 and selects (e.g., right clicks on) the fourth workpiece feature 326F63, which displays a related context-sensitive menu 510 as shown. In the illustrated example, the selected fourth workpiece feature 326F63 is not yet defined and thus not included in the editable plan representation 314 (including underlying programming instructions and/or routines) as displayed in the plan view window 310. As such, the context sensitive menu 510 in this example does not include the "Add feature to alignment program" option 508 included when a fully defined workpiece feature is selected (as in FIG. 16 for example). Instead, the context sensitive menu 510 in this example includes an "Add feature as" option 511, which prompts the user to define the selected fourth workpiece feature 326F63 as a new workpiece feature.

Figure 20:
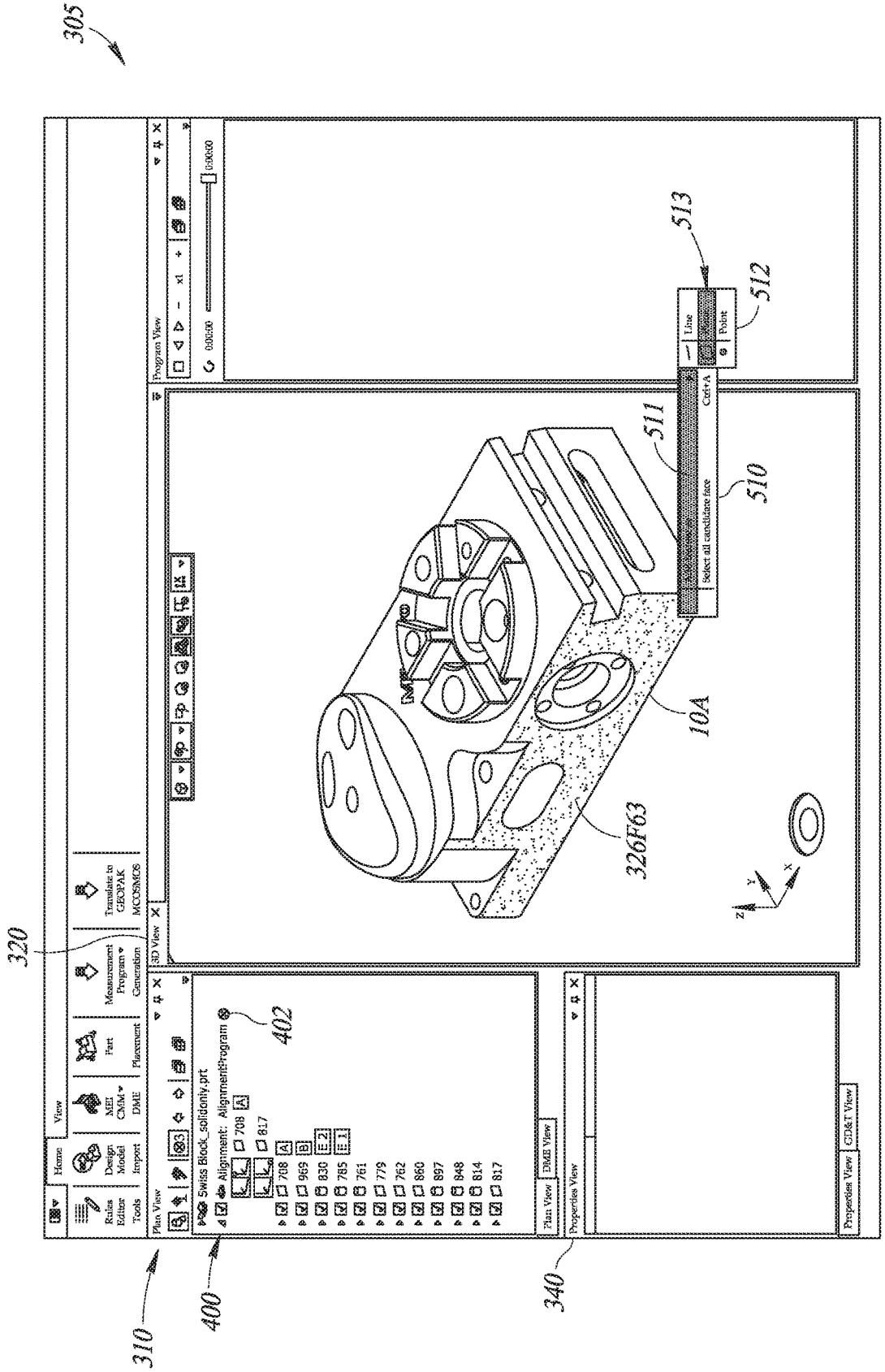
FIG. 20 is a diagram of a user interface in which a geometric feature type of the fourth workpiece feature, not previously defined, is defined (e.g., "plane")

FIG. 20 is a diagram of the user interface 305 in which a geometric type sub-menu 512 including "Line," "Plane" and "Point" options is displayed in response to user selection of (e.g., hovering a cursor over) the "Add feature as" option 511 in FIG. 19. The geometric feature type of the selected fourth workpiece feature 326F63 is a plane, so the user selects and activates the "Plane" option 513 from the geometric type sub-menu 512.

Figure 21:
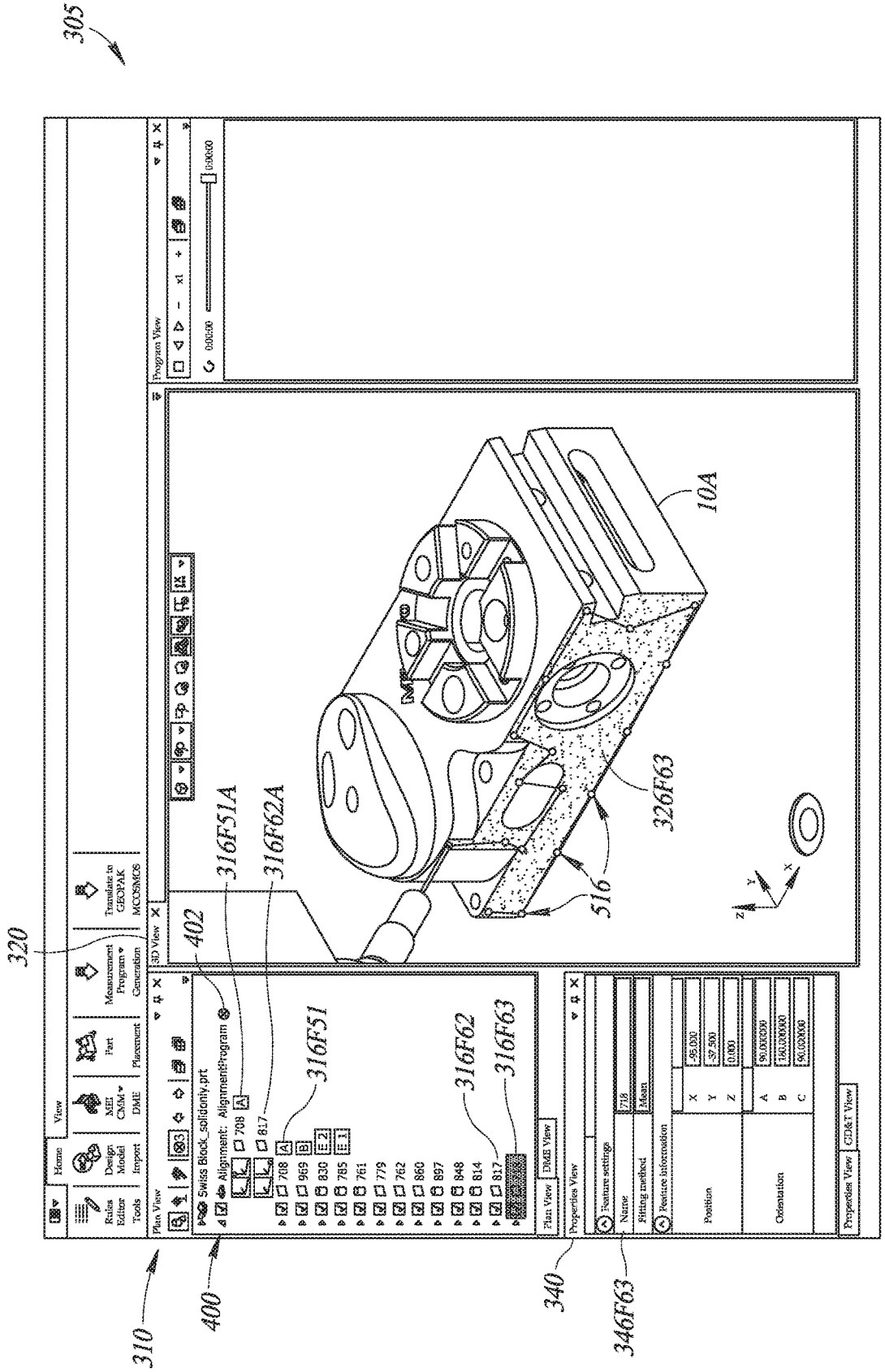
FIG. 21 is a diagram of a user interface in which the fourth workpiece feature (e.g., plane) is defined by a set of feature points.

FIG. 21 is a diagram of the user interface 305 in which the fourth workpiece feature 326F63 is defined by a set of feature points 516. For example, the inspection path/sequence manager 206 and other portions of the computing system 105 may automatically plan a probe path to define/measure the selected fourth workpiece feature 326F63 and assign the feature points 516 to trace the planned probe path. The defined fourth workpiece feature 316F63 is now included in the editable plan representation 314 displayed in the plan view window 310. Also, the fourth workpiece feature 316F63 is highlighted in the editable plan representation 314 to indicate that it is selected, correspondingly to the fourth workpiece feature 326F63 selected and highlighted in the 3-D view window 320. The properties view 340 is updated to include information about the fourth workpiece feature 346F63, denoted by its ID number "718."

Figure 22:
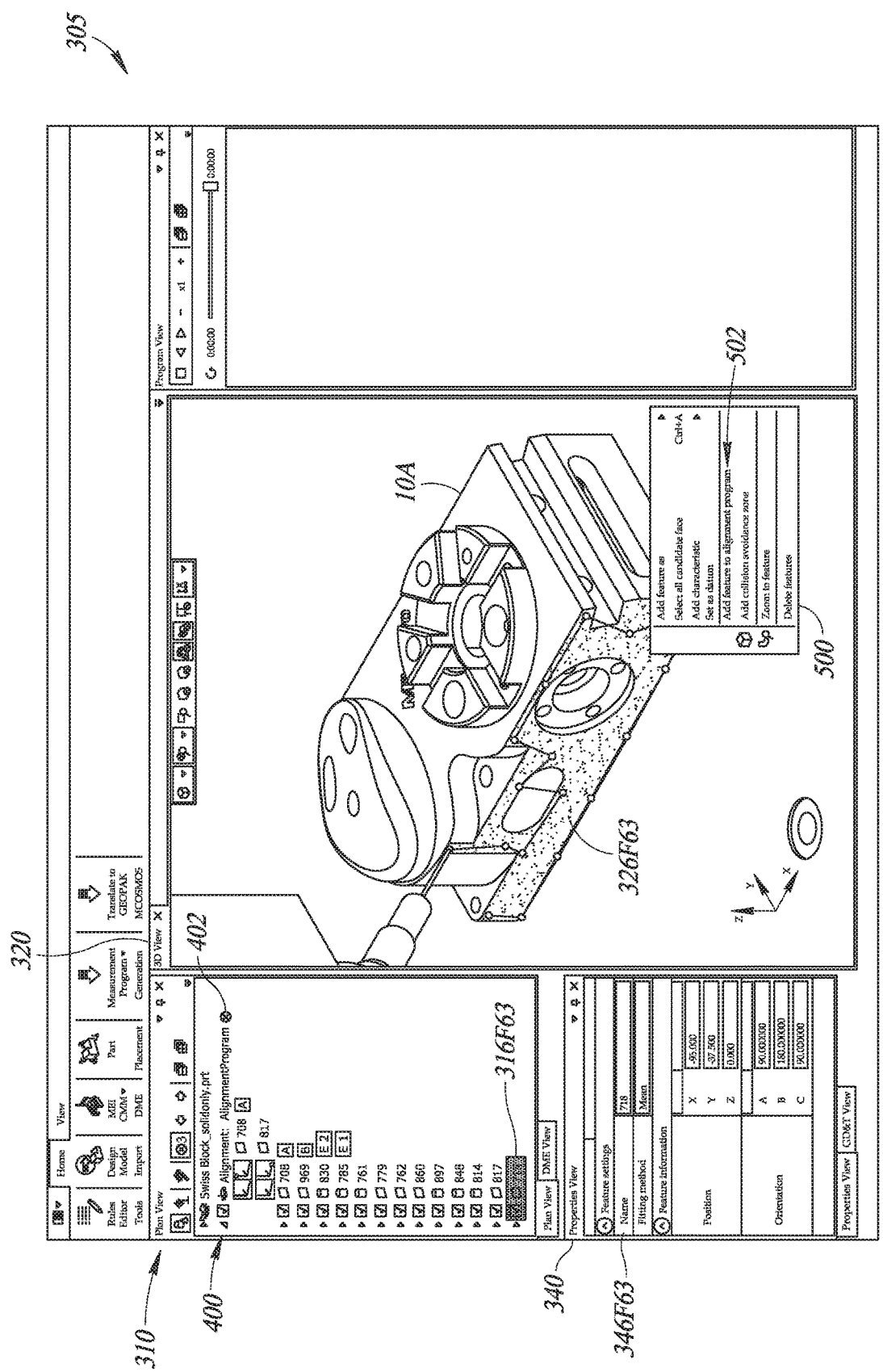
FIG. 22 is a diagram of a user interface in which the fourth workpiece feature, now fully defined, is selected to be added to the editable alignment program plan representation.

FIG. 22 is a diagram of the user interface 305 in which the context sensitive menu 500 is displayed in response to user selection of the fourth workpiece feature 326F63, now fully defined, in the 3-D view window 320. From the menu 500, the user selects the "Add feature to alignment program" option 502.

Figure 23:
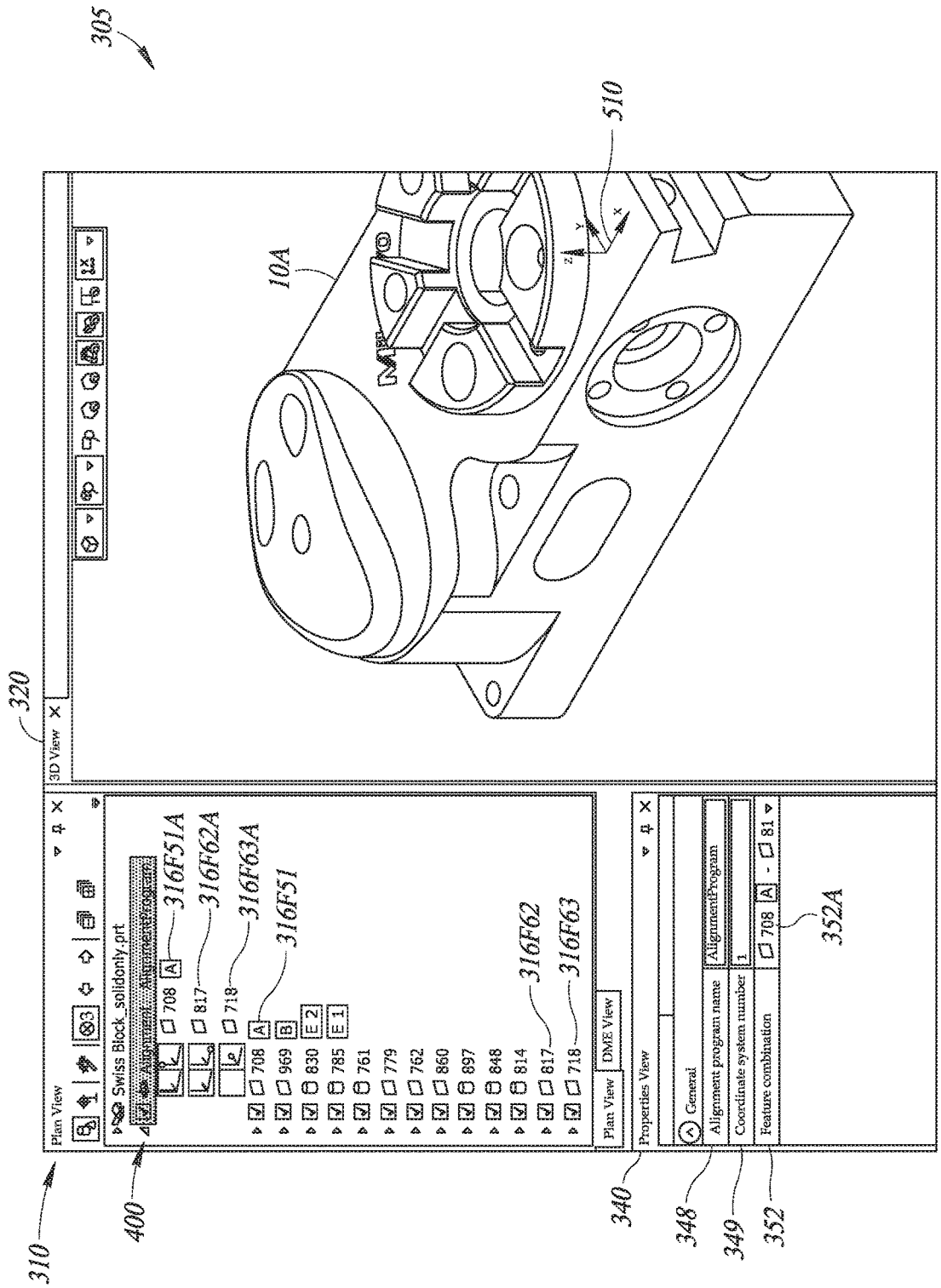
FIG. 23 is a diagram of a user interface in which the editable alignment program plan representation is updated to now include the first, second and fourth workpiece features, and properties of the underlying alignment program plan are shown.

FIG. 23 is a diagram of the user interface 305 in which the editable alignment program plan representation 400 is updated to now include the fourth workpiece feature 316F63A in addition to the first and second workpiece features 316F51A and 316F62A previously added. The error icon 402 previously shown next to the editable alignment program plan representation 400 is now removed because the first, second and fourth workpiece features form a sufficient and proper combination of workpiece features for the purpose of creating a valid alignment program that unambiguously locates the workpiece 10A on an actual CMM. Though not illustrated, as before, a screenshot of the added fourth workpiece feature 326F63 is captured and saved as displayable in a 3-D view. The properties view window 340 is updated to list information about the now complete editable alignment program plan representation 400. The updating may be prompted, for example, by the user selecting the "AlignmentProgram" line item 400 in the plan view window 310. In the properties view window 340, an alignment program name field 348 lists a name of the editable alignment program plan representation 400, which may be automatically assigned; a coordinate system number field 349 indicates an ID number of the coordinate system (X-Y-Z coordinate system 510 displayed in the 3-D view window 320) defined based on the editable alignment program plan representation 400; and a feature combination field 352 lists the combination and order of the workpiece features to be measured to define the coordinate system 510. The feature combination field 352 partially displays the current combination and order 352A of the first, second and fourth workpiece features denoted by their ID numbers "708," "817" and "718" in this order.

Figure 24:
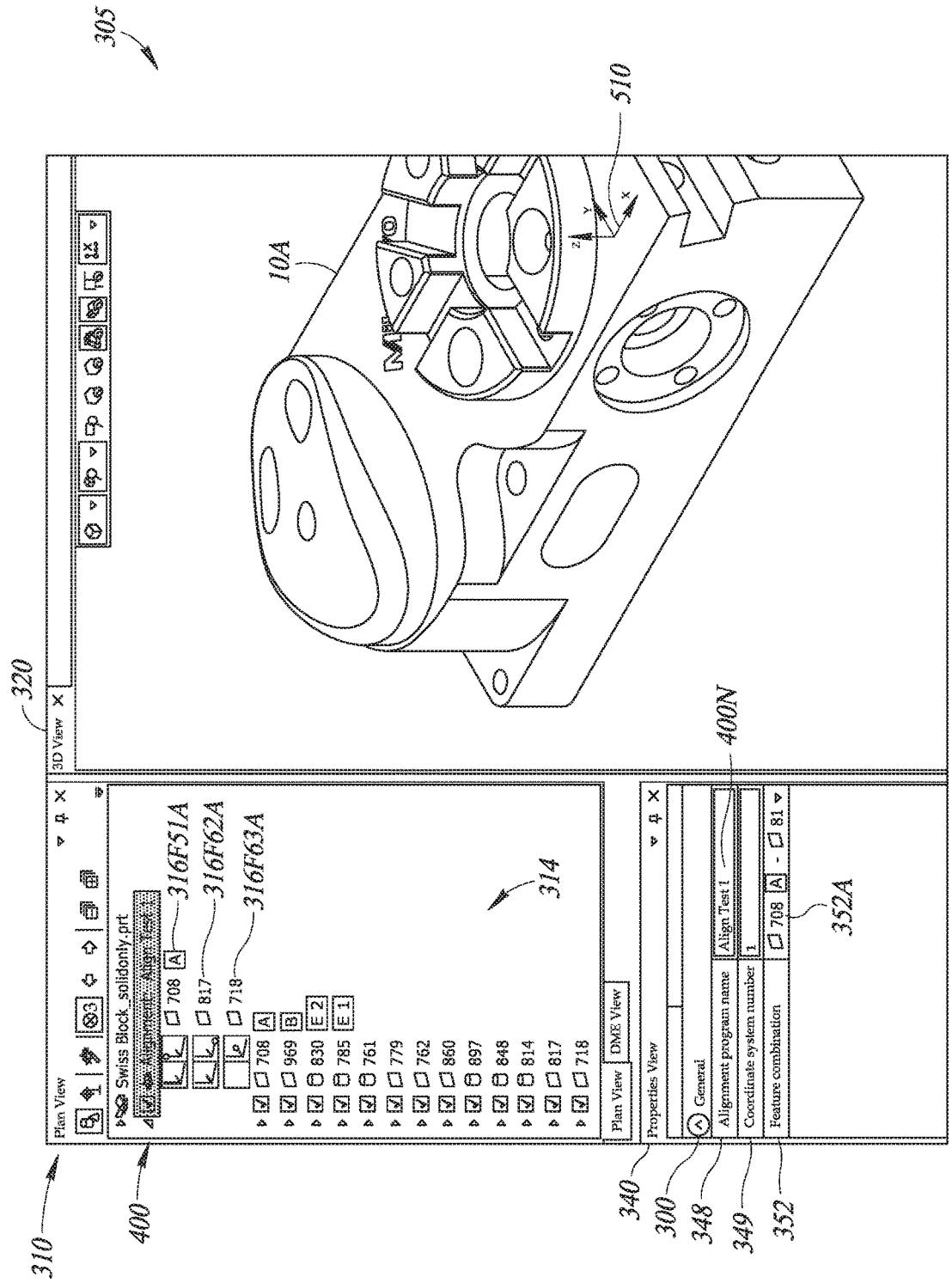
FIG. 24 is a diagram of a user interface in which a name of the alignment program plan representation of FIG. 23 is changed (updated)

FIG. 24 is a diagram of the user interface 305 in which the name of the alignment program plan representation 400

("AlignmentProgram" in the name field 348 in FIG. 23) is changed to a new name, "Align Test 1" 400N. The user may type in the new name in the name field 348. Note that the editing in the properties view window 340, which may be considered to form part of the editable alignment program plan representation 400, is automatically reflected in the editable plan representation 314 displayed in the plan view window 310, which now shows the editable alignment program plan representation 400 by its new named "Align Test 1."

Figure 25:
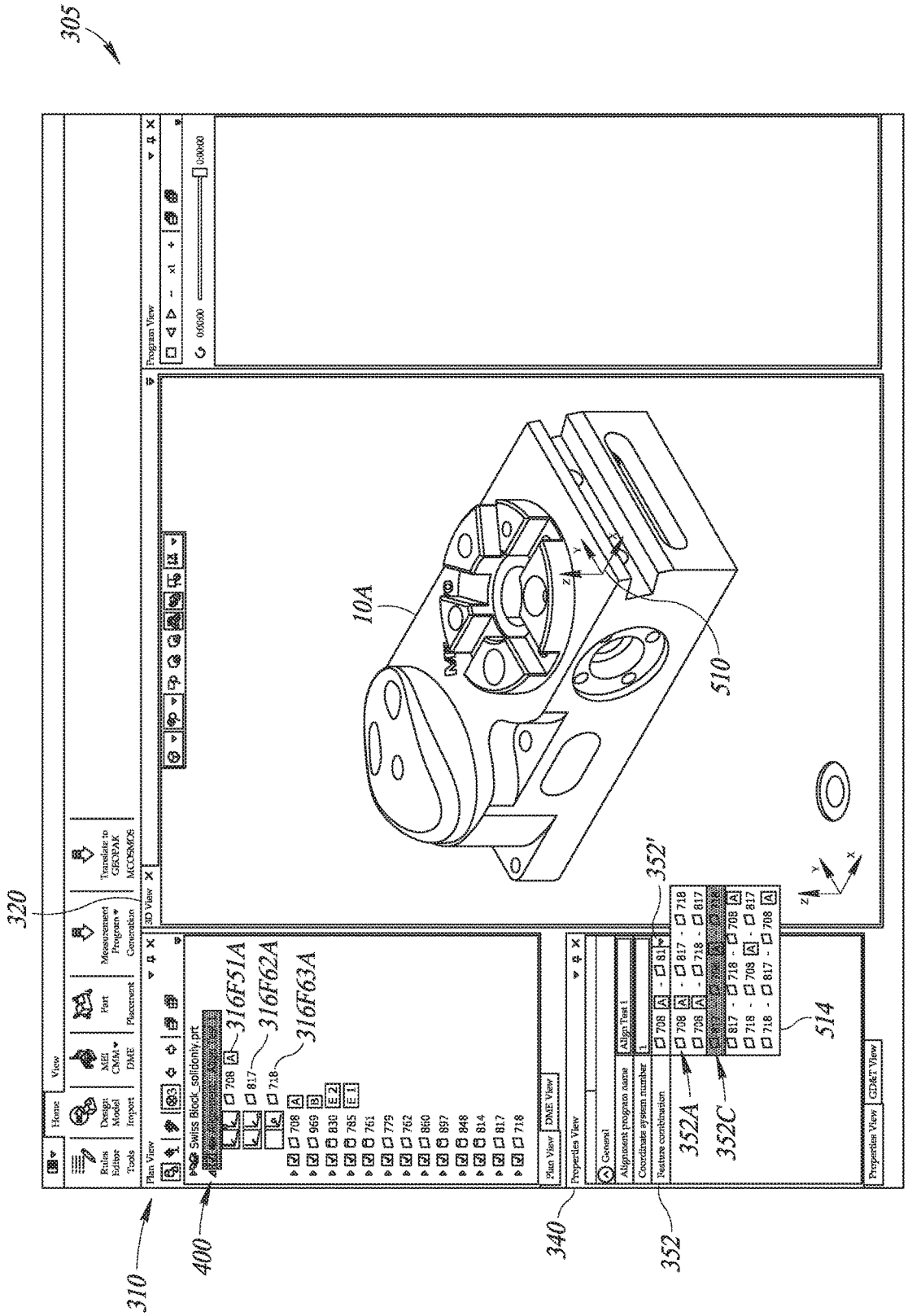
FIG. 25 is a diagram of a user interface in which a new measurement order of the three workpiece features in the editable alignment program plan representation is selected.

FIG. 25 is a diagram of the user interface 305 in which the feature combination field 352, which previously partially displayed the combination and order 352A of the first, second and fourth workpiece features, is expanded to list all possible combinations and orders of the three workpiece features in a dropdown menu 514. The dropdown menu 514 may be displayed in response to, for example, a user clicking on a down arrow 352' displayed next to the feature combination field 352. From the dropdown menu 514, the user selects the third combination and order 352C, which is then highlighted, in which the second, first and fourth workpiece features denoted by their ID numbers "817," "708" and "718" are to be measured in this order. For example, the user may select an order that places the most accurate workpiece feature to be measured first, or may reorder the workpiece features in order to reorient the resulting coordinate axes, if desired. Alternatively to selecting an order out of multiple options included in the dropdown menu 514, the user may drag and move to a new location any of the icons associated with the first, second and fourth workpiece features 316F51A, 316F62A and 316F63A in the editable alignment program plan representation 400 as displayed in the plan view window 310, to rearrange the measurement order of these three workpiece features. Further alternatively, the user may drag and move to a new location any of the icons "708," "817" and "718" denoting the first, second and fourth workpiece features in the feature combination field 352 in the properties view window 340 to rearrange the measurement order of the workpiece features.

Figure 26:
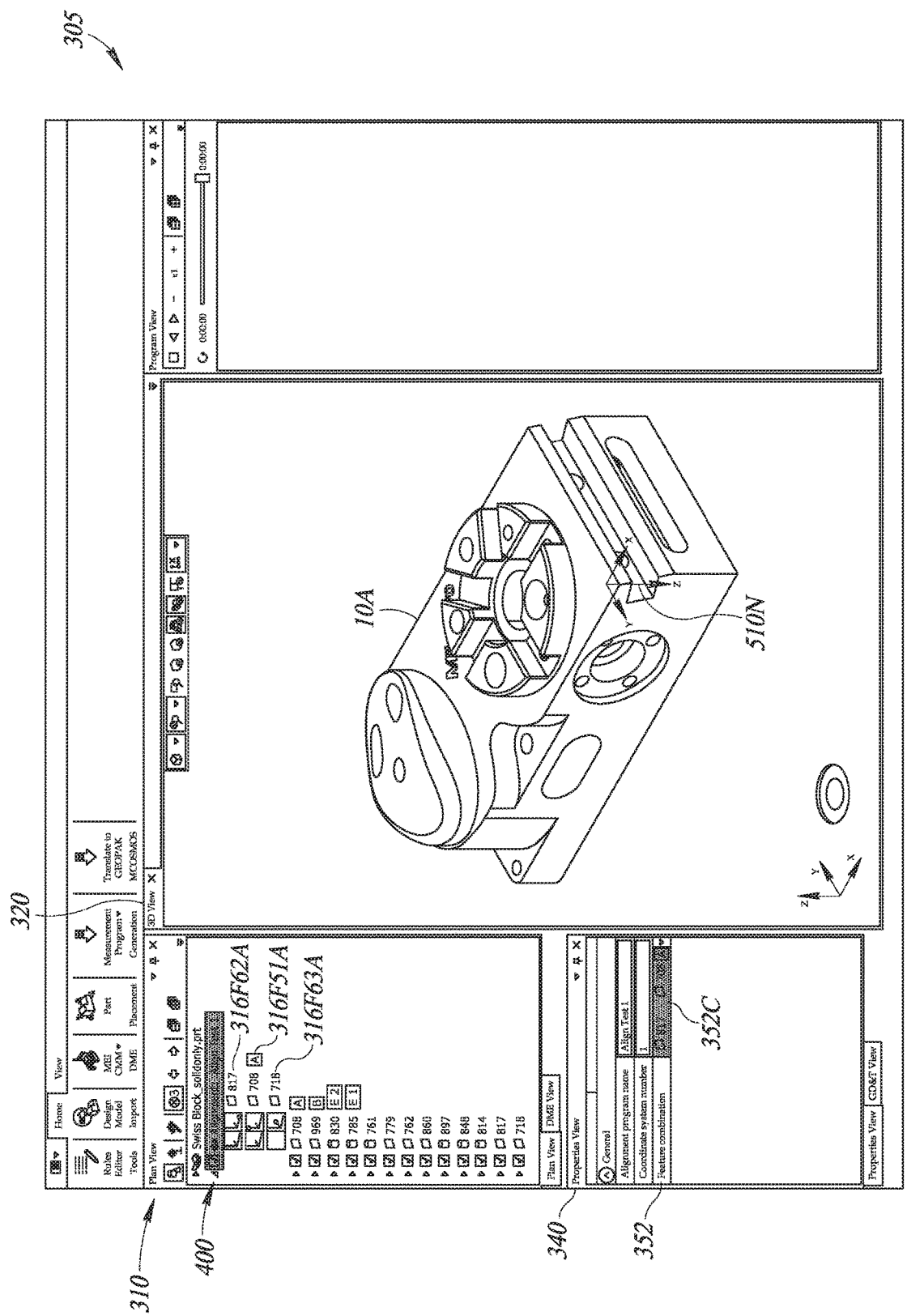
FIG. 26 is a diagram of a user interface in which the editable alignment program plan representation and a corresponding 3-D view are updated to reflect the new measurement order of the three workpiece features in the alignment program plan.

FIG. 26 is a diagram of the user interface 305 in which the editable alignment program plan representation 400 in the plan view window 310 and a corresponding 3-D view in the 3-D view window 320 are updated to reflect the new combination and order 352C selected in FIG. 25. Specifically, in the editable alignment program plan representation 400, the order in which the workpiece features are listed is changed to now list the second, first and fourth workpiece features 316F62A, 316F51A and 316F63A, in this order, which is changed from the order of display observable in FIG. 25. The 3-D view window is updated to display a reoriented coordinate system 510N, in which the orientation of X-Y-Z axes is different from that of the original coordinate system 510 shown in FIG. 25. In various embodiments, both of the editable plan representation 314 in the plan view window 310 and the 3-D view in the 3-D view window 320 are automatically responsive to editing operations to delete or add a workpiece feature from or to the editable alignment program plan representation 400, regardless of whether the editing operations are performed in the editable plan representation 314 in the plan view window 310 or in the 3-D view in the 3-D view window 320. Further, the editable alignment program plan representation 400 (which may be at least partly included in the plan view window 310 or may be displayed at least partially outside the plan view window 310 anywhere on the user interface 305) is automatically responsive to the editing operations to delete or add a workpiece feature from or to the editable alignment program plan representation 400, regardless of whether the editing operations are performed in the editable plan representation 314 in the plan view window 310 or in the 3-D view in the 3-D view window 320. These various user interface elements may be cross-updated and synchronized, in real time, in response to the editing operations performed anywhere on the user interface 305 to provide immediate visual feedback to assist a user, in particular a relatively unskilled user, to understand effects of his/her editing operations on the alignment program plan and/or the overall workpiece inspection/measurement program plan.

Figure 27:
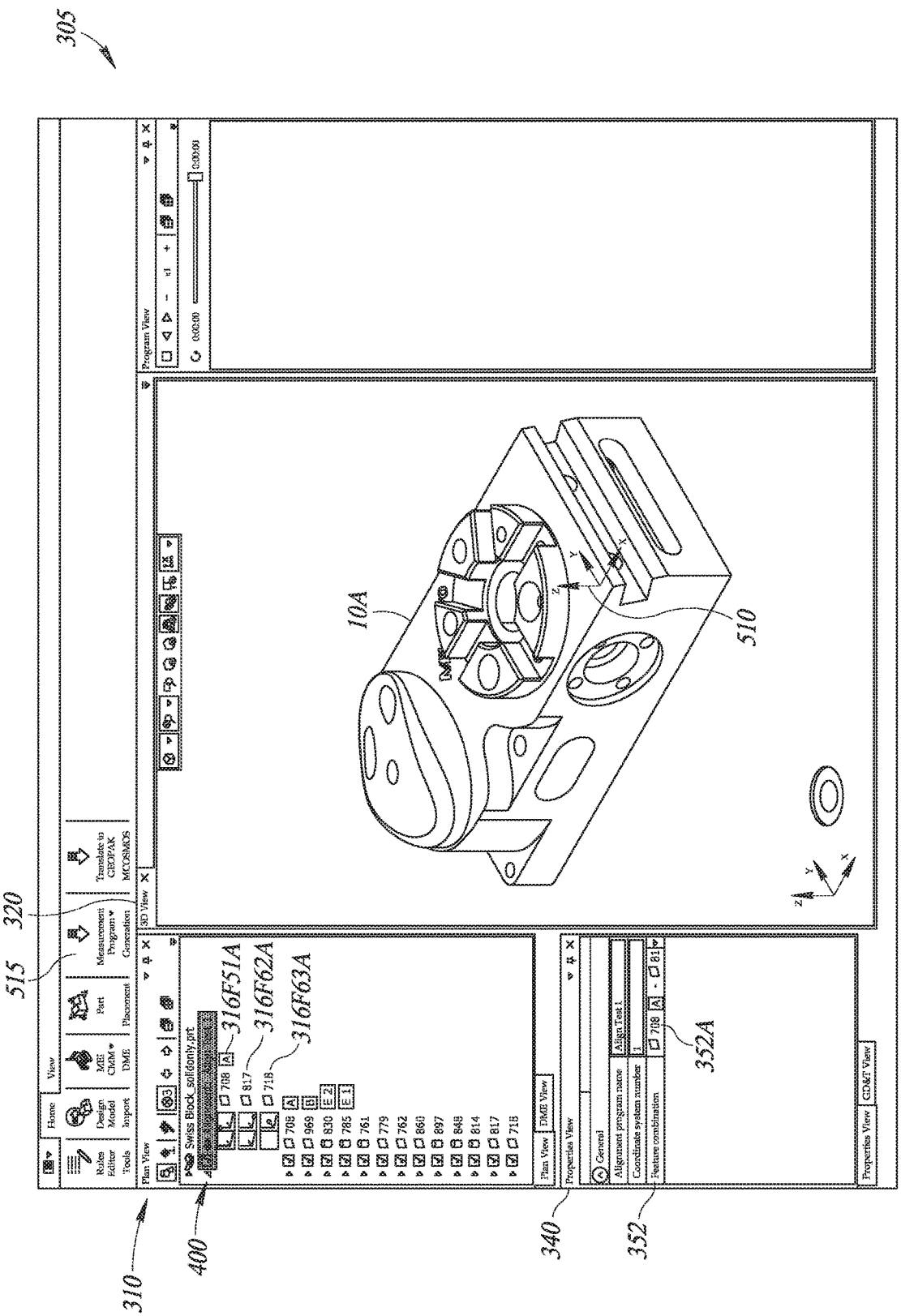
FIG. 27 is a diagram of a user interface in which the original measurement order of the three workpiece features in the editable alignment program plan representation, as in FIG. 24, is reselected.

FIG. 27 is a diagram of the user interface 305 in which the user, realizing that the new combination and order 352C of the workpiece features produces undesirable results, reselects the original combination and order 352A of measuring the first, second and fourth workpiece features in this order, using any of the previously outlined selection methods. The feature combination field 352 in the properties view window 340 is updated to list the original combination and order 352A. Also, both of the editable alignment program plan representation 400 in the plan view window 310 and the corresponding 3-D view in the 3-D view window 320 are updated to reflect the reselected original combination and order of measuring the first, second and fourth workpiece features 316F51A, 316F62A and 316F63A in this order to define the original X-Y-Z coordinate system 510. At this time, the user is satisfied with the editable plan representation 314 displayed in the plan view window 310 and is also satisfied with the editable alignment program plan representation 400, for which no error icon 402 is displayed. The user then may select a Measurement Program button 515 on the user interface 305 to generate a workpiece inspection/measurement program based on the editable plan representation 314.

Figure 28:
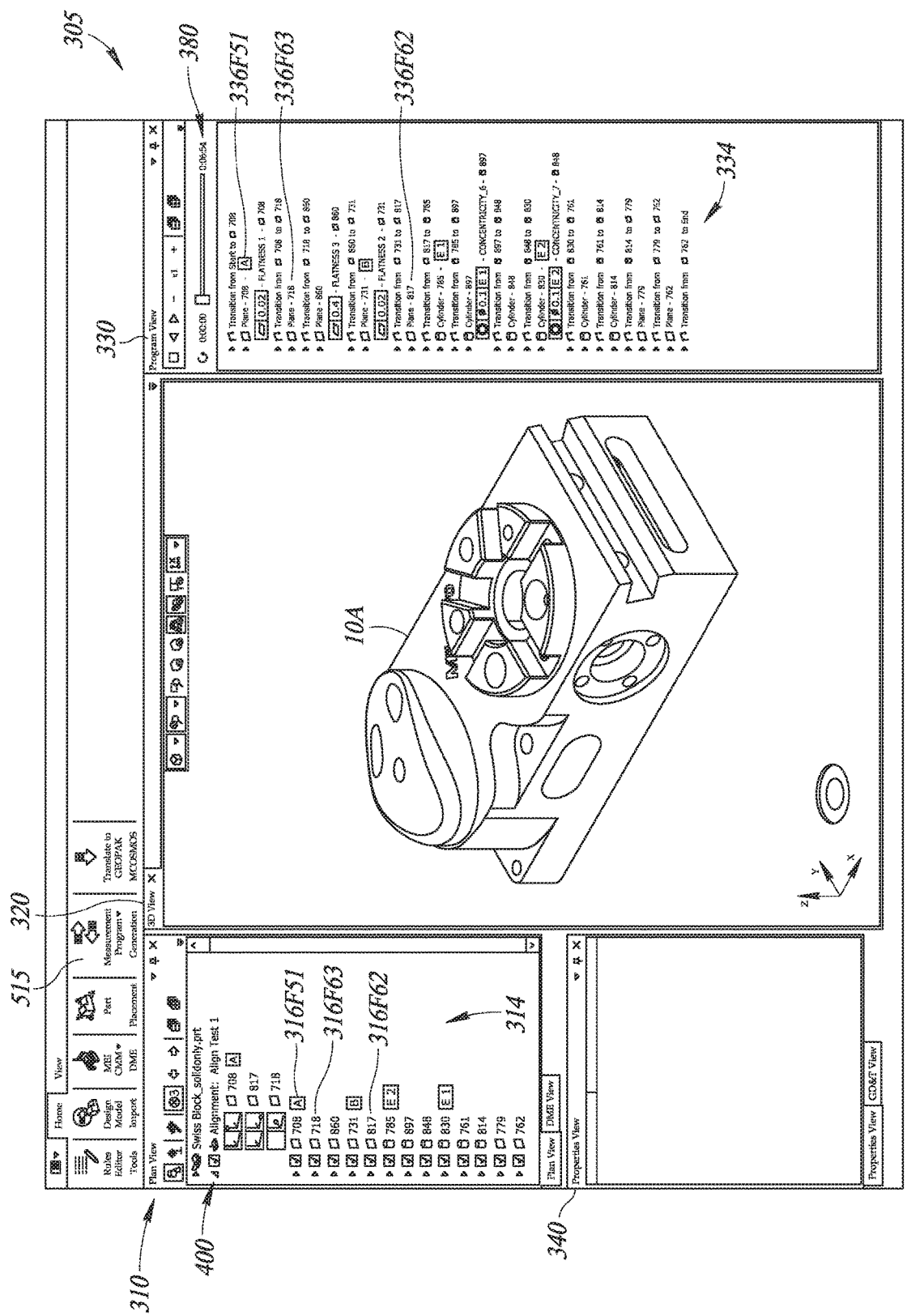
FIG. 28 is a diagram of a user interface in which a workpiece inspection program, or measurement program, is generated based on the editable plan representation and displayed in a program view, wherein the alignment program may also be generated but is not included in the measurement program and is separately stored, in various embodiments.

FIG. 28 is a diagram of the user interface 305 in which a workpiece inspection/measurement program is generated based on the editable plan representation 314. In various embodiments, the workpiece inspection/measurement program is automatically generated in response to user selection of the Measurement Program button 515. In various embodiments, when a valid and complete editable alignment program plan 400 has been created as described above, an alignment program too is generated in response to user selection of the Measurement Program button 515 based on the alignment program plan representation 400 including the workpiece features (316F51A, 316F62A, 316F63A in this example). At this time the program view window 330 displays an editable plan representation 334 corresponding to the generated workpiece inspection/measurement plan. The editable plan representation 334 in the program view window 300 includes the first, second and fourth workpiece features 336F51, 336F62 and 336F63, which respectively correspond to the first, second and fourth workpiece features 316F51, 316F62 and 316F63 in the editable plan representation 314 displayed in the plan view window 310. A view of simulated measurement/inspection operation can be displayed/animated using the simulation status and control portion 380 in the program view window 330, as described in detail above in reference to FIGS. 3-8. In various exemplary embodiments the generated workpiece inspection/measurement program does not include the alignment program, as evident from that the alignment program plan representation is not displayed as part of the editable plan representation 334 of the workpiece inspection/measurement plan in the program view window 330. In various embodiments, the alignment program is automatically generated when the workpiece inspection/measurement program is generated, but is separately stored in a customized user-guidance manual alignment program that is associated with the present project to measure/inspect the workpiece 10A (e.g., in association with the generated workpiece measurement/inspection program).

Figure 29:
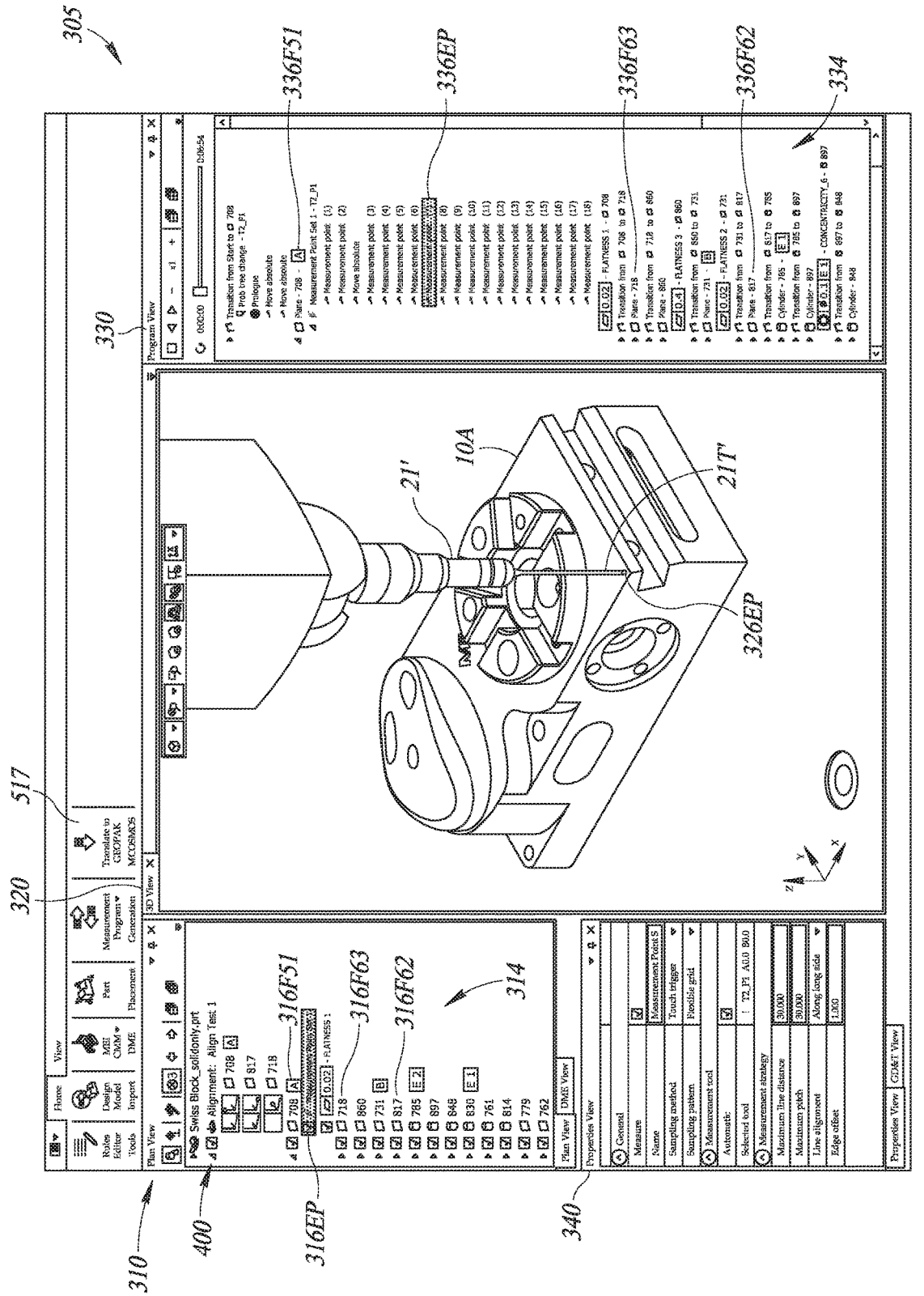
FIG. 29 is a diagram of a user interface in which the measurement program displayed in the program view is executed to simulate the programmed workpiece inspection and/or measurement in a CAD coordinate system (CCS)

FIG. 29 is a diagram of the user interface 305 in which the workpiece inspection/measurement program corresponding to the editable plan representation 334 in the program view window 330 is executed to "simulate" the programmed inspection/measurement in a CAD coordinate system (CCS). Since no actual workpiece placed on an actual CMM is measured, such simulation may be termed "offline" measurement. In the illustrated example, the workpiece inspection/measurement program has been partially executed to a point 336EP of acquiring a measurement point set (in highlight), which corresponds to the measurement point set acquisition operation representation 316EP (in highlight) in the plan view window 310. In the context of simulating the workpiece inspection/measurement offline, the measurement point set 336EP may be automatically generated in the CAD coordinate system (CCS). At the end of fully executing the programmed inspection/measurement in the CCS, CCS coordinates are obtained for all of the workpiece features that have been inspected/measured in simulation.

In order to measure or inspect an actual workpiece placed on an actual CMM using the generated workpiece inspection/measurement program, the CCS coordinates obtained "offline" for the workpiece inspection/measurement program need to be aligned to coordinates of the actual CMM, or the so-called machine coordinate system (MCS). The so-called part coordinate system (PCS) may be established, which identifies where the part (the workpiece) is located in the MCS. In various embodiments, the alignment program, which has been generated and saved in a separate file as described above, may be used to achieve aligning the CCS coordinates with the MCS and/or PCS coordinates, as will be described below in reference to FIGS. 30-36. Specifically, the purpose of the alignment program is to allow for measuring an actual workpiece placed on an actual CMM "online" using the workpiece inspection/measurement program defined in the CCS coordinates, to thereby determine the location of the actual workpiece in the MCS of the actual CMM. In various embodiments, the alignment program aligns or synchronizes the CCS coordinates to the MCS and/or PCS coordinates by acquiring, via user's manual operation, MCS coordinates of an actual workpiece placed on an actual CMM and aligning the MCS coordinates with the CCS coordinates separately defined "offline" for the workpiece. Note that each CMM has its own MCS used to control its operation and, thus, the alignment operation may need to be performed for each of different types of CMM.

Figure 30:
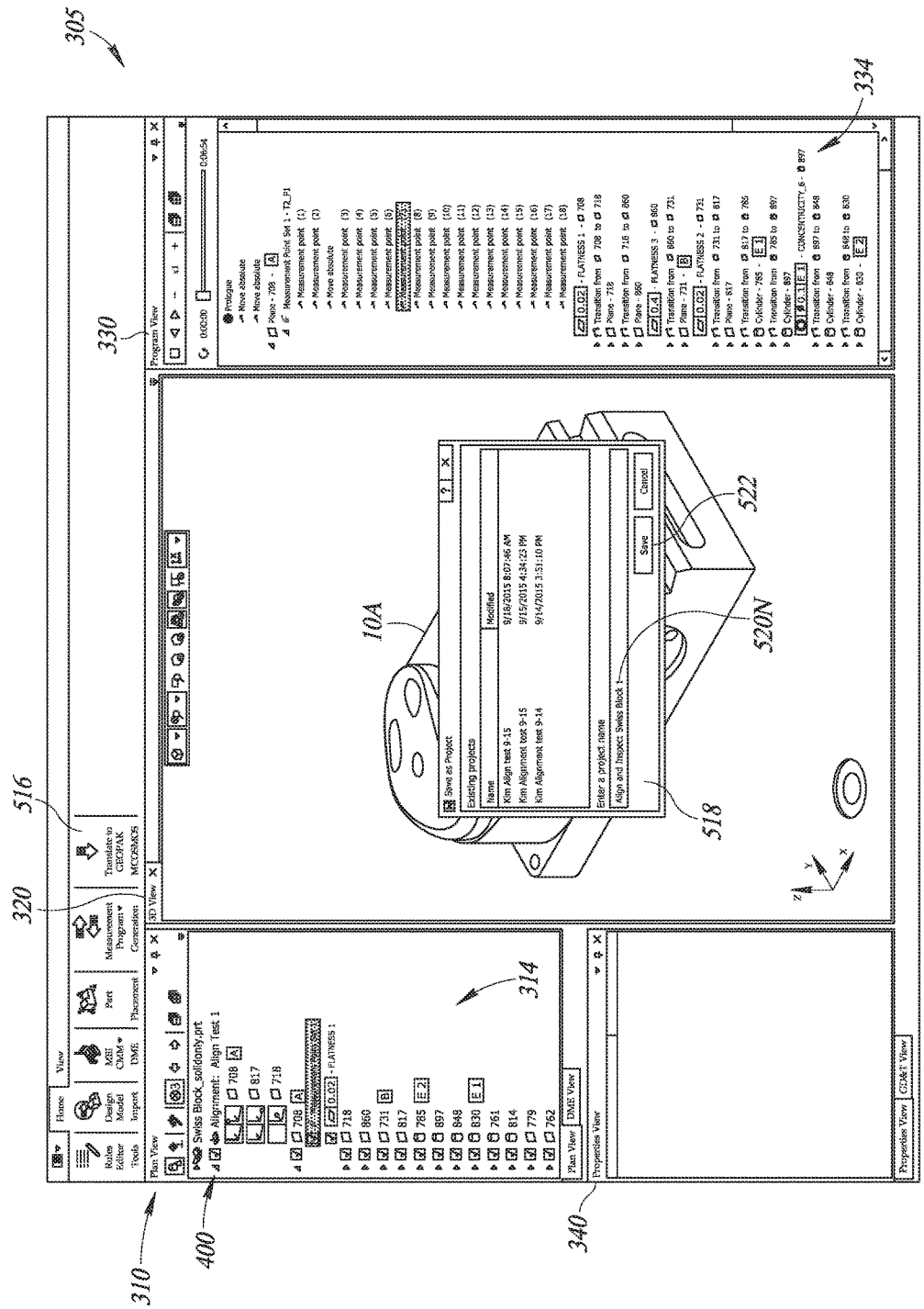
FIG. 30 is a diagram of a user interface in which the measurement program and the alignment program are translated to be operable on a particular type of CMM and are saved.

FIG. 30 is a diagram of the user interface 305 in which the user decides to translate the workpiece inspection/measurement program and the associated alignment program (which may be separately stored), obtained as described above, to a programming language and/or instructions operable on a particular type of CMM, on which an actual workpiece is to be inspected or measured. For example, the user may select (e.g., click on) a translation button 517 on the user interface 305 to activate the translate command which automatically performs the required translation and, in the illustrated embodiment, displays a "Save as Project" window 518. The "Save as Project" window 518 prompts the user to save the translated workpiece inspection/measurement program and the translated associated alignment program under a desirable project name. In the illustrated example, the user has entered the project name, "Align and Inspect Swiss Block 1" 520N, and selected the "Save" button 522 to save the translated workpiece inspection/measurement program and the translated alignment program under the project name "Align and Inspect Swiss Block 1."

Figure 31:
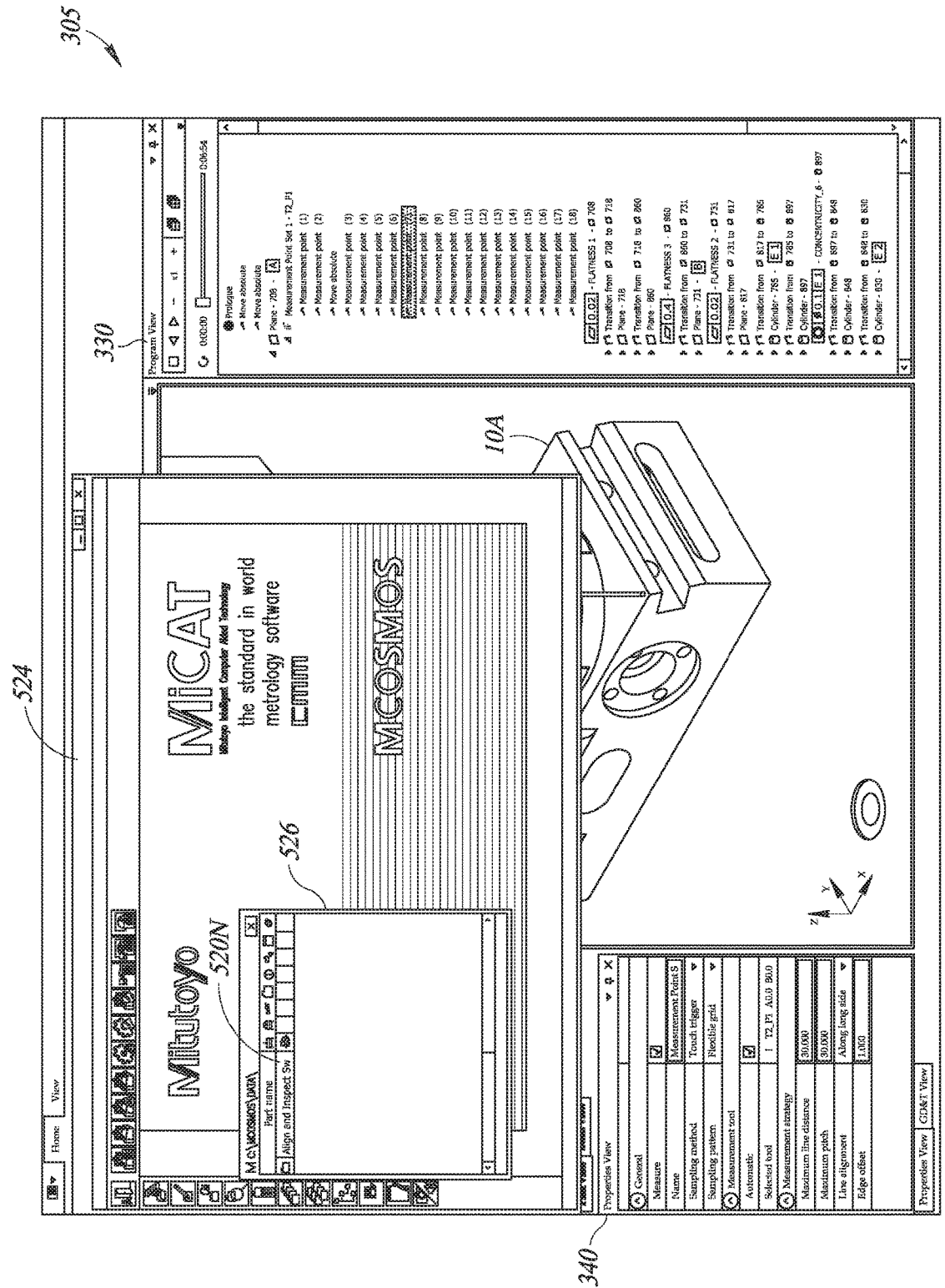
FIG. 31 is a diagram of a user interface in which the translated and saved measurement program and the translated and saved alignment program are selected on the particular type of CMM.

FIG. 31 is a diagram of the user interface 305 in which the translated workpiece inspection/measurement program and the translated alignment program, named "Align and Inspect Swiss Block 1" 520N, are selected on an actual CMM of the particular type for which the translation has been performed in FIG. 30. In the illustrated example, a start-up window 524 for this CMM is displayed as well as a project selection window 526, in which the "Align and Inspect Swiss Block 1" 520N is selected as indicated in highlight. In the illustrated example, the "Align and Inspect Swiss Block 1" 520N is the only project saved, and thus is the only option displayed in the project selection window 526, though if other projects have been saved those projects are available for selection in the project selection window 526, for example in a dropdown menu.

Figure 32:
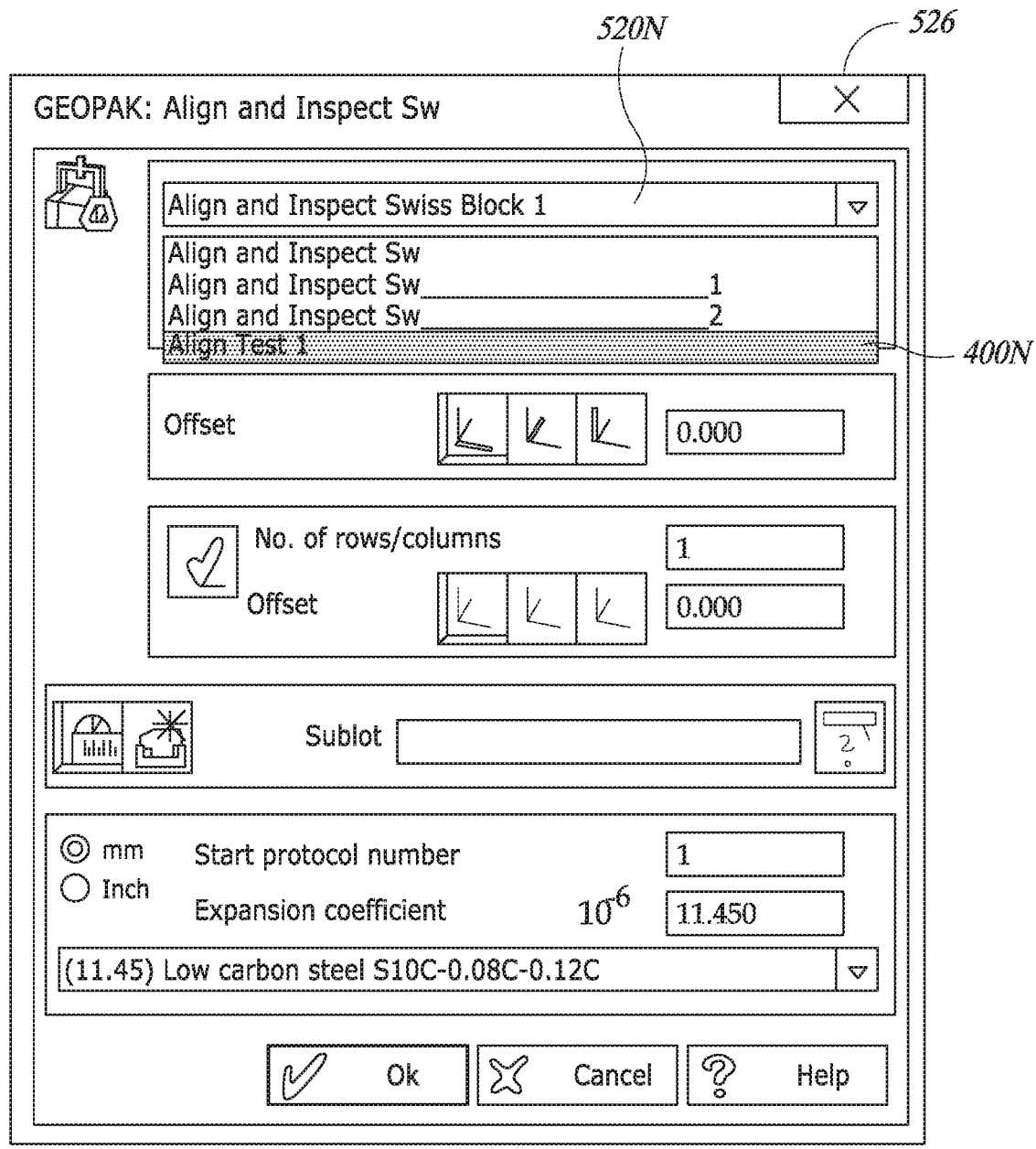
FIG. 32 is a diagram of a project selection window displayed in a user interface, in which the translated alignment program is selected to be executed.

FIG. 32 is a diagram of the project selection window 526 displayed on the user interface 305, in which the translated alignment program, named "Align Test 1" 400N (see FIG. 24) is selected to be executed. In the illustrated example, the "Align Test 1" 400N is displayed as part of a collection of various files saved under the project name "Align and Inspect Swiss Brock 1" 520N.

Figure 33:
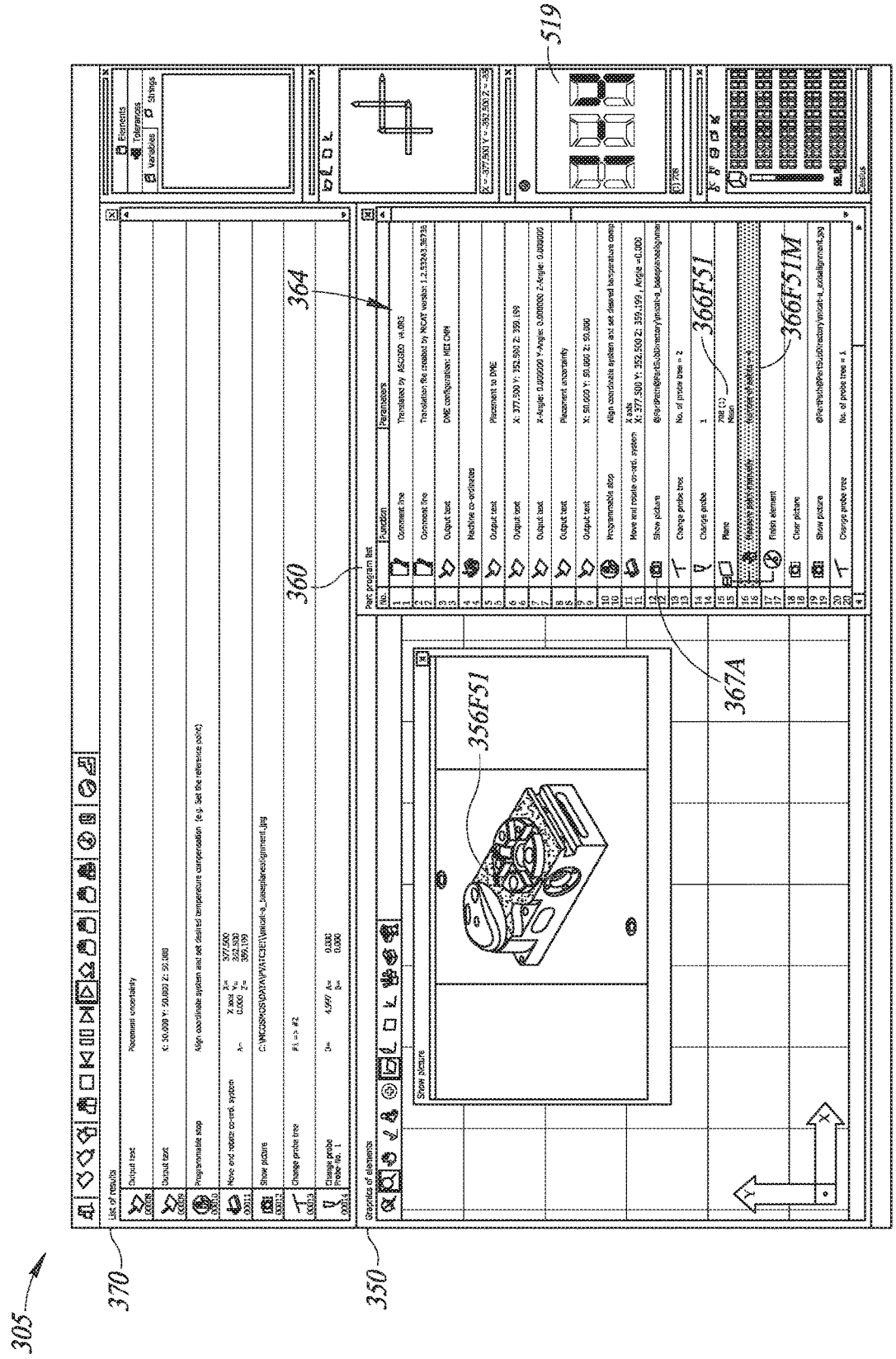
FIG. 33 is a diagram of a user interface in which the alignment program has partially executed to a point where a user's manual operation is required to locate (measure) the first workpiece feature of the alignment program plan on an actual workpiece placed on the particular type of CMM.

FIG. 33 is a diagram of the user interface 305 in which the alignment program "Align Test 1" 400N is executed in the context of the MCS of the actual CMM on which an actual workpiece is placed. As described before, the alignment program is executed to achieve alignment of the CCS coordinates obtained in a CAD-file based simulation with the MCS and/or PCS coordinates of the actual workpiece placed on the actual CMM. In FIG. 33, execution of the alignment program automatically generates and displays an alignment program representation 364 in a part program list window 360. The alignment program representation 364 indicates that the alignment program "Align Test 1" has partially executed to a point where a user's manual alignment operations are required. Specifically, the alignment program representation 364 prompts the user to locate/measure the first workpiece feature 366F51 of the alignment program plan, in the MCS, by measuring (acquiring) four (4) points on the first workpiece feature of the actual workpiece placed on the actual CMM. The measurement operations required to locate/measure the first workpiece 366F51 have been previously defined, as described above in reference to FIG. 11. In the illustrated example, the prompt for the required measurement operations is embodied in a "Measure point manually–Number of points=4" instruction representation 366F51 M, displayed in highlight. At this time, the screenshot of the first workpiece feature 356F51 as previously saved (see FIG. 11) has been automatically recalled and displayed in a graphics view window 350 of the user interface 305, in response to the "show picture" instruction representation 367A in the alignment program representation 364. The screenshot of the first workpiece feature 356F51 is provided to guide the user to acquire four measurement points on the first workpiece feature 356F51 of the actual workpiece. The user may acquire the four measurement points by placing the touch probe stylus 21T' of the actual CMM at four different locations on the first workpiece feature 356F51 of the actual workpiece (e.g., by using a joystick or the like, according to known methods). Each time the user acquires a measurement point on the first workpiece feature, the counter 519 displayed in the user interface 305 is incremented to show "1-4," "2-4," "3-4" and "4-4."

Display of "4-4" in the counter 519 means that all 4 measurement points required to define the first workpiece feature on the actual workpiece have been acquired. In various embodiments, the user interface 305 also includes a list of results window 370, which indicates the results of executing the alignment program in correspondence to the progress of the alignment program execution displayed in the part program list window 360.

FIG. 34 is a diagram of the part program list window 360 of the user interface 305 in which the alignment program, after the user measurement of the first workpiece feature 366F51 prompted by the "Measure point manually–Number of points=4" instruction representation 366F51M, resumes automatic execution. In response to the "show picture" instruction representation 367B, the alignment program recalls and displays the screenshot of the second workpiece feature 356F62 previously captured as shown in FIG. 13. The alignment program further executes to a point where the user's manual operation is again required to, this time, locate/measure the second workpiece feature 366F62 of the alignment program, in the MCS, by measuring (acquiring) four points on the second workpiece feature of the actual workpiece placed on the actual CMM. The measurement operations required to locate the second workpiece 366F62 have been previously defined, as described above in reference to FIG. 13. In the illustrated example, the prompt for the required measurement operations is embodied in a "Measure point manually–Number of points=4" instruction representation 366F62M. The screenshot of the second workpiece feature 356F62 displayed in the graphics view window 350 guides the user to acquire four measurement points on the second workpiece feature 366F62 of the actual workpiece on the actual CMM, by operating the CMM touch probe stylus 21T' as described above for example. The counter 519 shown in FIG. 33 may be displayed to count up the number of measurement points that are manually acquired by the user.

Still referring to FIG. 34, once all four points are measured to define the second workpiece feature 366F62 of the actual workpiece on the actual CMM, the alignment program resumes automatic execution, and recalls and displays the screenshot of the fourth workpiece feature 366F63 in response to the "show picture" instruction representation 367C. The alignment program further executes to a point where it prompts the user to locate/measure the fourth workpiece feature 366F63 of the alignment program, in the MCS, by measuring (acquiring) four points on the fourth workpiece feature of the actual workpiece placed on the actual CMM. The measurement operations required to locate the fourth workpiece 366F63 have been previously defined, as described above in reference to FIG. 22. In the illustrated example, the prompt for the required measurement operations is embodied in a "Measure point manually–Number of points=4" instruction representation 366F63M. The displayed screenshot of the fourth workpiece feature 366F63 guides the user to acquire four measurement points on the fourth workpiece feature 366F63 of the actual workpiece on the actual CMM by operating the CMM touch probe stylus 21T' as described above for example. The counter 519 shown in FIG. 33 may be displayed to count up the number of measurement points that are manually acquired by the user.

FIG. 35 is a diagram of the part program list window 360 of the user interface 305, in which the manual operation to locate/measure the fourth workpiece feature 366F63 is completed, as indicated by a "Finish element" line item 366F63F highlighted in the alignment program representation 364 displayed in the part program list 360. Thereafter, at lines 33-37 of the alignment program representation 364 (denoted by reference numeral 368 in FIG. 35), the alignment program uses the measured MCS coordinates of the first, second and fourth workpiece features 366F51, 366F62 and 366F63 to determine a PCS aligned to the actual workpiece placed on the actual CMM. Specifically, lines 33-37 include operations to analyze geometric features (planes, intersections, axes, the origin, etc.) of the first, second and fourth workpiece features in the MCS to determine the PCS. At line 38 (denoted by reference numeral 369), the alignment program automatically determines the transformation that converts the CCS coordinates of an ideal workpiece 10A to the PCS coordinates of the actual workpiece placed on the actual CMM. At line 39 (denoted by reference numeral 371) the alignment program saves the determined transformation (for the actual workpiece placed on the actual CMM) as "Co-ord. system #1" in response to the "Store co-ord. system" instruction representation 366F70 in the alignment program representation 364. Since the actual workpiece in the PCS is placed on the actual CMM in the MCS, the transformation that convers the CCS to the PCS may alternatively or additionally convert the CCS to the MCS also. The transformation may then be added to the beginning of the workpiece inspection/measurement program to be executed on an actual workpiece placed on the actual CMM.

Figure 36:
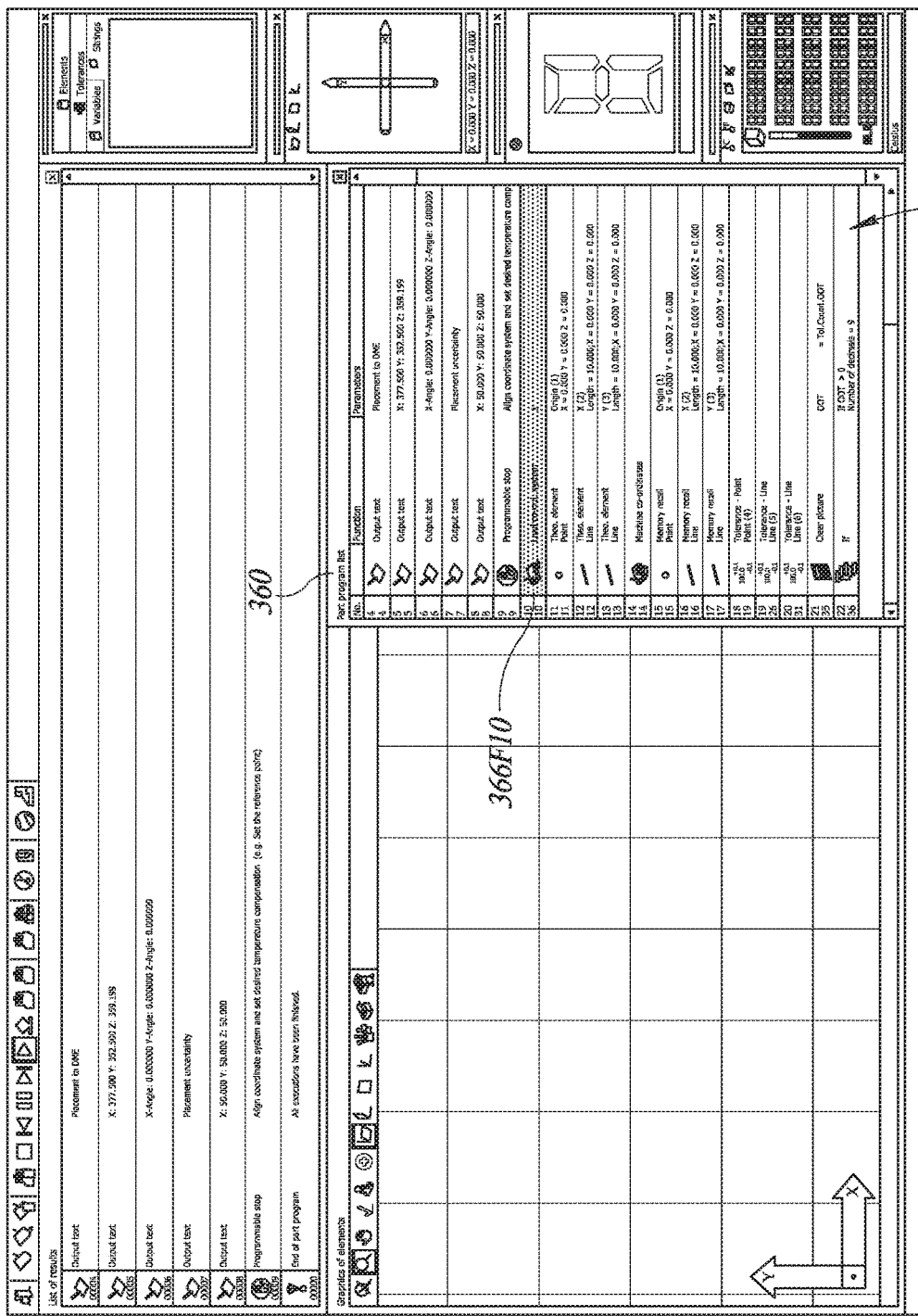
FIG. 36 is a diagram of a user interface in which the transformation that converts the CCS coordinates to the MCS and/or PCS coordinates is recalled and made operation in the workpiece inspection/measurement program executed to inspect/measure an actual workpiece placed on the particular type of actual CMM.

FIG. 36 is a diagram of the user interface 305 in which, after the alignment program is ended and the user exits the alignment program, the user selects and activates (executes) the workpiece inspection/measurement program to which the transformation may be added, as described above. Specifically, a workpiece inspection/measurement program representation 364W displayed in the part program list window 360 includes a "Load co-ord system 1" operation representation 366F10, which recalls and makes operation the transformation that converts the CCS coordinates to the PCS and/or MCS coordinates. The workpiece inspection/measurement program refers to the transformation to create appropriate motions for the actual CMM to inspect/measure the actual workpiece at its actual location on the actual CMM. The workpiece inspection/measurement program continues to execute to complete inspection/measurement of the actual workpiece placed on the actual CMM.

Figure 37:
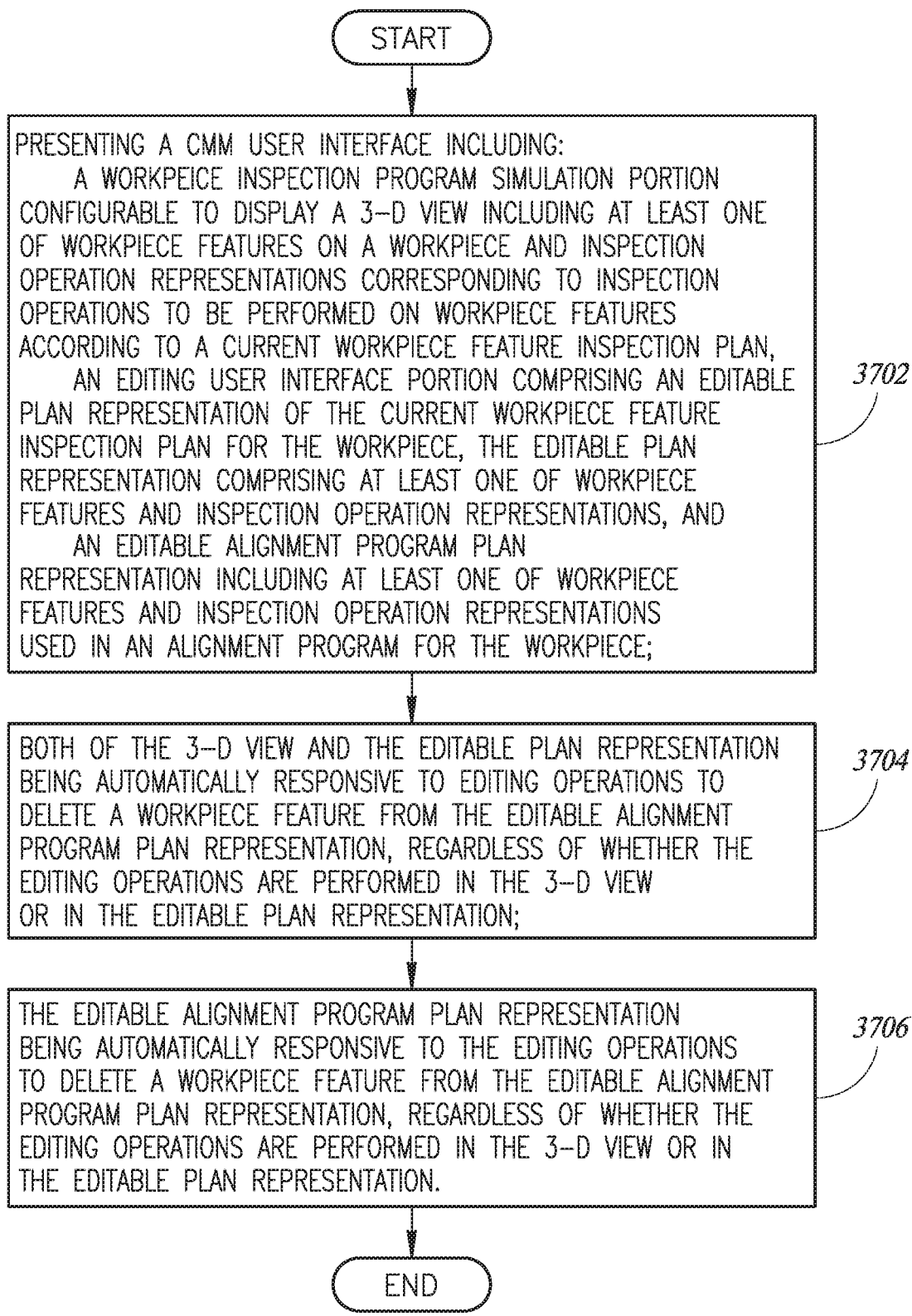
FIG. 37 is a flow diagram illustrating one exemplary implementation of a routine for programming workpiece feature inspection operations for a CMM including generating an alignment program plan.

FIG. 37 is a flow diagram illustrating one exemplary implementation of a routine for programming workpiece feature inspection operations for a CMM including programming an alignment program plan.

At block 3702, a CMM user interface 305 is presented, which includes a workpiece inspection program simulation portion 322 configurable to display a 3-D view 320 including at least one of workpiece features 326F on a workpiece and inspection operation representations corresponding to inspection operations to be performed on workpiece features according to a current workpiece feature inspection plan. The user interface 305 further includes an editing user interface portion 310 and/or 330 comprising an editable plan representation 314/334 of the current workpiece feature inspection plan for the workpiece, wherein the editable plan representation 314/334 includes at least one of workpiece features and inspection operation representations 316F/336F. The user interface 305 includes an editable alignment program plan representation 400 for the workpiece, wherein the alignment program plan representation 400 includes at least one of workpiece features 316F_A and inspection operation representations used in an alignment program for the workpiece.

At block 3704, both of the 3-D view and the editable plan representation are automatically responsive to editing operations to delete a workpiece feature 326F/316F from the editable alignment program plan representation 400, regardless of whether the editing operations are performed in the 3-D view window 320 or in the editable plan representation 314/334.

At block 3706, the editable alignment program plan representation 400 is automatically responsive to the editing operations to delete a workpiece feature from the editable alignment program plan representation 400, regardless of whether the editing operations are performed in the 3-D view window 320 or in the editable plan representation 314/334.

It should be appreciate that the systems and methods disclosed herein may be implemented in a manner that provides a generally "modeless" editing environment. That is, a user need not enter a "simulation" mode, or an "animation" mode that is separate from an editing mode of operation of the editing environment. A seamlessly responsive editing environment may be provided wherein all the user interface portions or "windows" are maintained up to date and synchronized with the latest editing operations, regardless of the portion of the user interface that is used to perform the editing operations. For example, as previously outlined, in various implementations the user interface may include a workpiece inspection program simulation portion configurable to display a 3-D view; and an editing user interface portion comprising an editable plan representation and an editable alignment program plan representation. In various embodiments, the system may be configured with both of the 3-D view and the editable plan representation being automatically responsive to editing operations to delete or add a workpiece feature to the editable alignment program plan representation, regardless of whether the editing operations are performed in the 3-D view or the editable plan representation. The system is further configured with the editable alignment program plan representation being automatically responsive to editing operations to delete or add a workpiece feature to the editable alignment program plan representation, regardless of whether the editing operations are performed in the 3-D view or the editable plan representation. The system may include the inspection path/sequence manager 206 (FIG. 2A). The inspection path/sequence manager 206 may also be responsive to the editing operations, regardless of whether the editing operations are performed in the 3-D view or the editable plan representation.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. Some techniques associated with a workpiece inspection program editing environment are disclosed in co-assigned U.S. patent application Ser. No. 14/682,976, entitled "Inspection Program Editing Environment Including Real Time Feedback Related to Throughput" filed on Apr. 9, 2015; U.S. patent application Ser. No. 14/703,814, entitled "Inspection Program Editing Environment with Editing Environment Automatically Globally Responsive to Editing Operations in Any of Its Portions" filed on May 4, 2015; and U.S. patent application Ser. No. 14/702,538, entitled "Inspection Program Editing Environment with Simulation Status And Control Continually Responsive To Selection Operations" filed on May 1, 2015, all of which are incorporated herein by reference. All of the U.S. patents and U.S. patent applications referred to in this specification are incorporated herein by reference, in their entirety. Aspects of the implementations can be modified, if necessary to employ concepts of the various patents and applications to provide yet further implementations. In addition U.S. Pat. No. 7,590,497, incorporated herein by reference, discloses methods for automatically determining and applying datums and other degree of freedom constraining features in a CAD file which may be used in conjunction with methods disclosed herein. Analogous applicable teachings are also available elsewhere in the prior art. In such a case, by using such known methods in conjunction with the methods disclosed herein, a default alignment program plan may be automatically created and/or generated, and the user determination of alignment features as outlined or implied in FIGS. 8-36 may be replaced by automatic operations. However, it should be appreciated that in such a case, the disclosed editing features may still be very useful for evaluating, editing and/or enhancing such an automatically created default alignment program plan, and/or the associated alignment program.

The invention claimed is:

1. A system for programming workpiece feature inspection operations for a coordinate measuring machine (CMM), the CMM including at least one sensor used for determining workpiece feature measurement data, a stage for holding a workpiece wherein at least one of the sensor and the stage are movable relative to one another, and a CMM control portion, the system comprising:

a computer-aided design (CAD) file processor which inputs a workpiece CAD file corresponding to a workpiece and analyzes the file to automatically determine inspectable workpiece features on the workpiece corresponding to a plurality of geometric feature types; and a user interface comprising:

a workpiece inspection program simulation portion configurable to display a 3-D view including at least one of 3-D workpiece features on the workpiece and inspection operation representations corresponding to inspection operations to be performed on 3-D workpiece features according to a current workpiece feature inspection plan which includes moving the at least one sensor relative to the stage and utilizing the at least one sensor for determining workpiece feature measurement data;

an editing user interface portion comprising an editable plan representation of the current workpiece feature inspection plan for the workpiece corresponding to the CAD file, the editable plan representation comprising at least one of inspection plan workpiece features and inspection operation representations; and an editable alignment program plan representation of a current workpiece alignment program plan for the workpiece corresponding to the CAD file, the editable alignment program plan representation including at least one of alignment plan workpiece features and inspection operation representations used in an alignment program for the workpiece for establishing a location of the workpiece on the CMM, wherein:

the system is configured with the editable alignment program plan representation being automatically responsive to editing operations included in a first set of editing operations, wherein the first set of editing operations includes at least one operation that is performed in the 3-D view of the user interface;
the first set of editing operations comprises editing operations that are performed for deleting a first alignment plan workpiece feature from the editable alignment program plan representation when the first alignment plan workpiece feature is included in the editable alignment program plan representation, wherein the first set of editing operations comprises: an editing operation that is performed in the 3-D view that selects a first 3-D workpiece feature in the 3-D view that corresponds to the first alignment plan workpiece feature in the editable alignment program plan representation; and an editing operation that selects an option for deleting the first alignment plan workpiece feature from the editable alignment program plan representation but which does not delete or modify the corresponding first 3-D workpiece feature in the 3-D view; and
the editable alignment program plan representation is automatically responsive to the editing operations in the first set of editing operations that are performed for the deleting of the first alignment plan workpiece feature from the editable alignment program plan representation, by automatically deleting the first alignment plan workpiece feature and associated inspection operations from the editable alignment program plan representation such that the first alignment plan workpiece feature is no longer displayed in the editable alignment program plan representation, but for which the corresponding first 3-D workpiece feature continues to be displayed in the 3-D view without modification to the first 3-D workpiece feature.

2. The system of claim 1, wherein:
the first set of editing operations further comprises editing operations that are performed for adding a second alignment plan workpiece feature to the editable alignment program plan representation and which comprise: an editing operation that is performed in the editable plan representation of the user interface for selecting an inspection plan workpiece feature in the editable plan representation of the user interface that corresponds to the second alignment plan workpiece feature of the editable alignment program plan representation; and an editing operation for operating an alignment program plan command element to add the second alignment plan workpiece feature to the editable alignment program plan representation, and
the editable alignment program plan representation is automatically responsive to the editing operations that are performed for adding the second alignment plan workpiece feature to the editable alignment program plan representation, by automatically adding the second alignment plan workpiece feature and associated inspection operations in the editable alignment program plan representation.

3. The system of claim 2, wherein:
the user interface generates an error indication when the second alignment plan workpiece feature as added to the editable alignment program plan representation is invalid.

4. The system of claim 1, wherein:
the user interface allows altering an order of measurements of multiple alignment plan workpiece features in the editable alignment program plan representation.

5. The system of claim 1, wherein:
when an alignment plan workpiece feature is added to the editable alignment program plan representation, a screenshot of the 3-D workpiece feature which corresponds to the added alignment plan workpiece feature is automatically stored, and the screenshot is displayed during execution of the alignment program generated based on the editable alignment program plan representation.

6. The system of claim 1, wherein:
the editable alignment program plan representation is at least partially displayed in the editable plan representation in the editing user interface portion.

7. The system of claim 1, wherein:
the editable alignment program plan representation is at least partially displayed in the user interface other than the editing user interface portion.

8. The system of claim 2, further comprising:
an inspection path/sequence manager, operable to be responsive to the editing operations included in the first set of editing operations, regardless of whether the editing operations included in the first set of editing operations are performed in the 3-D view or the editable plan representation of the user interface; and
an alignment program generator/manager portion, operable to be responsive to the editing operations included in the first set of editing operations, regardless of whether the editing operations included in the first set of editing operations are performed in the 3-D view or the editable plan representation of the user interface.

9. The system of claim 8, wherein:
the alignment program generator/manager portion is operable to automatically generate the alignment program based on the editable alignment program plan representation and save the alignment program in a file separate from a workpiece inspection/measurement program generated based on the editable plan representation.

10. The system of claim 1, wherein:
the alignment program, when executed on the system, guides a user through manual alignment operations.

11. The system of claim 1, further comprising:
a program view portion, operable to be automatically responsive to the editing operations included in the first set of editing operations, regardless of whether the editing operations included in the first set of editing operations are performed in the 3-D view or the editable plan representation or the program view portion.

12. The system of claim 1, further comprising:
a program view portion in the user interface operable to display the current workpiece feature inspection plan for the workpiece corresponding to the CAD file in pseudo-code, actual code, or graphical program operation representations.

13. A method for programming workpiece feature inspection operations for a coordinate measuring machine (CMM), the method comprising:
presenting a CMM user interface including:
a workpiece inspection program simulation portion configurable to display a 3-D view including at least one of 3-D workpiece features on a workpiece and inspection operation representations corresponding to inspection operations to be performed on 3-D workpiece features according to a current workpiece feature inspection plan which includes moving at least one sensor of the CMM relative to a stage that holds the workpiece and utilizing the at least one sensor for determining workpiece feature measurement data;

an editing user interface portion comprising an editable plan representation of the current workpiece feature inspection plan for the workpiece, the editable plan representation comprising at least one of inspection plan workpiece features and inspection operation representations; and an editable alignment program plan representation for the workpiece, the editable alignment program plan representation including at least one of alignment plan workpiece features and inspection operation representations used in an alignment program for the workpiece for establishing a location of the workpiece on the CMM; and responding to editing operations that are performed to delete a first alignment plan workpiece feature from the editable alignment program plan representation, wherein the editing operations that are performed to delete the first alignment plan workpiece feature from the editable alignment program plan representation comprise: an editing operation that is performed in the 3-D view that selects a first 3-D workpiece feature in the 3-D view that corresponds to the first alignment plan workpiece feature in the editable alignment program plan representation; and an editing operation that selects an option for deleting the first alignment plan workpiece feature from the editable alignment program plan representation but which does not delete or modify the corresponding first 3-D workpiece feature in the 3-D view, wherein the responding to the editing operations comprises no longer displaying the first alignment plan workpiece feature in the editable alignment program plan representation but for which the corresponding first 3-D workpiece feature in the 3-D view continues to be displayed in the 3-D view without modification to the first 3-D workpiece feature.

14. The method of claim 13, further comprising:
both of the 3-D view and the editable plan representation being automatically responsive to an editing operation that is performed in the editable plan representation to select an inspection plan workpiece feature that corresponds to a second alignment plan workpiece feature to be added to the editable alignment program plan representation, wherein the editable plan representation is automatically responsive by marking the inspection plan workpiece feature in the editable plan representation as having been selected, and the 3-D view is automatically responsive by marking a second 3-D workpiece feature in the 3-D view as having been selected that corresponds to the inspection plan workpiece feature in the editable plan representation; and
the editable alignment program plan representation being automatically responsive to an editing operation that is performed to add the second alignment plan workpiece feature to the editable alignment program plan representation that corresponds to the selected inspection plan workpiece feature in the editable plan representation.

15. The method of claim 14, further comprising:
automatically storing a screenshot of the second 3-D workpiece feature in the 3-D view which corresponds to the second alignment plan workpiece feature added to the editable alignment program plan representation.

16. The method of claim 15, further comprising:
displaying the screenshot of the second 3-D workpiece feature which corresponds to the second alignment plan workpiece feature added to the editable alignment program plan representation during execution of the alignment program generated based on the editable alignment program plan representation.

17. The method of claim 13, wherein:
the editable alignment program plan representation is at least partially included in the editable plan representation in the editing user interface portion.

18. The method of claim 13, wherein:
the editable alignment program plan representation is at least partially included in the user interface other than in the editing user interface portion.

19. The method of claim 14, further comprising:
storing the alignment program generated based on the editable alignment program plan representation in a file separate from a workpiece inspection/measurement program generated based on the editable plan representation.

20. The system of claim 1, wherein:
the system is configured with both the 3-D view and the editable plan representation being automatically responsive to the editing operation that selects the first 3-D workpiece feature in the 3-D view, wherein the 3-D view is automatically responsive by marking the first 3-D workpiece feature in the 3-D view as having been selected, and the editable plan representation is automatically responsive by marking a first inspection plan workpiece feature in the editable plan representation that corresponds to the first 3-D workpiece feature in the 3-D view as having been selected.

* * * * *